US011970821B2

(12) United States Patent
Weisman et al.

(10) Patent No.: US 11,970,821 B2
(45) **Date of Patent: *Apr. 30, 2024**

(54) FIBROUS STRUCTURES INCLUDING AN ACTIVE AGENT AND HAVING A GRAPHIC PRINTED THEREON

(71) Applicant: The Procter & Gamble Company, Cincinnati, OH (US)

(72) Inventors: Paul Thomas Weisman, Cincinnati, OH (US); Hui Yang, Cincinnati, OH (US); Alrick Vincent Warner, Loveland, OH (US); Andreas Josef Dreher, Cincinnati, OH (US); Mark Robert Sivik, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,037

(22) Filed: Jul. 26, 2023

(65) Prior Publication Data

US 2024/0035233 A1 Feb. 1, 2024

Related U.S. Application Data

(63) Continuation of application No. 18/099,341, filed on Jan. 20, 2023, now Pat. No. 11,795,622, which is a
(Continued)

(51) Int. Cl.
*D21H 21/28* (2006.01)
*C11D 17/04* (2006.01)
(Continued)

(52) U.S. Cl.
CPC ........... *D21H 21/28* (2013.01); *C11D 17/044* (2013.01); *D01F 1/10* (2013.01); *D04H 1/42* (2013.01);
(Continued)

(58) Field of Classification Search
CPC ........... C11D 17/044; D01F 1/10; D04H 1/42; D04H 1/4266; D04H 1/4309; D04H 3/011; D06P 1/0032; D21H 21/28
See application file for complete search history.

(56) References Cited

U.S. PATENT DOCUMENTS

| | | | |
|---|---|---|---|
| 548,744 | A | 10/1895 | Cassidy |
| 740,446 | A | 10/1903 | Lattard et al. |

(Continued)

FOREIGN PATENT DOCUMENTS

| | | | |
|---|---|---|---|
| DE | 2335044 | A1 | 1/1974 |
| DE | 10036533 | B4 | 2/2005 |

(Continued)

OTHER PUBLICATIONS

Search Report and Written Opinion for PCT/US2014/068143 dated Mar. 20, 2015, 11 pages.

(Continued)

*Primary Examiner* — Christopher M Polley
*Assistant Examiner* — Sathavaram I Reddy
(74) *Attorney, Agent, or Firm* — James E. Oehlenschlager

(57) ABSTRACT

The present disclosure relates to fibrous structures including active agents and having a graphic printed thereon. In some embodiments, a nonwoven web may include a fibrous structure comprising filaments. In turn, the filaments may include filament forming material, and an active agent releasable from the filaments when exposed to conditions of intended use. In addition, a graphic may be printed directly onto the fibrous structure.

24 Claims, 7 Drawing Sheets

Related U.S. Application Data continuation of application No. 17/539,246, filed on Dec. 1, 2021, now Pat. No. 11,624,156, which is a continuation of application No. 16/680,585, filed on Nov. 12, 2019, now Pat. No. 11,293,144, which is a continuation of application No. 14/558,829, filed on Dec. 3, 2014, now Pat. No. 10,494,767.

(60) Provisional application No. 61/913,450, filed on Dec. 9, 2013.

(51) Int. Cl.

| | |
|---|---|
| ***D01F 1/10*** | (2006.01) |
| ***D04H 1/42*** | (2012.01) |
| ***D04H 1/4266*** | (2012.01) |
| ***D04H 1/4309*** | (2012.01) |
| ***D04H 3/011*** | (2012.01) |
| ***D06P 1/00*** | (2006.01) |

(52) U.S. Cl.
CPC ......... *D04H 1/4266* (2013.01); *D04H 1/4309* (2013.01); *D04H 3/011* (2013.01); *D06P 1/0032* (2013.01)

(56) References Cited

U.S. PATENT DOCUMENTS

| | | | |
|---|---|---|---|
| 2,220,099 | A | 11/1940 | Fritz |
| 2,477,383 | A | 7/1949 | Lewis |
| 2,826,551 | A | 3/1958 | Geen |
| 2,954,347 | A | 9/1960 | St John et al. |
| 3,308,067 | A | 3/1967 | Diehl |
| 3,455,839 | A | 7/1969 | Rauner |
| 3,519,570 | A | 7/1970 | Mccarty |
| 3,553,139 | A | 1/1971 | Mccarty |
| 3,594,328 | A | 7/1971 | Schibler |
| 3,600,319 | A | 8/1971 | Gedge et al. |
| 3,646,015 | A | 2/1972 | Hamilton |
| 3,664,961 | A | 5/1972 | Norris |
| 3,812,011 | A | 5/1974 | Okada et al. |
| 3,893,929 | A | 7/1975 | Basadur |
| 3,929,678 | A | 12/1975 | Laughlin |
| 3,933,672 | A | 1/1976 | Bartolotta et al. |
| 3,958,581 | A | 5/1976 | Abegg et al. |
| 3,959,230 | A | 5/1976 | Hays |
| 3,962,418 | A | 6/1976 | Birkofer |
| 3,964,500 | A | 6/1976 | Drakoff |
| 4,000,093 | A | 12/1976 | Nicol |
| 4,033,718 | A | 7/1977 | Holcombe et al. |
| 4,075,118 | A | 2/1978 | Gault et al. |
| 4,101,457 | A | 7/1978 | Place |
| 4,133,779 | A | 1/1979 | Hellyer et al. |
| 4,152,416 | A | 5/1979 | Marra et al. |
| 4,197,865 | A | 4/1980 | Jacquet et al. |
| 4,201,824 | A | 5/1980 | Lagasse |
| 4,217,914 | A | 8/1980 | Jacquet et al. |
| 4,228,042 | A | 10/1980 | Letton |
| 4,234,627 | A | 11/1980 | Schilling |
| 4,239,660 | A | 12/1980 | Kingry |
| 4,240,918 | A | 12/1980 | Lagasse |
| 4,260,529 | A | 4/1981 | Letton |
| 4,265,779 | A | 5/1981 | Gandolfo et al. |
| 4,291,071 | A | 9/1981 | Harris et al. |
| 4,317,881 | A | 3/1982 | Yagi et al. |
| 4,364,837 | A | 12/1982 | Pader |
| 4,375,416 | A | 3/1983 | Crisp et al. |
| 4,378,923 | A | 4/1983 | Takei |
| 4,381,919 | A | 5/1983 | Jacquet et al. |
| 4,412,934 | A | 11/1983 | Chung |
| 4,418,144 | A | 11/1983 | Okada et al. |
| 4,422,853 | A | 12/1983 | Jacquet et al. |
| 4,430,243 | A | 2/1984 | Bragg |
| 4,483,779 | A | 11/1984 | Llenado |
| 4,483,780 | A | 11/1984 | Llenado |
| 4,483,781 | A | 11/1984 | Hartman |
| 4,489,455 | A | 12/1984 | Spendel |
| 4,489,574 | A | 12/1984 | Spendel |
| 4,062,647 | B1 | 2/1985 | Storm et al. |
| 4,507,219 | A | 3/1985 | Hughes |
| 4,507,280 | A | 3/1985 | Pohl et al. |
| 4,514,461 | A | 4/1985 | Woo |
| 4,525,524 | A | 6/1985 | Tung |
| 4,529,586 | A | 7/1985 | De Marco et al. |
| 4,539,135 | A | 9/1985 | Ramachandran et al. |
| 4,540,721 | A | 9/1985 | Staller |
| 4,565,647 | A | 1/1986 | Llenado |
| 4,579,681 | A | 4/1986 | Ruppert |
| 4,597,898 | A | 7/1986 | Vander Meer |
| 4,622,378 | A | 11/1986 | Gosselink |
| 4,634,551 | A | 1/1987 | Burns |
| 4,637,859 | A | 1/1987 | Trokhan |
| 4,639,489 | A | 1/1987 | Aizawa et al. |
| 4,652,392 | A | 3/1987 | Baginski et al. |
| 4,663,158 | A | 5/1987 | Wolfram et al. |
| 4,681,704 | A | 7/1987 | Bernardino et al. |
| 4,686,062 | A | 8/1987 | Kermode et al. |
| 4,702,857 | A | 10/1987 | Gosselink |
| 4,704,233 | A | 11/1987 | Hartman et al. |
| 4,711,730 | A | 12/1987 | Gosselink |
| 4,721,580 | A | 1/1988 | Gosselink |
| 4,728,455 | A | 3/1988 | Rerek |
| 4,741,855 | A | 5/1988 | Grote et al. |
| 4,746,456 | A | 5/1988 | Kud et al. |
| 4,749,740 | A | 6/1988 | Aizawa et al. |
| RE32,713 | E | 7/1988 | Woo |
| 4,787,989 | A | 11/1988 | Fanelli |
| 4,790,856 | A | 12/1988 | Wixon |
| 4,798,679 | A | 1/1989 | Castro et al. |
| D300,180 | S | 3/1989 | Nodin |
| 4,877,896 | A | 10/1989 | Maldonado |
| 4,882,220 | A | 11/1989 | Ono et al. |
| 4,891,160 | A | 1/1990 | Vander Meer |
| 4,911,852 | A | 3/1990 | Coffindaffer et al. |
| 4,915,854 | A | 4/1990 | Mao |
| 4,917,920 | A | 4/1990 | Ono et al. |
| 4,925,588 | A | 5/1990 | Berrod et al. |
| 4,956,447 | A | 9/1990 | Gosselink |
| 4,966,723 | A | 10/1990 | Hodge |
| 4,968,451 | A | 11/1990 | Scheibel |
| 4,973,422 | A | 11/1990 | Schmidt |
| 4,978,471 | A | 12/1990 | Starch |
| 4,983,316 | A | 1/1991 | Starch |
| 5,053,157 | A | 10/1991 | Lloyd |
| 5,104,646 | A | 4/1992 | Bolich, Jr. |
| 5,106,609 | A | 4/1992 | Bolich, Jr. |
| 5,114,606 | A | 5/1992 | Van Vliet |
| 5,114,611 | A | 5/1992 | Van Kralingen |
| 5,194,416 | A | 3/1993 | Jureller |
| 5,207,941 | A | 5/1993 | Kroner et al. |
| 5,227,084 | A | 7/1993 | Martens |
| 5,244,594 | A | 9/1993 | Favre |
| 5,246,612 | A | 9/1993 | Van Dijk |
| 5,246,621 | A | 9/1993 | Favre |
| 5,256,779 | A | 10/1993 | Kerschner |
| 5,274,147 | A | 12/1993 | Kerschner |
| 5,280,117 | A | 1/1994 | Kerschner |
| 5,284,944 | A | 2/1994 | Madison |
| 5,288,431 | A | 2/1994 | Huber et al. |
| RE34,584 | E | 4/1994 | Grote et al. |
| 5,314,635 | A | 5/1994 | Hage et al. |
| 5,324,649 | A | 6/1994 | Arnold |
| 5,332,528 | A | 7/1994 | Pan |
| 5,356,554 | A | 10/1994 | Delwel et al. |
| 5,415,807 | A | 5/1995 | Gosselink |
| 5,427,711 | A | 6/1995 | Sakaguchi et al. |
| 5,503,076 | A | 4/1996 | Yeo |
| 5,506,201 | A | 4/1996 | Mcdermott et al. |
| 5,552,378 | A | 9/1996 | Trinh et al. |
| 5,565,145 | A | 10/1996 | Watson |
| 5,576,282 | A | 11/1996 | Miracle |
| 5,580,485 | A | 12/1996 | Feringa et al. |
| 5,595,967 | A | 1/1997 | Miracle |
| 5,597,936 | A | 1/1997 | Perkins |

(56) References Cited

U.S. PATENT DOCUMENTS

| | | | |
|---|---|---|---|
| 5,651,976 | A | 7/1997 | Price et al. |
| 5,674,270 | A | 10/1997 | Viltro et al. |
| 5,674,478 | A | 10/1997 | Dodd |
| 5,750,122 | A | 5/1998 | Evans |
| 5,807,956 | A | 9/1998 | Czech |
| 5,858,959 | A | 1/1999 | Surutzidis et al. |
| 5,922,586 | A | 7/1999 | Outtrup et al. |
| 5,958,870 | A | 9/1999 | Declercq et al. |
| 5,981,681 | A | 11/1999 | Czech |
| 6,004,922 | A | 12/1999 | Watson |
| 6,008,181 | A | 12/1999 | Cripe |
| 6,020,040 | A | 2/2000 | Cramer et al. |
| 6,020,303 | A | 2/2000 | Cripe |
| 6,022,844 | A | 2/2000 | Baillely et al. |
| 6,024,943 | A | 2/2000 | Ness et al. |
| 6,042,792 | A | 3/2000 | Shefer et al. |
| 6,048,830 | A | 4/2000 | Gallon et al. |
| 6,051,540 | A | 4/2000 | Shefer et al. |
| 6,060,443 | A | 5/2000 | Cripe |
| 6,093,691 | A | 7/2000 | Sivik et al. |
| 6,093,856 | A | 7/2000 | Cripe |
| 6,096,918 | A | 8/2000 | Anderson et al. |
| 6,103,678 | A | 8/2000 | Masschelein et al. |
| 6,106,875 | A | 8/2000 | Soper et al. |
| 6,133,228 | A | 10/2000 | Pika et al. |
| 6,136,769 | A | 10/2000 | Asano |
| 6,147,037 | A | 11/2000 | Gardlik |
| 6,153,577 | A | 11/2000 | Cripe |
| 6,165,953 | A | 12/2000 | Gardlik et al. |
| 6,200,949 | B1 | 3/2001 | Reijmer et al. |
| 6,207,782 | B1 | 3/2001 | Czech |
| 6,218,355 | B1 | 4/2001 | Herrmann |
| 6,221,825 | B1 | 4/2001 | Williams, Jr. |
| 6,245,732 | B1 | 6/2001 | Gallon et al. |
| 6,274,540 | B1 | 8/2001 | Scheibel |
| 6,277,796 | B1 | 8/2001 | Sivik et al. |
| 6,316,397 | B1 | 11/2001 | Sivik |
| 6,413,920 | B1 | 7/2002 | Bettiol |
| 6,437,150 | B1 | 8/2002 | Anderson et al. |
| 6,458,754 | B1 | 10/2002 | Velazquez et al. |
| 6,479,682 | B1 | 11/2002 | Anderson et al. |
| 6,482,969 | B1 | 11/2002 | Helmrick |
| 6,482,994 | B2 | 11/2002 | Scheper |
| 6,514,926 | B1 | 2/2003 | Kott |
| 6,525,233 | B1 | 2/2003 | Connor et al. |
| 6,531,444 | B1 | 3/2003 | Shefer et al. |
| 6,544,945 | B1 | 4/2003 | Miracle et al. |
| 6,566,319 | B1 | 5/2003 | Scheibel |
| 6,583,096 | B1 | 6/2003 | Kott |
| 6,602,840 | B1 | 8/2003 | Scheibel |
| 6,607,717 | B1 | 8/2003 | Johnson |
| 6,610,646 | B2 | 8/2003 | Miracle et al. |
| 6,645,479 | B1 | 11/2003 | Shefer et al. |
| 6,787,512 | B1 | 9/2004 | Verrall |
| 6,844,309 | B1 | 1/2005 | Sivik et al. |
| 6,861,402 | B1 | 3/2005 | Miracle et al. |
| 6,956,013 | B2 | 10/2005 | Dykstra et al. |
| 6,956,017 | B1 | 10/2005 | Catalan et al. |
| 6,987,084 | B2 | 1/2006 | Dykstra et al. |
| 7,018,978 | B2 | 3/2006 | Miracle et al. |
| 7,041,767 | B2 | 5/2006 | Lange |
| 7,071,151 | B2 | 7/2006 | Dykstra et al. |
| 7,109,153 | B2 | 9/2006 | Dykstra et al. |
| 7,119,060 | B2 | 10/2006 | Shefer et al. |
| 7,205,269 | B2 | 4/2007 | Sadlowski |
| 7,208,459 | B2 | 4/2007 | Sadlowski |
| 7,217,777 | B2 | 5/2007 | Lange |
| 7,271,138 | B2 | 9/2007 | Song et al. |
| 7,445,644 | B2 | 11/2008 | Song |
| 7,465,439 | B2 | 12/2008 | Avery |
| 7,585,376 | B2 | 9/2009 | Scheibel |
| 7,674,757 | B2 | 3/2010 | Torres |
| 10,494,767 | B2 | 12/2019 | Weisman et al. |
| 2002/0082182 | A1 | 6/2002 | Kott et al. |
| 2002/0103096 | A1 | 8/2002 | Kott |
| 2003/0036489 | A1 | 2/2003 | Liu et al. |
| 2003/0120225 | A1 | 6/2003 | Everhart et al. |
| 2003/0125222 | A1 | 7/2003 | Jahns |
| 2003/0158344 | A1 | 8/2003 | Rodrigues et al. |
| 2003/0165692 | A1 | 9/2003 | Koch et al. |
| 2003/0195133 | A1 | 10/2003 | Shefer et al. |
| 2003/0199422 | A1 | 10/2003 | Birkbeck et al. |
| 2003/0203196 | A1 | 10/2003 | Trokhan |
| 2003/0203829 | A1 | 10/2003 | Shefer et al. |
| 2003/0215417 | A1 | 11/2003 | Uchiyama |
| 2003/0216488 | A1 | 11/2003 | Uchiyama |
| 2004/0058845 | A1 | 3/2004 | Metrot et al. |
| 2004/0071742 | A1 | 4/2004 | Popplewell |
| 2004/0071746 | A1 | 4/2004 | Popplewell et al. |
| 2004/0072719 | A1 | 4/2004 | Bennett et al. |
| 2004/0072720 | A1 | 4/2004 | Brain et al. |
| 2004/0087476 | A1 | 5/2004 | Dykstra et al. |
| 2004/0087477 | A1 | 5/2004 | Ness |
| 2004/0091445 | A1 | 5/2004 | Dykstra |
| 2004/0092414 | A1 | 5/2004 | Clapp et al. |
| 2004/0092425 | A1 | 5/2004 | Boutique et al. |
| 2004/0106536 | A1 | 6/2004 | Mane et al. |
| 2004/0110648 | A1 | 6/2004 | Jordan, IV |
| 2004/0220074 | A1 | 11/2004 | Fehr |
| 2005/0003980 | A1 | 1/2005 | Baker |
| 2005/0048549 | A1 | 3/2005 | Cao |
| 2005/0124530 | A1 | 6/2005 | Creutz et al. |
| 2005/0143282 | A1 | 6/2005 | Creutz et al. |
| 2006/0003913 | A1 | 1/2006 | Boutique et al. |
| 2006/0020459 | A1 | 1/2006 | Carter et al. |
| 2006/0039934 | A1 | 2/2006 | Ness et al. |
| 2006/0068666 | A1 | 3/2006 | Sharma et al. |
| 2006/0092431 | A1 | 5/2006 | Larson et al. |
| 2006/0223726 | A1 | 10/2006 | Dykstra et al. |
| 2006/0263313 | A1 | 11/2006 | Scavone |
| 2006/0263519 | A1 | 11/2006 | Schwantes |
| 2006/0278355 | A1 | 12/2006 | Boatman et al. |
| 2007/0041929 | A1 | 2/2007 | Torgerson |
| 2007/0131248 | A1 | 6/2007 | Mckechnie |
| 2007/0207109 | A1 | 9/2007 | Peffly |
| 2007/0207942 | A1 | 9/2007 | Creutz et al. |
| 2007/0275866 | A1 | 11/2007 | Dykstra |
| 2007/0286837 | A1 | 12/2007 | Torgerson |
| 2008/0034511 | A1 | 2/2008 | Batchelor |
| 2008/0035885 | A1 | 2/2008 | Hage |
| 2008/0102725 | A1 | 5/2008 | Lacey et al. |
| 2008/0132438 | A1 | 6/2008 | Hoffman et al. |
| 2008/0139440 | A1 | 6/2008 | Catalfamo et al. |
| 2008/0242572 | A1 | 10/2008 | Icht |
| 2009/0176684 | A1 | 7/2009 | Gardner et al. |
| 2009/0274905 | A1 | 11/2009 | Schwantes |
| 2010/0028621 | A1 | 2/2010 | Byrne et al. |
| 2010/0214352 | A1 | 8/2010 | Tsunoda et al. |
| 2010/0214532 | A1 | 8/2010 | Siminou |
| 2010/0295206 | A1 | 11/2010 | Mcneil |
| 2010/0295213 | A1 | 11/2010 | Mcneil |
| 2010/0297377 | A1 | 11/2010 | Mcneil et al. |
| 2011/0189442 | A1 | 8/2011 | Manifold |
| 2011/0268778 | A1 | 11/2011 | Dihora |
| 2011/0268802 | A1 | 11/2011 | Dihora |
| 2011/0269657 | A1 | 11/2011 | Dihora |
| 2011/0269658 | A1 | 11/2011 | Dihora |
| 2011/0301070 | A1 | 12/2011 | Ochomogo |
| 2012/0048769 | A1 | 3/2012 | Sivik |
| 2012/0052037 | A1 | 3/2012 | Sivik et al. |
| 2012/0053108 | A1 | 3/2012 | Glenn, Jr. |
| 2012/0222576 | A1 | 9/2012 | McNeil et al. |
| 2012/0237576 | A1 | 9/2012 | Gordon |
| 2013/0167305 | A1 | 7/2013 | Weisman et al. |
| 2013/0171421 | A1 | 7/2013 | Weisman |
| 2013/0172226 | A1 | 7/2013 | Gamble |
| 2020/0095733 | A1 | 3/2020 | Weisman et al. |
| 2022/0090321 | A1 | 3/2022 | Weisman et al. |
| 2023/0151550 | A1 | 5/2023 | Weisman et al. |

FOREIGN PATENT DOCUMENTS

| | | | |
|---|---|---|---|
| EP | 0066915 | A2 | 12/1982 |
| EP | 0133354 | A1 | 2/1985 |

(56) References Cited

FOREIGN PATENT DOCUMENTS

| | | | |
|---|---|---|---|
| EP | 0111965 | B1 | 7/1989 |
| EP | 0111984 | B1 | 8/1989 |
| EP | 0199405 | B1 | 6/1992 |
| EP | 0150872 | B2 | 5/1993 |
| EP | 0544490 | A1 | 6/1993 |
| EP | 0549272 | A1 | 6/1993 |
| EP | 2508436 | A2 | 10/2012 |
| EP | 2848579 | A1 | 3/2015 |
| GB | 849433 | A | 9/1960 |
| WO | 8908694 | A1 | 9/1989 |
| WO | 9108281 | A1 | 6/1991 |
| WO | 9307260 | A1 | 4/1993 |
| WO | 9835002 | A1 | 8/1998 |
| WO | 9835003 | A1 | 8/1998 |
| WO | 9835004 | A1 | 8/1998 |
| WO | 9835005 | A1 | 8/1998 |
| WO | 9835006 | A1 | 8/1998 |
| WO | 9905084 | A1 | 2/1999 |
| WO | 0047708 | A1 | 8/2000 |
| WO | 03015736 | A2 | 2/2003 |
| WO | 2005072594 | A1 | 8/2005 |
| WO | 0887497 | A1 | 7/2008 |
| WO | 2009063356 | A1 | 5/2009 |
| WO | 2012121954 | A1 | 9/2012 |

OTHER PUBLICATIONS

Third Party Opposition for 112014005598.0 dated Mar. 9, 2023, 10 pages.

Extended EP Search Report and Written Opinion for 19183844.0 dated Oct. 29, 2019, 8 pages.

Third Party Opposition for 19183844.0 dated Oct. 26, 2021, 14 pages.

Extended EP Search Report and Written Opinion for 20210692.8 dated Jan. 14, 2021, 10 pages.

All Office Actions; U.S. Appl. No. 14/558,829, filed Dec. 3, 2014.

All Office Actions; U.S. Appl. No. 16/680,585, filed Nov. 12, 2019.

All Office Actions; U.S. Appl. No. 17/539,246, filed Dec. 1, 2021.

All Office Actions; U.S. Appl. No. 18/099,341, filed Jan. 20, 2023.

Christie M. Hassan et al. "Water Solubility Characteristics of Poly( Vinyl Alcohol) and Gels Prepared by Freezing/Thawing Processes", Polymer Science and Engineering Laboratories, School of Chemical Engineering, Purdue University, 2020, 10 pages.

Nylon and Polyester: Waters, Online retrieved from "http://www.waters.com/waters/en_US/Nylon-and-Polyester/nav.htm?cid=10167904&1ocale=en_US", Dec. 20, 2017, 3 pages.

Third Party Opposition filed for European Patent Application Ser. No. 14824186.2, Dated Jul. 14, 2020; 12 pages.

Extended EP Search Report and Written Opinion for 23187897.6 dated Nov. 8, 2023, 8 pages.

FIBROUS STRUCTURES INCLUDING AN ACTIVE AGENT AND HAVING A GRAPHIC PRINTED THEREON

CROSS REFERENCE TO RELATED APPLICATION

This application claims the benefit of U.S. Provisional Application No. 61/913,450 filed on Dec. 9, 2013, which is incorporated herein by reference.

FIELD OF THE INVENTION

The present disclosure relates to webs, and more particularly, to fibrous structures including one or more active agents and having a graphic printed thereon.

BACKGROUND OF THE INVENTION

Web materials are known in the art. For example, a polyester nonwoven that is impregnated and/or coated with a detergent composition is known in the art as shown in prior art FIGS. 1 and 2. An example of such a web material is commercially available as Purex® Complete 3-in-1 Laundry Sheets from The Dial Corporation. Further, an article of manufacture formed from a cast solution of a detergent composition is also commercially available as Dizolve® Laundry Sheets commercially available from Dizolve Group Corporation.

Various web materials and/or articles of manufacture delivering detergent compositions and/or actives for cleaning performance are generally unaesthetically pleasing, lacking any graphic or visually pleasing appearance characteristic. Visual graphics are an important aspect of delivering against consumer needs by communicating a signal that a product will deliver against performance expectations as well as making the use of such products an enjoyable use experience. In various applications, web materials with one or more graphics disposed thereon are generally viewed as more appealing to consumers than those without graphics.

Printing graphics on web materials configured to dissolve in use situations present various challenges. For example, because such web materials are designed to dissolve during in use situations, applying inks solutions, especially aqueous inks, might trigger premature, localized dissolution of the web material where the ink is applied. Such dissolution could form fiber junctions and produce hard spots in the web, which may be unappealing from a tactile standpoint and may reduce the flexibility of the web material. Also, the ink may dissolve fibers and penetrate into the interior of a filament, and as such, the resulting color intensity may be less than desired and may be less visible to a viewer. In addition, some inks may create problems with residual color being deposited on surfaces, clothes, fabrics, or other materials being cleaned.

The printing of inks on dissolving web materials would also present other difficulties when considering the potential for a relatively high degree of dot gain on such dissolvable web materials (the spread of the ink from its initial/intended point of printing to surrounding areas). For example, a typical piece of paper that may be used for printing a book will have a dot gain of about 3% to about 4%, whereas a dissolvable web material may have potential for a much higher dot gain because the web material comprises fibers which literally dissolve in use. The higher dot gain would make it difficult to deliver against target color intensity levels; would limit the color gamut available for desired graphics; and make it difficult to deliver acceptable print quality.

In addition, many prior art printing methods may be unsuitable for use in printing dissolving web materials due to the relatively low modulus of the dissolving web materials. For example, a printing method used for a high modulus substrate (i.e., card stock or newspaper) may not be equally applied to a low modulus, dissolving web material. The low modulus of dissolving web materials provides for inconsistencies in the web material that are relatively noticeable when compared to an ordinary paper substrate (such as that for printing a book or newspaper). As a result, maintaining adequate tension in the dissolving web materials during printing without tearing, shredding, stretching, or deforming, the dissolving web materials provides a challenge to printing such web materials.

There is a need for a dissolving web material with graphics that overcomes the negatives described above. In addition, many consumers may prefer purchasing such dissolving web materials and/or articles of manufacture having graphic designs printed thereon. Thus, there is an ongoing need for aesthetically appealing, dissolving web materials where the dissolution, flexibility, strength, modulus, color intensity, cleaning performance and other performance properties of the web materials are not compromised as graphics or ink materials are added thereon. There is also an ongoing need for methods for applying graphics or ink materials to the surface of dissolving, web materials.

SUMMARY OF THE INVENTION

The present disclosure relates to fibrous structures including active agents and having a graphic printed thereon. In some embodiments, a nonwoven web may include a fibrous structure comprising filaments. In turn, the filaments may include filament forming material, and an active agent releasable from the filaments when exposed to conditions of intended use. In addition, a graphic may be printed directly onto the fibrous structure.

In some embodiments, a web comprises: a fibrous structure comprising filaments; wherein the filaments comprise: filament forming material; and an active agent releasable from the filaments when exposed to conditions of intended use; and a graphic printed directly on the fibrous structure.

In some embodiments, a web comprises: a fibrous structure comprising: filament forming material; and an active agent releasable from the fibrous structure when exposed to conditions of intended use; a graphic printed directly on the fibrous structure, the graphic comprising L*a*b* color values, the graphic being defined by the difference in CIELab coordinate values disposed inside the boundary described by the following system of equations:

$$\{a^*=-13.0 \text{ to } -10.0;\ b^*=7.6 \text{ to } 15.5\} \rightarrow b^*=2.645a^*+41.869$$

$$\{a^*=-10.0 \text{ to } -2.1;\ b^*=15.5 \text{ to } 27.0\} \rightarrow b^*=1.456a^*+30.028$$

$$\{a^*=-2.1 \text{ to } 4.8;\ b^*=27.0 \text{ to } 24.9\} \rightarrow b^*=-0.306a^*+26.363$$

$$\{a^*=4.8 \text{ to } 20.9;\ b^*=24.9 \text{ to } 15.2\} \rightarrow > b^*=-0.601a^*+27.791$$

$$\{a^*=20.9 \text{ to } 23.4;\ b^*=15.2 \text{ to } -4.0\} \rightarrow b^*=-7.901a^*+180.504$$

$\{a^*=23.4 \text{ to } 20.3;\ b^*=-4.0 \text{ to } -10.3\} \rightarrow b^*=2.049a^*-51.823$ $\{a^*=20.3 \text{ to } 6.6;\ b^*=-10.3 \text{ to } -19.3\} \rightarrow b^*=0.657a^*-23.639$ $\{a^*=6.6 \text{ to } -5.1;\ b^*=-19.3 \text{ to } -18.0\} \rightarrow b^*=-0.110a^*-18.575$ $\{a^*=-5.1 \text{ to } -9.2;\ b^*=-18.0 \text{ to } -7.1\} \rightarrow b^*=-2.648a^*-31.419$ $\{a^*=-9.2 \text{ to } -13.0;\ b^*=-7.1 \text{ to } 7.6\} \rightarrow b^*=-3.873a^*-42.667$; and wherein L* is from 0 to 100.

In some embodiments, a web comprises: a fibrous structure having a first surface and a second surface opposite the first surface, the fibrous structure comprising: filament forming material; and an active agent releasable from the fibrous structure when exposed to conditions of intended use; a graphic printed directly on the first surface the fibrous structure, and wherein fibrous structure has a dry average ink adhesion rating of at least about 1.5 or greater.

In some embodiments, a web comprises: a fibrous structure having a first surface and a second surface opposite the first surface, the fibrous structure comprising: filament forming material; and an active agent releasable from the fibrous structure when exposed to conditions of intended use; a graphic printed directly on the first surface the fibrous structure, and wherein fibrous structure has a wet average ink adhesion rating of at least about 1.5 or greater.

DETAILED DESCRIPTION OF THE INVENTION

Figure 1:
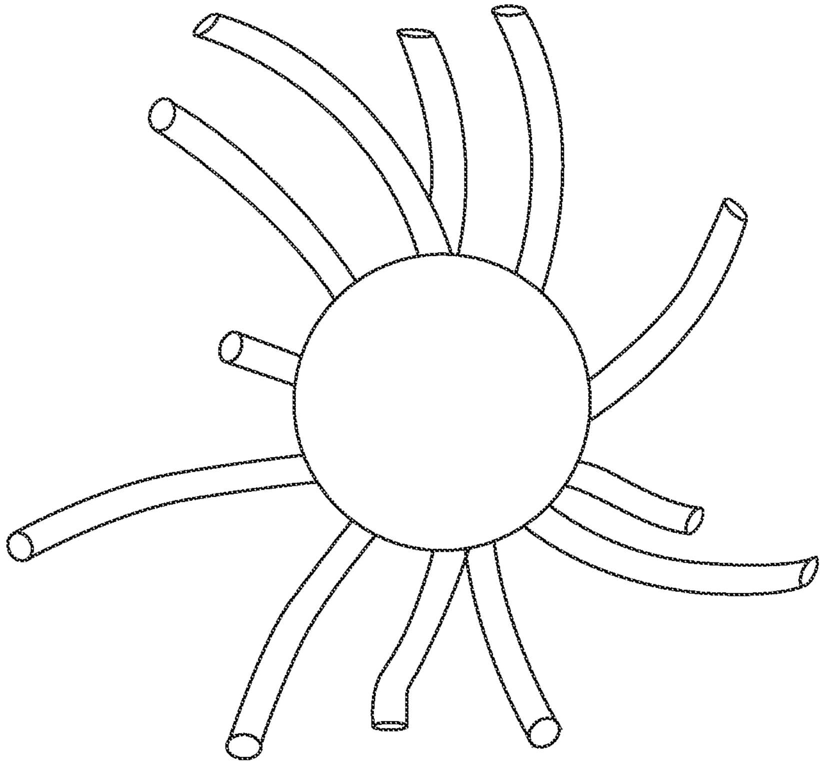
Fig. 1 (PRIOR ART)
FIG. 1 is a known nonwoven substrate.

The present disclosure relates to webs, and more particularly, to fibrous structures including one or more active agents and having a graphic printed thereon. As discussed below, a nonwoven web may include a fibrous structure comprising filaments. In turn, the filaments may include filament forming material, and an active agent releasable from the filaments when exposed to conditions of intended use. In addition, a graphic may be printed directly onto the fibrous structure. More particularly, the fibrous structure may include a first surface and a second surface opposite the first surface, and one or more graphics may be printed directly on the first and/or second surfaces of the fibrous structure. In some embodiments, the graphic comprises ink positioned on the first and/or second surface. It is also to be appreciated that the ink may penetrate into the fibrous structure below the surface on which the ink is applied. As such, the ink may reside on the fibrous structure and/or within the fibrous structure at various depths below the first and/or second surface. In some embodiments, the graphics may be applied such that the fibrous structures have various wet and/or dry ink adhesion ratings. In addition, the graphics may be applied such that the fibrous structure may exhibit desired certain physical properties, such as for example, desired ranges of a geometric mean modulus, geometric mean elongation, and/or geometric means tensile strength. In addition, a graphic may be printed directly on the fibrous structure such that the graphic can be defined by the difference in CIELab coordinate values disposed inside the boundary described by systems of equations. Definitions and explanations of various terms used herein are provided below.

I. Definitions

As used herein, the following terms shall have the meaning specified thereafter:

"Base Color," as used herein, refers to a color that is used in the halftoning printing process as the foundation for creating additional colors. In some non-limiting embodiments, a base color is provided by a colored ink. Non-limiting examples of base colors may selected from the group consisting of: cyan, magenta, yellow, black, red, green, and blue-violet.

"Black", as used herein, refers to a color and/or base color which absorbs wavelengths in the entire spectral region of from about 380 nm to about 740 nm.

"Blue" or "Blue-violet", as used herein, refers to a color and/or base color which have a local maximum reflectance in the spectral region of from about 390 nm to about 490 nm.

"Cyan", as used herein, refers to a color and/or base color which have a local maximum reflectance in the spectral region of from about 390 nm to about 570 nm. In some embodiments, the local maximum reflectance is between the local maximum reflectance of the blue or blue-violet and green local maxima.

"Dot gain" is a phenomenon in printing which causes printed material to look darker than intended. It is caused by halftone dots growing in area between the original image ("input halftone") and the image finally printed upon the web material ("output halftone").

An "ink" is a liquid containing coloring matter, for imparting a particular hue to web materials. An ink may include dyes, pigments, organic pigments, inorganic pigments, and/or combinations thereof. A non-limiting example of an ink would encompass spot colors. Additional non-limiting examples of inks include inks having white color. Additional non-limiting examples of inks include hot melt inks.

"Green", as used herein, refers to a color and/or base color which have a local maximum reflectance in the spectral region of from about 491 nm to about 570 nm.

"Halftone" or "halftoning" as used herein, sometimes referred to as "screening," is a printing technique that allows for less-than-full saturation of the primary colors. In halftoning, relatively small dots of each primary color are printed in a pattern small enough such that the average human observer perceives a single color. For example, magenta printed with a 20% halftone will appear to the average observer as the color pink. The reason for this is because, without wishing to be limited by theory, the average observer may perceive the tiny magenta dots and white paper between the dots as lighter, and less saturated, than the color of pure magenta ink.

"Hue" is the relative red, yellow, green, and blue-violet in a particular color. A ray can be created from the origin to any color within the two-dimensional a*b* space. Hue is the angle measured from 0° (the positive a* axis) to the created ray. Hue can be any value of between 0° to 360°. Lightness is determined from the L* value with higher values being more white and lower values being more black.

"Lab Color" or "L*a*b* Color Space," as used herein, refers to a color model that is used by those of skill in the art to characterize and quantitatively describe perceived colors with a relatively high level of precision. More specifically, CIELab may be used to illustrate a gamut of color because L*a*b* color space has a relatively high degree of perceptual uniformity between colors. As a result, L*a*b* color space may be used to describe the gamut of colors that an ordinary observer may actually perceive visually.

"Magenta", as used herein, refers to a color and/or base color which have a local maximum reflectance in the spectral region of from about 390 nm to about 490 nm and 621 nm to about 740 nm.

"Process Printing," as used herein, refers to the method of providing color prints using at least three of the primary of colors cyan, magenta, yellow and black. Each layer of color is added over a base substrate. In some embodiments, the base substrate is white or off-white in color. With the addition of each layer of color, certain amounts of light are absorbed (those of skill in the printing arts will understand that the inks actually "subtract" from the brightness of the white background), resulting in various colors. CMY (cyan, magenta, yellow) are used in combination to provide additional colors. Non-limiting examples of such colors are red, green, and blue. K (black) is used to provide alternate shades and pigments. One of skill in the art will appreciate that CMY may alternatively be used in combination to provide a black-type color.

"Red", as used herein, refers to a color and/or base color which has a local maximum reflectance in the spectral region of from about 621 nm to about 740 nm.

"Resultant Color," as used herein, refers to the color that an ordinary observer perceives on the finished product of a halftone printing process. As exemplified herein, the resultant color of magenta printed at a 20% halftone is pink.

"Yellow", as used herein, refers to a color and/or base color which have a local maximum reflectance in the spectral region of from about 571 nm to about 620 nm.

The term "graphic" refers to images or designs that are constituted by a figure (e.g., a line(s)), a symbol or character, a color difference or transition of at least two colors, or the like. A graphic may include an aesthetic image or design that can provide certain benefit(s) when viewed. A graphic may be in the form of a photographic image. A graphic may also be in the form of a 1-dimensional (1-D) or 2-dimensional (2-D) bar code or a quick response (QR) bar code. A graphic design is determined by, for example, the color(s) used in the graphic (individual pure ink or spot colors as well as built process colors), the sizes of the entire graphic (or components of the graphic), the positions of the graphic (or components of the graphic), the movements of the graphic (or components of the graphic), the geometrical shapes of the graphic (or components of the graphics), the number of colors in the graphic, the variations of the color combinations in the graphic, the number of graphics printed, the disappearance of color(s) in the graphic, and the contents of text messages in the graphic.

"Different in terms of graphic design" means that graphics are intended to be different when viewed by users or consumers with normal attentions. Thus, two graphics having a graphic difference(s) which are unintentionally caused due to a problem(s) or an error(s) in a manufacture process, for example, are not different from each other in terms of graphic design.

"Standard" or "standardized" refers to graphics, products, and/or articles that have the same aesthetic appearance without intending to be different from each other.

The term "custom" or "customized" refers to graphics, products, and/or articles that are changed to suit a small demographic, region, purchaser, customer, or the like. Custom graphics may be selected from a set of graphics. For example, custom graphics may include animal depictions selected from groups of animals, such as farm animals, sea creatures, birds, and the like.

In other examples, custom graphics may include nursery rhymes and the like. In one scenario, custom products or articles may be created by a purchaser of such products or articles wherein the purchaser selects graphics for the articles or products from a set of graphics offered by a manufacturer of such articles or products. Custom graphics may also include "personalized" graphics, which may be graphics created for a particular purchaser. For example, personalized graphics may include a person's name alone or in combination with a design.

"Filament" or "fiber" or "fibrous element" as used herein means an elongate particulate having a length greatly exceeding its diameter, i.e. a length to diameter ratio of at least about 10. A fibrous element may be a filament or a fiber. In one example, the fibrous element is a single fibrous element rather than a yarn comprising a plurality of fibrous elements. Fibrous elements may be spun from a filament-forming compositions also referred to as fibrous element-forming compositions via suitable spinning operations, such as meltblowing and/or spunbonding. Fibrous elements may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament-forming composition" as used herein means a composition that is suitable for making a filament such as by meltblowing and/or spunbonding. The filament-forming composition comprises one or more filament-forming materials that exhibit properties that make them suitable for spinning into a filament. In one example, the filament-forming material comprises a polymer.

In addition to one or more filament-forming materials, the filament-forming composition may comprise one or more additives, for example one or more active agents. In addition, the filament-forming composition may comprise one or more polar solvents, such as water, into which one or more, for example all, of the filament-forming materials and/or one or more, for example all, of the active agents are dissolved and/or dispersed.

"Filament-forming material" as used herein means a material, such as a polymer or monomers capable of producing a polymer that exhibits properties suitable for making a filament.

In one example, the filament-forming material comprises one or more substituted polymers such as an anionic, cationic, zwitterionic, and/or nonionic polymer. In another example, the polymer may comprise a hydroxyl polymer, such as a polyvinyl alcohol ("PVOH") and/or a polysaccharide, such as starch and/or a starch derivative, such as an ethoxylated starch and/or acid-thinned starch. In another example, the polymer may comprise polyethylenes and/or terephthalates. In yet another example, the filament-forming material is a polar solvent-soluble material.

"Additive" as used herein means any material present in a filament that is not a filament-forming material. In one example, an additive comprises an active agent. In another example, an additive comprises a processing aid. In still another example, an additive comprises a filler. In one example, an additive comprises any material present in the filament that its absence from the filament would not result in the filament losing its filament structure, in other words, its absence does not result in the filament losing its solid form. In another example, an additive, for example an active agent, comprises a non-polymer material.

"Conditions of intended use" as used herein means the temperature, physical, chemical, and/or mechanical conditions that a filament is exposed to when the filament is used for one or more of its designed purposes. For example, if a filament and/or a nonwoven web comprising a filament is designed to be used in a washing machine for laundry care purposes, the conditions of intended use will include those temperature, chemical, physical and/or mechanical conditions present in a washing machine, including any wash water, during a laundry washing operation. In another example, if a filament and/or a nonwoven web comprising a filament is designed to be used by a human as a shampoo for hair care purposes, the conditions of intended use will include those temperature, chemical, physical and/or mechanical conditions present during the shampooing of the human's hair. Likewise, if a filament and/or nonwoven web comprising a filament is designed to be used in a dishwashing operation, by hand or by a dishwashing machine, the conditions of intended use will include the temperature, chemical, physical and/or mechanical conditions present in a dishwashing water and/or dishwashing machine, during the dishwashing operation.

"Active agent" as used herein means an additive that produces an intended effect in an environment external to a filament and/or nonwoven web comprising the filament of the present, such as when the filament is exposed to conditions of intended use of the filament and/or nonwoven web comprising the filament. In one example, an active agent comprises an additive that treats a surface, such as a hard surface (i.e., kitchen countertops, bath tubs, toilets, toilet bowls, sinks, floors, walls, teeth, cars, windows, mirrors, dishes) and/or a soft surface (i.e., fabric, hair, skin, carpet, crops, plants). In another example, an active agent comprises an additive that creates a chemical reaction (i.e., foaming, fizzing, coloring, warming, cooling, lathering, disinfecting and/or clarifying and/or chlorinating, such as in clarifying water and/or disinfecting water and/or chlorinating water). In yet another example, an active agent comprises an additive that treats an environment (i.e., deodorizes, purifies, perfumes air). In one example, the active agent is formed in situ, such as during the formation of the filament containing the active agent, for example the filament may comprise a water-soluble polymer (e.g., starch) and a surfactant (e.g., anionic surfactant), which may create a polymer complex or coacervate that functions as the active agent used to treat fabric surfaces.

"Fabric care active agent" as used herein means an active agent that when applied to fabric provides a benefit and/or improvement to the fabric. Non-limiting examples of benefits and/or improvements to fabric include cleaning (for example by surfactants), stain removal, stain reduction, wrinkle removal, color restoration, static control, wrinkle resistance, permanent press, wear reduction, wear resistance, pill removal, pill resistance, soil removal, soil resistance (including soil release), shape retention, shrinkage reduction, softness, fragrance, anti-bacterial, anti-viral, odor resistance, and odor removal.

"Dishwashing active agent" as used herein means an active agent that when applied to dishware, glassware, pots, pans, utensils, and/or cooking sheets provides a benefit and/or improvement to the dishware, glassware, plastic items, pots, pans and/or cooking sheets. Non-limiting example of benefits and/or improvements to the dishware, glassware, plastic items, pots, pans, utensils, and/or cooking sheets include food and/or soil removal, cleaning (for example by surfactants) stain removal, stain reduction, grease removal, water spot removal and/or water spot prevention, glass and metal care, sanitization, shining, and polishing.

"Hard surface active agent" as used herein means an active agent when applied to floors, countertops, sinks, windows, mirrors, showers, baths, and/or toilets provides a benefit and/or improvement to the floors, countertops, sinks, windows, mirrors, showers, baths, and/or toilets. Non-limiting example of benefits and/or improvements to the floors, countertops, sinks, windows, mirrors, showers, baths, and/or toilets include food and/or soil removal, cleaning (for example by surfactants), stain removal, stain reduction, grease removal, water spot removal and/or water spot prevention, limescale removal, disinfection, shining, polishing, and freshening.

"Weight ratio" as used herein means the dry filament basis and/or dry detergent product basis-forming material (g or %) on a dry weight basis in the filament to the weight of additive, such as active agent(s) (g or %) on a dry weight basis in the filament.

"Hydroxyl polymer" as used herein includes any hydroxyl-containing polymer that can be incorporated into a filament, for example as a filament-forming material. In one example, the hydroxyl polymer includes greater than 10% and/or greater than 20% and/or greater than 25% by weight hydroxyl moieties.

"Biodegradable" as used herein means, with respect to a material, such as a filament as a whole and/or a polymer within a filament, such as a filament-forming material, that the filament and/or polymer is capable of undergoing and/or does undergo physical, chemical, thermal and/or biological degradation in a municipal solid waste composting facility such that at least 5% and/or at least 7% and/or at least 10% of the original filament and/or polymer is converted into carbon dioxide after 30 days as measured according to the OECD (1992) Guideline for the Testing of Chemicals 301B; Ready Biodegradability—$CO_2$ Evolution (Modified Sturm Test) Test incorporated herein by reference.

"Non-biodegradable" as used herein means, with respect to a material, such as a filament as a whole and/or a polymer within a filament, such as a filament-forming material, that the filament and/or polymer is not capable of undergoing physical, chemical, thermal and/or biological degradation in a municipal solid waste composting facility such that at least 5% of the original filament and/or polymer is converted into carbon dioxide after 30 days as measured according to the OECD (1992) Guideline for the Testing of Chemicals 301B; Ready Biodegradability—$CO_2$ Evolution (Modified Sturm Test) Test incorporated herein by reference.

"Non-thermoplastic" as used herein means, with respect to a material, such as a filament as a whole and/or a polymer within a filament, such as a filament-forming material, that the filament and/or polymer exhibits no melting point and/or softening point, which allows it to flow under pressure, in the absence of a plasticizer, such as water, glycerin, sorbitol, urea and the like.

"Non-thermoplastic, biodegradable filament" as used herein means a filament that exhibits the properties of being biodegradable and non-thermoplastic as defined above.

"Non-thermoplastic, non-biodegradable filament" as used herein means a filament that exhibits the properties of being non-biodegradable and non-thermoplastic as defined above.

"Thermoplastic" as used herein means, with respect to a material, such as a filament as a whole and/or a polymer within a filament, such as a filament-forming material, that the filament and/or polymer exhibits a melting point and/or softening point at a certain temperature, which allows it to flow under pressure, in the absence of a plasticizer.

"Thermoplastic, biodegradable filament" as used herein means a filament that exhibits the properties of being biodegradable and thermoplastic as defined above.

"Thermoplastic, non-biodegradable filament" as used herein means a filament that exhibits the properties of being non-biodegradable and thermoplastic as defined above.

"Polar solvent-soluble material" as used herein means a material that is miscible in a polar solvent. In one example, a polar solvent-soluble material is miscible in alcohol and/or water. In other words, a polar solvent-soluble material is a material that is capable of forming a stable (does not phase separate for greater than 5 minutes after forming the homogeneous solution) homogeneous solution with a polar solvent, such as alcohol and/or water at ambient conditions.

"Alcohol-soluble material" as used herein means a material that is miscible in alcohol. In other words, a material that is capable of forming a stable (does not phase separate for greater than 5 minutes after forming the homogeneous solution) homogeneous solution with an alcohol at ambient conditions.

"Water-soluble material" as used herein means a material that is miscible in water. In other words, a material that is capable of forming a stable (does not separate for greater than 5 minutes after forming the homogeneous solution) homogeneous solution with water at ambient conditions.

"Non-polar solvent-soluble material" as used herein means a material that is miscible in a non-polar solvent. In other words, a non-polar solvent-soluble material is a material that is capable of forming a stable (does not phase separate for greater than 5 minutes after forming the homogeneous solution) homogeneous solution with a non-polar solvent.

"Ambient conditions" as used herein means 73° F.±4° F. (about 23° C.±2.2° C.) and a relative humidity of 50%±10%.

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121.

"Length" as used herein, with respect to a filament, means the length along the longest axis of the filament from one terminus to the other terminus. If a filament has a kink, curl or curves in it, then the length is the length along the entire path of the filament.

"Diameter" as used herein, with respect to a filament, is measured according to the Diameter Test Method described herein. In one example, a filament can exhibit a diameter of less than 100 μm and/or less than 75 μm and/or less than 50 μm and/or less than 25 μm and/or less than 20 μm and/or less than 15 μm and/or less than 10 μm and/or less than 6 μm and/or greater than 1 μm and/or greater than 3 μm.

"Triggering condition" as used herein in one example means anything, as an act or event, that serves as a stimulus and initiates or precipitates a change in the filament, such as a loss or altering of the filament's physical structure and/or a release of an additive, such as an active agent.

In another example, the triggering condition may be present in an environment, such as water, when a filament and/or nonwoven web and/or film is added to the water. In other words, nothing changes in the water except for the fact that the filament and/or nonwoven and/or film is added to the water.

"Morphology changes" as used herein with respect to a filament's morphology changing means that the filament experiences a change in its physical structure. Non-limiting examples of morphology changes for a filament include dissolution, melting, swelling, shrinking, breaking into pieces, exploding, lengthening, shortening, and combinations thereof. The filaments may completely or substantially lose their filament physical structure or they may have their morphology changed or they may retain or substantially retain their filament physical structure as they are exposed to conditions of intended use.

"Total level" as used herein, for example with respect to the total level of one or more active agents present in the filament and/or detergent product, means the sum of the weights or weight percent of all of the subject materials, for example active agents. In other words, a filament and/or detergent product may comprise 25% by weight on a dry filament basis and/or dry detergent product basis of an anionic surfactant, 15% by weight on a dry filament basis and/or dry detergent product basis of a nonionic surfactant, 10% by weight of a chelant, and 5% of a perfume so that the total level of active agents present in the filament is greater than 50%; namely 55% by weight on a dry filament basis and/or dry detergent product basis.

"Detergent product" as used herein means a solid form, for example a rectangular solid, sometimes referred to as a sheet, that comprises one or more active agents, for example a fabric care active agent, a dishwashing active agent, a hard surface active agent, and mixtures thereof. In one example, a detergent product can comprise one or more surfactants, one or more enzymes, one or more perfumes and/or one or more suds suppressors. In another example, a detergent product can comprise a builder and/or a chelating agent. In another example, a detergent product can comprise a bleaching agent.

"Web" as used herein means a collection of formed fibers and/or filaments, such as a fibrous structure, and/or a detergent product formed of fibers and/or filaments, such as continuous filaments, of any nature or origin associated with one another. In one example, the web is a rectangular solid comprising fibers and/or filaments that is formed via a spinning process, not a casting process.

"Nonwoven web" for purposes of the present disclosure as used herein and as defined generally by European Disposables and Nonwovens Association (EDANA) means a sheet of fibers and/or filaments, such as continuous filaments, of any nature or origin, that have been formed into a web by any means, and may be bonded together by any means, with the exception of weaving or knitting. Felts obtained by wet milling are not nonwoven webs. In one example, a nonwoven web means an orderly arrangement of filaments within a structure in order to perform a function. In one example, a nonwoven web is an arrangement comprising a plurality of two or more and/or three or more filaments that are inter-entangled or otherwise associated with one another to form a nonwoven web. In one example, a nonwoven web may comprise, in addition to the filaments, one or more solid additives, such as particulates and/or fibers.

"Particulates" as used herein means granular substances and/or powders. In one example, the filaments and/or fibers can be converted into powders.

"Equivalent diameter" is used herein to define a cross-sectional area and a surface area of an individual starch filament, without regard to the shape of the cross-sectional area. The equivalent diameter is a parameter that satisfies the equation $S=\frac{1}{4}\pi D^2$, where S is the filament's cross-sectional area (without regard to its geometrical shape), $\pi=3.14159$, and D is the equivalent diameter. For example, the cross-section having a rectangular shape formed by two mutually opposite sides "A" and two mutually opposite sides "B" can be expressed as: $S=A\times B$. At the same time, this cross-sectional area can be expressed as a circular area having the equivalent diameter D. Then, the equivalent diameter D can be calculated from the formula: $S=\frac{1}{4}\pi D^2$, where S is the known area of the rectangle. (Of course, the equivalent diameter of a circle is the circle's real diameter.) An equivalent radius is % of the equivalent diameter.

"Pseudo-thermoplastic" in conjunction with "materials" or "compositions" is intended to denote materials and compositions that by the influence of elevated temperatures, dissolution in an appropriate solvent, or otherwise can be softened to such a degree that they can be brought into a flowable state, in which condition they can be shaped as desired, and more specifically, processed to form starch filaments suitable for forming a fibrous structure. Pseudo-thermoplastic materials may be formed, for example, under combined influence of heat and pressure. Pseudo-thermoplastic materials differ from thermoplastic materials in that the softening or liquefying of the pseudo-thermoplastics is caused by softeners or solvents present, without which it would be impossible to bring them by any temperature or pressure into a soft or flowable condition necessary for shaping, since pseudo thermoplastics do not "melt" as such. The influence of water content on the glass transition temperature and melting temperature of starch can be measured by differential scanning calorimetery as described by Zeleznak and Hoseny in "Cereal Chemistry", Vol. 64, No. 2, pp. 121-124, 1987. Pseudo-thermoplastic melt is a pseudo-thermoplastic material in a flowable state.

"Micro-geometry" and permutations thereof refers to relatively small (i.e., "microscopical") details of a fibrous structure, such as, for example, surface texture, without regard to the structure's overall configuration, as opposed to its overall (i.e., "macroscopical") geometry. Terms containing "macroscopical" or "macroscopically" refer to an overall geometry of a structure, or a portion thereof, under consideration when it is placed in a two-dimensional configuration, such as the X-Y plane. For example, on a macroscopical level, the fibrous structure, when it is disposed on a flat surface, comprises a relatively thin and flat sheet. On a microscopical level, however, the structure can comprise a plurality of first regions that form a first plane having a first elevation, and a plurality of domes or "pillows" dispersed throughout and outwardly extending from the framework region to form a second elevation.

"Intensive properties" are properties which do not have a value dependent upon an aggregation of values within the plane of the fibrous structure. A common intensive property is an intensive property possessed by more than one region. Such intensive properties of the fibrous structure include, without limitation, density, basis weight, elevation, and opacity. For example, if a density is a common intensive property of two differential regions, a value of the density in one region can differ from a value of the density in the other region. Regions (such as, for example, a first region and a second region) are identifiable areas distinguishable from one another by distinct intensive properties.

"Glass transition temperature," $T_g$, is the temperature at which the material changes from a viscous or rubbery condition to a hard and relatively brittle condition.

"Machine direction" (or MD) is the direction parallel to the flow of the fibrous structure being made through the manufacturing equipment. "Cross-machine direction" (or CD) is the direction perpendicular to the machine direction and parallel to the general plane of the fibrous structure being made.

"X," "Y," and "Z" designate a conventional system of Cartesian coordinates, wherein mutually perpendicular coordinates "X" and "Y" define a reference X-Y plane, and "Z" defines an orthogonal to the X-Y plane. "Z-direction" designates any direction perpendicular to the X-Y plane. Analogously, the term "Z-dimension" means a dimension, distance, or parameter measured parallel to the Z-direction. When an element, such as, for example, a molding member curves or otherwise deplanes, the X-Y plane follows the configuration of the element.

"Substantially continuous" region refers to an area within which one can connect any two points by an uninterrupted line running entirely within that area throughout the line's length. That is, the substantially continuous region has a substantial "continuity" in all directions parallel to the first plane and is terminated only at edges of that region. The term "substantially," in conjunction with continuous, is intended to indicate that while an absolute continuity is preferred, minor deviations from the absolute continuity may be tolerable as long as those deviations do not appreciably affect the performance of the fibrous structure (or a molding member) as designed and intended.

"Substantially semi-continuous" region refers an area which has "continuity" in all, but at least one, directions parallel to the first plane, and in which area one cannot connect any two points by an uninterrupted line running entirely within that area throughout the line's length. The semi-continuous framework may have continuity only in one direction parallel to the first plane. By analogy with the continuous region, described above, while an absolute continuity in all, but at least one, directions is preferred, minor deviations from such a continuity may be tolerable as long as those deviations do not appreciably affect the performance of the fibrous structure.

"Discontinuous" regions refer to discrete, and separated from one another areas that are discontinuous in all directions parallel to the first plane.

"Flexibility" is the ability of a material or structure to deform under a given load without being broken, regardless of the ability or inability of the material or structure to return itself to its pre-deformation shape.

"Molding member" is a structural element that can be used as a support for the filaments that can be deposited thereon during a process of making a fibrous structure, and as a forming unit to form (or "mold") a desired microscopical geometry of a fibrous structure. The molding member may comprise any element that has the ability to impart a three-dimensional pattern to the structure being produced thereon, and includes, without limitation, a stationary plate, a belt, a cylinder/roll, a woven fabric, and a band.

"Melt-spinning" is a process by which a thermoplastic or pseudo-thermoplastic material is turned into fibrous material through the use of an attenuation force. Melt-spinning can include mechanical elongation, melt-blowing, spun-bonding, and electro-spinning.

"Mechanical elongation" is the process inducing a force on a fiber thread by having it come into contact which a driven surface, such as a roll, to apply a force to the melt thereby making fibers.

"Melt-blowing" is a process for producing fibrous webs or articles directly from polymers or resins using high-velocity air or another appropriate force to attenuate the filaments. In a melt-blowing process the attenuation force is applied in the form of high speed air as the material exits the die or spinnerette.

"Spun-bonding" comprises the process of allowing the fiber to drop a predetermined distance under the forces of flow and gravity and then applying a force via high velocity air or another appropriate source.

"Electro-spinning" is a process that uses electric potential as the force to attenuate the fibers.

"Dry-spinning," also commonly known as "solution-spinning," involves the use of solvent drying to stabilize fiber formation. A material is dissolved in an appropriate solvent and is attenuated via mechanical elongation, melt-blowing, spun-bonding, and/or electro-spinning. The fiber becomes stable as the solvent is evaporated.

"Wet-spinning" comprises dissolving a material in a suitable solvent and forming small fibers via mechanical elongation, melt-blowing, spun-bonding, and/or electro-spinning. As the fiber is formed it is run into a coagulation system normally comprising a bath filled with an appropriate solution that solidifies the desired material, thereby producing stable fibers.

"Melting temperature" means the temperature or the range of temperature at or above which the starch composition melts or softens sufficiently to be capable of being processed into starch filaments. It is to be understood that some starch compositions are pseudo-thermoplastic compositions and as such may not exhibit pure "melting" behavior.

"Basis Weight" as used herein is the weight per unit area of a sample reported in gsm and is measured according to the Basis Weight Test Method described herein.

"Fibrous structure" as used herein means a structure that comprises one or more fibrous filaments and/or fibers. In one example, a fibrous structure means an orderly arrangement of filaments and/or fibers within a structure in order to perform a function. Non-limiting examples of fibrous structures can include detergent products, fabrics (including woven, knitted, and non-woven), and absorbent pads (for example for diapers or feminine hygiene products). The fibrous structures of the present disclosure may be homogeneous or may be layered. If layered, the fibrous structures may comprise at least two and/or at least three and/or at least four and/or at least five layers, for example one or more fibrous element layers, one or more particle layers and/or one or more fibrous element/particle mixture layer.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

II. Fibrous Structures

Figure 3:
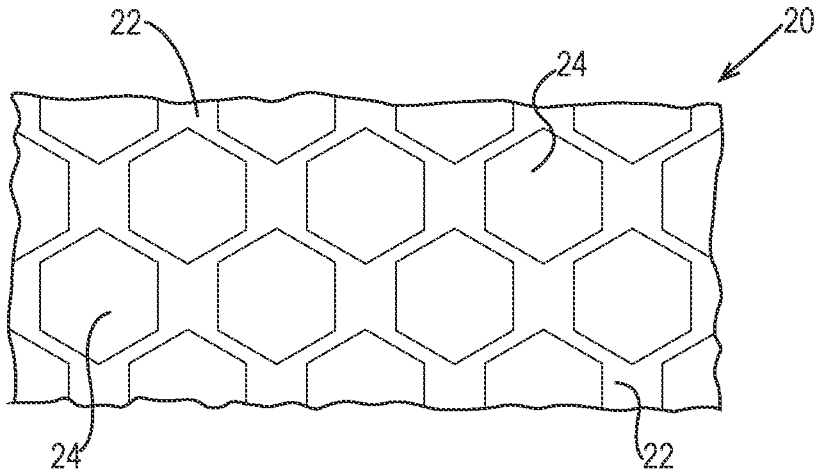
FIG. 3 is a schematic plan view of a portion of a fibrous structure.

As shown in FIG. 3, a fibrous structure 20 may be formed from filaments having at least a first region (e.g., a network region 22) and a second region (e.g., discrete zones 24). Each of the first and second regions has at least one common intensive property, such as, for example, a basis weight. The common intensive property of the first region can differ in value from the common intensive property of the second region. For example, the basis weight of the first region can be higher than the basis weight of the second region. FIG. 3 illustrates in plan view a portion of a fibrous structure 20 wherein the network region 22 is illustrated as defining hexagons, although it is to be understood that other preselected patterns can be used.

In certain embodiments, suitable fibrous structures can have a water content (% moisture) from 0% to about 20%; in certain embodiments, fibrous structures can have a water content from about 1% to about 15%; and in certain embodiments, fibrous structures can have a water content from about 5% to about 10%.

In certain embodiments, suitable fibrous structure can exhibit a geometric mean TEA of about 100 g*in/in$^2$ or more, and/or about 150 g*in/in$^2$ or more, and/or about 200 g*in/in$^2$ or more, and/or about 300 g*in/in$^2$ or more according to the Tensile Test Method described herein.

In certain embodiments, suitable fibrous structure can exhibit a geometric mean modulus of about 5000 g/cm or less, and/or 4000 g/cm or less, and/or about 3500 g/cm or less, and/or about 3000 g/cm or less, and/or about 2700 g/cm or less according to the Tensile Test Method described herein.

In certain embodiments, suitable fibrous structures as described herein can exhibit a geometric mean peak elongation of about 10% or greater, and/or about 20% or greater, and/or about 30% or greater, and/or about 50% or greater, and/or about 60% or greater, and/or about 65% or greater, and/or about 70% or greater as measured according to the Tensile Test Method described herein.

In certain embodiments, suitable fibrous structures as described herein can exhibit a geometric mean tensile strength of about 200 g/in or more, and/or about 300 g/in or more, and/or about 400 g/in or more, and/or about 500 g/in or more, and/or about 600 g/in or more as measure according to the Tensile Test Method described herein.

Other suitable arrangements of fibrous structures are described in U.S. Pat. No. 4,637,859 and U.S. Patent Application Publication No. 2003/0203196.

Additional, non-limiting examples of other suitable fibrous structures are disclosed in U.S. Patent Publication Nos. US2013/0172226A1; US2013/0171421A1; and US2013/0167305A1, hereby incorporated by reference herein.

The use of such fibrous structures having a graphic thereon as described herein as detergent products provides additional benefits from the prior art. By having at least two regions within the fibrous structure having different intensive properties, the fibrous structure can provide sufficient integrity prior to use, but during use (e.g., in washer) the fibrous structure can sufficiently dissolve and release the active agent. In addition, such fibrous structures are non-adhesive to any articles being washed (e.g., clothes), or washing machine surfaces, and such fibrous structures will not block the drainage unit of the washing machines.

A. Filaments

Filaments can include one or more filament-forming materials. In addition to the filament-forming materials, the filament may further comprise one or more active agents that are releasable from the filament, such as when the filament is exposed to conditions of intended use, wherein the total level of the one or more filament-forming materials present in the filament is less than 80% by weight on a dry filament basis and/or dry detergent product basis and the total level of the one or more active agents present in the filament is greater than 20% by weight on a dry filament basis and/or dry detergent product basis, is provided.

In another example, a filament may comprise one or more filament-forming materials and one or more active agents wherein the total level of filament-forming materials present in the filament can be from about 5% to less than 80% by weight on a dry filament basis and/or dry detergent product basis and the total level of active agents present in the filament can be greater than 20% to about 95% by weight on a dry filament basis and/or dry detergent product basis.

In one example, a filament may comprise at least 10% and/or at least 15% and/or at least 20% and/or less than less than 80% and/or less than 75% and/or less than 65% and/or less than 60% and/or less than 55% and/or less than 50% and/or less than 45% and/or less than 40% by weight on a dry filament basis and/or dry detergent product basis of the filament-forming materials and greater than 20% and/or at least 35% and/or at least 40% and/or at least 45% and/or at least 50% and/or at least 60% and/or less than 95% and/or less than 90% and/or less than 85% and/or less than 80% and/or less than 75% by weight on a dry filament basis and/or dry detergent product basis of active agents.

In one example, the filament can comprise at least 5% and/or at least 10% and/or at least 15% and/or at least 20% and/or less than 50% and/or less than 45% and/or less than 40% and/or less than 35% and/or less than 30% and/or less than 25% by weight on a dry filament basis and/or dry detergent product basis of the filament-forming materials and greater than 50% and/or at least 55% and/or at least 60% and/or at least 65% and/or at least 70% and/or less than 95% and/or less than 90% and/or less than 85% and/or less than 80% and/or less than 75% by weight on a dry filament basis and/or dry detergent product basis of active agents. In one example, the filament can comprise greater than 80% by weight on a dry filament basis and/or dry detergent product basis of active agents.

In another example, the one or more filament-forming materials and active agents are present in the filament at a weight ratio of total level of filament-forming materials to active agents of 4.0 or less and/or 3.5 or less and/or 3.0 or less and/or 2. 5 or less and/or 2.0 or less and/or 1.85 or less and/or less than 1.7 and/or less than 1.6 and/or less than 1.5 and/or less than 1.3 and/or less than 1.2 and/or less than 1 and/or less than 0.7 and/or less than 0.5 and/or less than 0.4 and/or less than 0.3 and/or greater than 0.1 and/or greater than 0.15 and/or greater than 0.2.

In still another example, a filament may comprise from about 10% and/or from about 15% to less than 80% by weight on a dry filament basis and/or dry detergent product basis of a filament-forming material, such as polyvinyl alcohol polymer and/or a starch polymer, and greater than 20% to about 90% and/or to about 85% by weight on a dry filament basis and/or dry detergent product basis of an active agent. The filament may further comprise a plasticizer, such as glycerin and/or pH adjusting agents, such as citric acid.

In yet another example, a filament may comprise from about 10% and/or from about 15% to less than 80% by weight on a dry filament basis and/or dry detergent product basis of a filament-forming material, such as polyvinyl alcohol polymer and/or a starch polymer, and greater than 20% to about 90% and/or to about 85% by weight on a dry filament basis and/or dry detergent product basis of an active agent, wherein the weight ratio of filament-forming material to active agent is 4.0 or less. The filament may further comprise a plasticizer, such as glycerin and/or pH adjusting agents, such as citric acid.

In even another example, a filament may comprise one or more filament-forming materials and one or more active agents selected from the group consisting of: enzymes, bleaching agents, builder, chelants, sensates, dispersants, and mixtures thereof that are releasable and/or released when the filament is exposed to conditions of intended use. In one example, the filament comprises a total level of filament forming materials of less than 95% and/or less than 90% and/or less than 80% and/or less than 50% and/or less than 35% and/or to about 5% and/or to about 10% and/or to about 20% by weight on a dry filament basis and/or dry detergent product basis and a total level of active agents selected from the group consisting of: enzymes, bleaching agents, builder, chelants, and mixtures thereof of greater than 5% and/or greater than 10% and/or greater than 20% and/or greater than 35% and/or greater than 50% and/or greater than 65% and/or to about 95% and/or to about 90% and/or to about 80% by weight on a dry filament basis and/or dry detergent product basis. In one example, the active agent comprises one or more enzymes. In another example, the active agent comprises one or more bleaching agents. In yet another example, the active agent comprises one or more builders. In still another example, the active agent comprises one or more chelants.

In yet another example, filaments may comprise active agents that may create health and/or safety concerns if they become airborne. For example, the filament may be used to inhibit enzymes within the filament from becoming airborne.

In one example, the filaments may be meltblown filaments. In another example, the filaments may be spunbond filaments. In another example, the filaments may be hollow filaments prior to and/or after release of one or more of its active agents.

Suitable filaments may be hydrophilic or hydrophobic. The filaments may be surface treated and/or internally treated to change the inherent hydrophilic or hydrophobic properties of the filament.

In one example, the filament exhibits a diameter of less than 100 μm and/or less than 75 μm and/or less than 50 μm and/or less than 30 μm and/or less than 10 μm and/or less than 5 μm and/or less than 1 μm as measured according to the Diameter Test Method described herein. In another example, the filament can exhibit a diameter of greater than 1 μm as measured according to the Diameter Test Method described herein. The diameter of a filament may be used to control the rate of release of one or more active agents present in the filament and/or the rate of loss and/or altering of the filament's physical structure.

The filament may comprise two or more different active agents. In one example, the filament comprises two or more different active agents, wherein the two or more different active agents are compatible with one another. In another example, a filament may comprise two or more different active agents, wherein the two or more different active agents are incompatible with one another.

In one example, the filament may comprise an active agent within the filament and an active agent on an external surface of the filament, such as coating on the filament. The active agent on the external surface of the filament may be the same or different from the active agent present in the filament. If different, the active agents may be compatible or incompatible with one another.

In one example, one or more active agents may be uniformly distributed or substantially uniformly distributed throughout the filament. In another example, one or more active agents may be distributed as discrete regions within the filament. In still another example, at least one active agent is distributed uniformly or substantially uniformly throughout the filament and at least another active agent is distributed as one or more discrete regions within the filament. In still yet another example, at least one active agent is distributed as one or more discrete regions within the filament and at least another active agent is distributed as one or more discrete regions different from the first discrete regions within the filament.

The filaments may be used as discrete articles. In one example, the filaments may be applied to and/or deposited on a carrier substrate, for example a wipe, paper towel, bath tissue, facial tissue, sanitary napkin, tampon, diaper, adult incontinence article, washcloth, dryer sheet, laundry sheet, laundry bar, dry cleaning sheet, netting, filter paper, fabrics, clothes, undergarments, and the like.

In addition, a plurality of the filaments may be collected and pressed into a film thus resulting in the film comprising the one or more filament-forming materials and the one or more active agents that are releasable from the film, such as when the film is exposed to conditions of intended use.

In one example, a fibrous structure having such filaments can exhibit an average disintegration time of about 60 seconds (s) or less, and/or about 30 s or less, and/or about 10 s or less, and/or about 5 s or less, and/or about 2.0 s or less, and/or 1.5 s or less as measured according to the Dissolution Test Method described herein.

In one example, a fibrous structure having such filaments can exhibit an average dissolution time of about 600 seconds (s) or less, and/or about 400 s or less, and/or about 300 s or less, and/or about 200 s or less, and/or about 175 s or less as measured according to the Dissolution Test Method described herein.

In one example, a fibrous structure having such filaments can exhibit an average disintegration time per gsm of sample of about 1.0 second/gsm (s/gsm) or less, and/or about 0.5 s/gsm or less, and/or about 0.2 s/gsm or less, and/or about 0.1 s/gsm or less, and/or about 0.05 s/gsm or less, and/or about 0.03 s/gsm or less as measured according to the Dissolution Test Method described herein.

In one example, a fibrous structure having such filaments can exhibit an average dissolution time per gsm of sample of about 10 seconds/gsm (s/gsm) or less, and/or about 5.0 s/gsm or less, and/or about 3.0 s/gsm or less, and/or about 2.0 s/gsm or less, and/or about 1.8 s/gsm or less, and/or about 1.5 s/gsm or less as measured according to the Dissolution Test Method described herein.

B. Filament-forming Material

A filament-forming material may include any suitable material, such as a polymer or monomers capable of producing a polymer that exhibits properties suitable for making a filament, such as by a spinning process.

In one example, the filament-forming material may comprise a polar solvent-soluble material, such as an alcohol-soluble material and/or a water-soluble material.

In another example, the filament-forming material may comprise a non-polar solvent-soluble material.

In still another example, the filament forming material may comprise a polar solvent-soluble material and be free (less than 5% and/or less than 3% and/or less than 1% and/or 0% by weight on a dry filament basis and/or dry detergent product basis) of non-polar solvent-soluble materials.

In yet another example, the filament-forming material may be a film-forming material. In still yet another example, the filament-forming material may be synthetic or of natural origin and it may be chemically, enzymatically, and/or physically modified.

In even another example, the filament-forming material may comprise a polymer selected from the group consisting of: polymers derived from acrylic monomers such as the ethylenically unsaturated carboxylic monomers and ethylenically unsaturated monomers, polyvinyl alcohol, polyacrylates, polymethacrylates, copolymers of acrylic acid and methyl acrylate, polyvinylpyrrolidones, polyalkylene oxides, starch and starch derivatives, pullulan, gelatin, hydroxypropylmethylcelluloses, methycelluloses, and carboxymethycelluloses.

In still another example, the filament-forming material may comprises a polymer selected from the group consisting of: polyvinyl alcohol, polyvinyl alcohol derivatives, carboxylated polyvinylalcohol, sulfonated polyvinyl alcohol, starch, starch derivatives, cellulose derivatives, hemicellulose, hemicellulose derivatives, proteins, sodium alginate, hydroxypropyl methylcellulose, chitosan, chitosan derivatives, polyethylene glycol, tetramethylene ether glycol, polyvinyl pyrrolidone, hydroxymethyl cellulose, hydroxyethyl cellulose, and mixtures thereof.

In another example, the filament-forming material comprises a polymer is selected from the group consisting of: pullulan, hydroxypropylmethyl cellulose, hydroxyethyl cellulose, hydroxypropyl cellulose, polyvinyl pyrrolidone, carboxymethyl cellulose, sodium alginate, xanthan gum, tragacanth gum, guar gum, acacia gum, Arabic gum, polyacrylic acid, methylmethacrylate copolymer, carboxyvinyl polymer, dextrin, pectin, chitin, levan, elsinan, collagen, gelatin, zein, gluten, soy protein, casein, polyvinyl alcohol, starch, starch derivatives, hemicellulose, hemicellulose derivatives, proteins, chitosan, chitosan derivatives, polyethylene glycol, tetramethylene ether glycol, hydroxymethyl cellulose, and mixtures thereof.

i. Polar Solvent-Soluble Materials

Non-limiting examples of polar solvent-soluble materials include polar solvent-soluble polymers. The polar solvent-soluble polymers may be synthetic or natural original and may be chemically and/or physically modified. In one example, the polar solvent-soluble polymers exhibit a weight average molecular weight of at least 10,000 g/mol and/or at least 20,000 g/mol and/or at least 40,000 g/mol and/or at least 80,000 g/mol and/or at least 100,000 g/mol and/or at least 1,000,000 g/mol and/or at least 3,000,000 g/mol and/or at least 10,000,000 g/mol and/or at least 20,000,000 g/mol and/or to about 40,000,000 g/mol and/or to about 30,000,000 g/mol.

In one example, the polar solvent-soluble polymers are selected from the group consisting of: alcohol-soluble polymers, water-soluble polymers and mixtures thereof. Non-limiting examples of water-soluble polymers include water-soluble hydroxyl polymers, water-soluble thermoplastic polymers, water-soluble biodegradable polymers, water-soluble non-biodegradable polymers and mixtures thereof. In one example, the water-soluble polymer comprises polyvinyl alcohol. In another example, the water-soluble polymer comprises starch. In yet another example, the water-soluble polymer comprises polyvinyl alcohol and starch.

a. Water-Soluble Hydroxyl Polymers

Non-limiting examples of water-soluble hydroxyl polymers can include polyols, such as polyvinyl alcohol, polyvinyl alcohol derivatives, polyvinyl alcohol copolymers, starch, starch derivatives, starch copolymers, chitosan, chitosan derivatives, chitosan copolymers, cellulose derivatives such as cellulose ether and ester derivatives, cellulose copolymers, hemicellulose, hemicellulose derivatives, hemicellulose copolymers, gums, arabinans, galactans, proteins and various other polysaccharides and mixtures thereof.

In one example, a water-soluble hydroxyl polymer can include a polysaccharide.

"Polysaccharides" as used herein means natural polysaccharides and polysaccharide derivatives and/or modified polysaccharides. Suitable water-soluble polysaccharides include, but are not limited to, starches, starch derivatives, chitosan, chitosan derivatives, cellulose derivatives, hemicellulose, hemicellulose derivatives, gums, arabinans, galactans and mixtures thereof. The water-soluble polysaccharide may exhibit a weight average molecular weight of from about 10,000 to about 40,000,000 g/mol and/or greater than 100,000 g/mol and/or greater than 1,000,000 g/mol and/or greater than 3,000,000 g/mol and/or greater than 3,000,000 to about 40,000,000 g/mol.

The water-soluble polysaccharides may comprise non-cellulose and/or non-cellulose derivative and/or non-cellulose copolymer water-soluble polysaccharides. Such non-cellulose water-soluble polysaccharides may be selected from the group consisting of: starches, starch derivatives, chitosan, chitosan derivatives, hemicellulose, hemicellulose derivatives, gums, arabinans, galactans and mixtures thereof.

In another example, a water-soluble hydroxyl polymer can comprise a non-thermoplastic polymer.

The water-soluble hydroxyl polymer may have a weight average molecular weight of from about 10,000 g/mol to about 40,000,000 g/mol and/or greater than 100,000 g/mol and/or greater than 1,000,000 g/mol and/or greater than 3,000,000 g/mol and/or greater than 3,000,000 g/mol to about 40,000,000 g/mol. Higher and lower molecular weight water-soluble hydroxyl polymers may be used in combination with hydroxyl polymers having a certain desired weight average molecular weight.

Well known modifications of water-soluble hydroxyl polymers, such as natural starches, include chemical modifications and/or enzymatic modifications. For example, natural starch can be acid-thinned, hydroxy-ethylated, hydroxy-propylated, and/or oxidized. In addition, the water-soluble hydroxyl polymer may comprise dent corn starch.

Naturally occurring starch is generally a mixture of linear amylose and branched amylopectin polymer of D-glucose units. The amylose is a substantially linear polymer of D-glucose units joined by (1,4)-α-D links. The amylopectin is a highly branched polymer of D-glucose units joined by (1,4)-α-D links and (1,6)-α-D links at the branch points. Naturally occurring starch typically contains relatively high levels of amylopectin, for example, corn starch (64-80% amylopectin), waxy maize (93-100% amylopectin), rice (83-84% amylopectin), potato (about 78% amylopectin), and wheat (73-83% amylopectin). Though all starches are potentially useful herein, most are commonly practiced with high amylopectin natural starches derived from agricultural sources, which offer the advantages of being abundant in supply, easily replenishable and inexpensive.

As used herein, "starch" includes any naturally occurring unmodified starches, modified starches, synthetic starches and mixtures thereof, as well as mixtures of the amylose or amylopectin fractions; the starch may be modified by physical, chemical, or biological processes, or combinations thereof. The choice of unmodified or modified starch may depend on the end product desired. In one embodiment, the starch or starch mixture useful has an amylopectin content from about 20% to about 100%, more typically from about 40% to about 90%, even more typically from about 60% to about 85% by weight of the starch or mixtures thereof.

Suitable naturally occurring starches can include, but are not limited to, corn starch, potato starch, sweet potato starch, wheat starch, sago palm starch, tapioca starch, rice starch, soybean starch, arrow root starch, amioca starch, bracken starch, lotus starch, waxy maize starch, and high amylose corn starch. Naturally occurring starches particularly, corn starch and wheat starch, are the preferred starch polymers due to their economy and availability.

Polyvinyl alcohols herein can be grafted with other monomers to modify its properties. A wide range of monomers has been successfully grafted to polyvinyl alcohol. Non-limiting examples of such monomers include vinyl acetate, styrene, acrylamide, acrylic acid, 2-hydroxyethyl methacrylate, acrylonitrile, 1,3-butadiene, methyl methacrylate, methacrylic acid, maleic acid, itaconic acid, sodium vinylsulfonate, sodium allylsulfonate, sodium methylallyl sulfonate, sodium phenylallylether sulfonate, sodium phenylmethallylether sulfonate, 2-acrylamido-methyl propane sulfonic acid (AMPs), vinylidene chloride, vinyl chloride, vinyl amine and a variety of acrylate esters.

In one example, the water-soluble hydroxyl polymer is selected from the group consisting of: polyvinyl alcohols, hydroxymethylcelluloses, hydroxyethylcelluloses, hydroxypropylmethylcelluloses and mixtures thereof. A non-limiting example of a suitable polyvinyl alcohol includes those commercially available from Sekisui Specialty Chemicals America, LLC (Dallas, TX) under the CELVOL® trade name. A non-limiting example of a suitable hydroxypropylmethylcellulose includes those commercially available from the Dow Chemical Company (Midland, MI) under the METHOCEL® trade name including combinations with above mentioned polyvinyl alcohols.

b. Water-Soluble Thermoplastic Polymers

Non-limiting examples of suitable water-soluble thermoplastic polymers include thermoplastic starch and/or starch derivatives, polylactic acid, polyhydroxyalkanoate, polycaprolactone, polyesteramides and certain polyesters, and mixtures thereof.

The water-soluble thermoplastic polymers may be hydrophilic or hydrophobic. The water-soluble thermoplastic polymers may be surface treated and/or internally treated to change the inherent hydrophilic or hydrophobic properties of the thermoplastic polymer.

The water-soluble thermoplastic polymers may comprise biodegradable polymers.

Any suitable weight average molecular weight for the thermoplastic polymers may be used. For example, the weight average molecular weight for a thermoplastic polymer can be greater than about 10,000 g/mol and/or greater than about 40,000 g/mol and/or greater than about 50,000 g/mol and/or less than about 500,000 g/mol and/or less than about 400,000 g/mol and/or less than about 200,000 g/mol.

ii. Non-Polar Solvent-Soluble Materials

Non-limiting examples of non-polar solvent-soluble materials include non-polar solvent-soluble polymers. Non-limiting examples of suitable non-polar solvent-soluble materials include cellulose, chitin, chitin derivatives, polyolefins, polyesters, copolymers thereof, and mixtures thereof. Non-limiting examples of polyolefins include polypropylene, polyethylene and mixtures thereof. A non-limiting example of a polyester includes polyethylene terephthalate.

The non-polar solvent-soluble materials may comprise a non-biodegradable polymer such as polypropylene, polyethylene and certain polyesters.

Any suitable weight average molecular weight for the thermoplastic polymers may be used. For example, the weight average molecular weight for a thermoplastic polymer can be greater than about 10,000 g/mol and/or greater than about 40,000 g/mol and/or greater than about 50,000 g/mol and/or less than about 500,000 g/mol and/or less than about 400,000 g/mol and/or less than about 200,000 g/mol.

C. Active Agents

Active agents are a class of additives that are designed and intended to provide a benefit to something other than the filament itself, such as providing a benefit to an environment external to the filament. Active agents may be any suitable additive that produces an intended effect under intended use conditions of the filament. For example, the active agent may be selected from the group consisting of: personal cleansing and/or conditioning agents such as hair care agents such as shampoo agents and/or hair colorant agents, hair conditioning agents, skin care agents, sunscreen agents, and skin conditioning agents; laundry care and/or conditioning agents such as fabric care agents, fabric conditioning agents, fabric softening agents, fabric anti-wrinkling agents, fabric care anti-static agents, fabric care stain removal agents, soil release agents, dispersing agents, suds suppressing agents, suds boosting agents, anti-foam agents, and fabric refreshing agents; liquid and/or powder dishwashing agents (for hand dishwashing and/or automatic dishwashing machine applications), hard surface care agents, and/or conditioning agents and/or polishing agents; other cleaning and/or conditioning agents such as antimicrobial agents, perfume, bleaching agents (such as oxygen bleaching agents, hydrogen peroxide, percarbonate bleaching agents, perborate bleaching agents, chlorine bleaching agents), bleach activating agents, chelating agents, builders, lotions, brightening agents, air care agents, carpet care agents, dye transfer-inhibiting agents, water-softening agents, water-hardening agents, pH adjusting agents, enzymes, flocculating agents, effervescent agents, preservatives, cosmetic agents, make-up removal agents, lathering agents, deposition aid agents, coacervate-forming agents, clays, thickening agents, latexes, silicas, drying agents, odor control agents, antiperspirant agents, cooling agents, warming agents, absorbent gel agents, anti-inflammatory agents, dyes, pigments, acids, and bases; liquid treatment active agents; agricultural active agents; industrial active agents; ingestible active agents such as medicinal agents, teeth whitening agents, tooth care agents, mouthwash agents, periodontal gum care agents, edible agents, dietary agents, vitamins, minerals; water-treatment agents such as water clarifying and/or water disinfecting agents, and mixtures thereof.

Non-limiting examples of suitable cosmetic agents, skin care agents, skin conditioning agents, hair care agents, and hair conditioning agents are described in CTFA Cosmetic Ingredient Handbook, Second Edition, The Cosmetic, Toiletries, and Fragrance Association, Inc. 1988, 1992.

One or more classes of chemicals may be useful for one or more of the active agents listed above. For example, surfactants may be used for any number of the active agents described above.

Likewise, bleaching agents may be used for fabric care, hard surface cleaning, dishwashing and even teeth whitening. Therefore, one of ordinary skill in the art will appreciate that the active agents will be selected based upon the desired intended use of the filament and/or nonwoven made therefrom.

For example, if a filament and/or nonwoven made therefrom is to be used for hair care and/or conditioning then one or more suitable surfactants, such as a lathering surfactant could be selected to provide the desired benefit to a consumer when exposed to conditions of intended use of the filament and/or nonwoven incorporating the filament.

In one example, if a filament and/or nonwoven made therefrom is designed or intended to be used for laundering clothes in a laundry operation, then one or more suitable surfactants and/or enzymes and/or builders and/or perfumes and/or suds suppressors and/or bleaching agents could be selected to provide the desired benefit to a consumer when exposed to conditions of intended use of the filament and/or nonwoven incorporating the filament. In another example, if the filament and/or nonwoven made therefrom is designed to be used for laundering clothes in a laundry operation and/or cleaning dishes in a dishwashing operation, then the filament may comprise a laundry detergent composition or dishwashing detergent composition.

In one example, the active agent comprises a non-perfume active agent. In another example, the active agent comprises a non-surfactant active agent. In still another example, the active agent comprises a non-ingestible active agent, in other words an active agent other than an ingestible active agent.

i. Surfactants

Non-limiting examples of suitable surfactants include anionic surfactants, cationic surfactants, nonionic surfactants, zwitterionic surfactants, amphoteric surfactants, and mixtures thereof. Co-surfactants may also be included in the filaments. For filaments designed for use as laundry detergents and/or dishwashing detergents, the total level of surfactants should be sufficient to provide cleaning including stain and/or odor removal, and generally ranges from about 0.5% to about 95%. Further, surfactant systems comprising two or more surfactants that are designed for use in filaments for laundry detergents and/or dishwashing detergents may include all-anionic surfactant systems, mixed-type surfactant systems comprising anionic-nonionic surfactant mixtures, or nonionic-cationic surfactant mixtures or low-foaming nonionic surfactants.

The surfactants herein can be linear or branched. In one example, suitable linear surfactants include those derived from agrochemical oils such as coconut oil, palm kernel oil, soybean oil, or other vegetable-based oils.

a. Anionic Surfactants

Non-limiting examples of suitable anionic surfactants include alkyl sulfates, alkyl ether sulfates, branched alkyl sulfates, branched alkyl alkoxylates, branched alkyl alkoxylate sulfates, mid-chain branched alkyl aryl sulfonates, sulfated monoglycerides, sulfonated olefins, alkyl aryl sulfonates, primary or secondary alkane sulfonates, alkyl sulfosuccinates, acyl taurates, acyl isethionates, alkyl glycerylether sulfonate, sulfonated methyl esters, sulfonated fatty acids, alkyl phosphates, acyl glutamates, acyl sarcosinates, alkyl sulfoacetates, acylated peptides, alkyl ether carboxylates, acyl lactylates, anionic fluorosurfactants, sodium lauroyl glutamate, and combinations thereof.

Alkyl sulfates and alkyl ether sulfates suitable for use herein include materials with the respective formula $ROSO_3M$ and $RO(C_2H_4O)_xSO_3M$, wherein R is alkyl or alkenyl of from about 8 to about 24 carbon atoms, x is 1 to 10, and M is a water-soluble cation such as ammonium, sodium, potassium and triethanolamine. Other suitable anionic surfactants are described in McCutcheon's Detergents and Emulsifiers, North American Edition (1986), Allured Publishing Corp. and McCutcheon's, Functional Materials, North American Edition (1992), Allured Publishing Corp.

In one example, anionic surfactants useful in the filaments can include $C_9$-$C_{15}$ alkyl benzene sulfonates (LAS), $C_8$-$C_{20}$ alkyl ether sulfates, for example alkyl poly(ethoxy) sulfates, $C_8$-$C_{20}$ alkyl sulfates, and mixtures thereof. Other anionic surfactants include methyl ester sulfonates (MES), secondary alkane sulfonates, methyl ester ethoxylates (MEE), sulfonated estolides, and mixtures thereof.

In another example, the anionic surfactant is selected from the group consisting of: $C_{11}$-$C_{18}$ alkyl benzene sulfonates ("LAS") and primary, branched-chain and random $C_{10}$-$C_{20}$ alkyl sulfates ("AS"), $C_{10}$-$C_{18}$ secondary (2,3) alkyl sulfates of the formula $CH_3(CH_2)_x(CHOSO_3^-M^+)$ $CH_3$ and $CH_3(CH_2)_y(CHOSO_3^-M^+)$ $CH_2CH_3$ where x and (y+1) are integers of at least about 7, preferably at least about 9, and M is a water-solubilizing cation, especially sodium, unsaturated sulfates such as oleyl sulfate, the $C_{10}$-$C_{18}$ alpha-sulfonated fatty acid esters, the $C_{10}$-$C_{18}$ sulfated alkyl polyglycosides, the $C_{10}$-$C_{18}$ alkyl alkoxy sulfates ("$AE_xS$") wherein x is from 1-30, and $C_{10}$-$C_{18}$ alkyl alkoxy carboxylates, for example comprising 1-5 ethoxy units, mid-chain branched alkyl sulfates as discussed in U.S. Pat. Nos. 6,020,303 and 6,060,443; mid-chain branched alkyl alkoxy sulfates as discussed in U.S. Pat. Nos. 6,008,181 and 6,020,303; modified alkylbenzene sulfonate (MLAS) as discussed in WO 99/05243, WO 99/05242 and WO 99/05244; methyl ester sulfonate (MES); and alpha-olefin sulfonate (AOS).

Other suitable anionic surfactants that may be used are alkyl ester sulfonate surfactants including sulfonated linear esters of $C_8$-$C_{20}$ carboxylic acids (i.e., fatty acids). Other suitable anionic surfactants that may be used include salts of soap, $C_8$-$C_{22}$ primary of secondary alkanesulfonates, $C_8$-$C_{24}$ olefinsulfonates, sulfonated polycarboxylic acids, $C_8$-$C_{24}$ alkylpolyglycolethersulfates (containing up to 10 moles of ethylene oxide); alkyl glycerol sulfonates, fatty acyl glycerol sulfonates, fatty oleoyl glycerol sulfates, alkyl phenol ethylene oxide ether sulfates, paraffin sulfonates, alkyl phosphates, isethionates such as the acyl isethionates, N-acyl taurates, alkyl succinamates and sulfosuccinates, monoesters of sulfosuccinates (for example saturated and unsaturated $C_{12}$-$C_{18}$ monoesters) and diesters of sulfosuccinates (for example saturated and unsaturated $C_6$-$C_{12}$ diesters), sulfates of alkylpolysaccharides such as the sulfates of alkylpolyglucoside, and alkyl polyethoxy carboxylates such as those of the formula $RO(CH_2CH_2O)_k$—$CH_2COO$-M+ wherein R is a $C_8$-$C_{22}$ alkyl, k is an integer from 0 to 10, and M is a soluble salt-forming cation.

Other exemplary anionic surfactants are the alkali metal salts of $C_{10}$-$C_{16}$ alkyl benzene sulfonic acids, preferably $C_{11}$-$C_{14}$ alkyl benzene sulfonic acids. In one example, the alkyl group is linear. Such linear alkyl benzene sulfonates are known as "LAS". Such surfactants and their preparation are described for example in U.S. Pat. Nos. 2,220,099 and 2,477,383. IN another example, the linear alkyl benzene sulfonates include the sodium and/or potassium linear straight chain alkylbenzene sulfonates in which the average number of carbon atoms in the alkyl group is from about 11 to 14. Sodium $C_{11}$-$C_{14}$ LAS, e.g., $C_{12}$ LAS, is a specific example of such surfactants.

Another exemplary type of anionic surfactant comprises linear or branched ethoxylated alkyl sulfate surfactants. Such materials, also known as alkyl ether sulfates or alkyl polyethoxylate sulfates, are those which correspond to the formula: $R'$—O—$(C_2H_4O)_n$—$SO_3M$ wherein R' is a $C_8$-$C_{20}$ alkyl group, n is from about 1 to 20, and M is a salt-forming cation. In a specific embodiment, R' is $C_{10}$-$C_{18}$ alkyl, n is from about 1 to 15, and M is sodium, potassium, ammonium, alkylammonium, or alkanolammonium. In more specific embodiments, R' is a $C_{12}$-$C_{16}$, n is from about 1 to 6 and M is sodium. The alkyl ether sulfates will generally be used in the form of mixtures comprising varying R' chain lengths and varying degrees of ethoxylation. Frequently such mixtures will inevitably also contain some non-ethoxylated alkyl sulfate materials, i.e., surfactants of the above ethoxylated alkyl sulfate formula wherein n=0. Non-ethoxylated alkyl sulfates may also be added separately to the compositions and used as or in any anionic surfactant component which may be present. Specific examples of non-alkoyxylated, e.g., non-ethoxylated, alkyl ether sulfate surfactants are those produced by the sulfation of higher $C_8$-$C_{20}$ fatty alcohols. Conventional primary alkyl sulfate surfactants have the general formula: $R''OSO_3^-M^+$ wherein R'' is typically a $C_8$-$C_{20}$ alkyl group, which may be straight chain or branched chain, and M is a water-solubilizing cation. In specific embodiments, R'' is a $C_{10}$-$C_{15}$ alkyl group, and M is alkali metal, more specifically R'' is $C_{12}$-$C_{14}$ alkyl and M is sodium. Specific, non-limiting examples of anionic surfactants useful herein include: a) $C_{11}$-$C_{15}$ alkyl benzene sulfonates (LAS); b) $C_{10}$-$C_{20}$ primary, branched-chain and random alkyl sulfates (AS); c) $C_{10}$-$C_{18}$ secondary (2,3)-alkyl sulfates having following formulae:

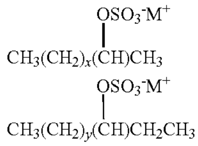

or wherein M is hydrogen or a cation which provides charge neutrality, and all M units, whether associated with a surfactant or adjunct ingredient, can either be a hydrogen atom or a cation depending upon the form isolated by the artisan or the relative pH of the system wherein the compound is used, with non-limiting examples of suitable cations including sodium, potassium, ammonium, and mixtures thereof, and x is an integer of at least 7 and/or at least about 9, and y is an integer of at least 8 and/or at least 9; d) $C_{10}$-$C_{18}$ alkyl alkoxy sulfates ($AE_zS$) wherein z, for example, is from 1-30; e) $C_{10}$-$C_{18}$ alkyl alkoxy carboxylates preferably comprising 1-5 ethoxy units; f) mid-chain branched alkyl sulfates as discussed in U.S. Pat. Nos. 6,020,303 and 6,060,443; g) mid-chain branched alkyl alkoxy sulfates as discussed in U.S. Pat. Nos. 6,008,181 and 6,020,303; h) modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; i) methyl ester sulfonate (MES); and j) alpha-olefin sulfonate (AOS).

b. Cationic Surfactants

Non-limiting examples of suitable cationic surfactants include, but are not limited to, those having the formula (I):

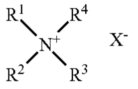

in which $R^1$, $R^2$, $R^3$, and $R^4$ are each independently selected from (a) an aliphatic group of from 1 to 26 carbon atoms, or (b) an aromatic, alkoxy, polyoxyalkylene, alkylamido, hydroxyalkyl, aryl or alkylaryl group having up to 22 carbon atoms; and X is a salt-forming anion such as those selected from halogen, (e.g. chloride, bromide), acetate, citrate, lactate, glycolate, phosphate, nitrate, sulphate, and alkylsulphate radicals. In one example, the alkylsulphate radical is methosulfate and/or ethosulfate.

Suitable quaternary ammonium cationic surfactants of general formula (I) may include cetyltrimethylammonium chloride, behenyltrimethylammonium chloride (BTAC), stearyltrimethylammonium chloride, cetylpyridinium chloride, octadecyltrimethylammonium chloride, hexadecyltrimethylammonium chloride, octyldimethylbenzylammonium chloride, decyldimethylbenzylammonium chloride, stearyldimethylbenzylammonium chloride, didodecyldimethylammonium chloride, didecyldimehtylammonium chloride, dioctadecyldimethylammonium chloride, distearyldimethylammonium chloride, tallowtrimethylammonium chloride, cocotrimethylammonium chloride, 2-ethylhexylstearyldimethylammonum chloride, dipalmitoylethyldimethylammonium chloride, PEG-2 oleylammonium chloride and salts of these, where the chloride is replaced by halogen, (e.g., bromide), acetate, citrate, lactate, glycolate, phosphate nitrate, sulphate, or alkylsulphate.

Non-limiting examples of suitable cationic surfactants are commercially available under the trade names ARQUAD® from Akzo Nobel Surfactants (Chicago, IL).

In one example, suitable cationic surfactants include quaternary ammonium surfactants, for example that have up to 26 carbon atoms include: alkoxylate quaternary ammonium (AQA) surfactants as discussed in U.S. Pat. No. 6,136,769; dimethyl hydroxyethyl quaternary ammonium as discussed in U.S. Pat. No. 6,004,922; dimethyl hydroxyethyl lauryl ammonium chloride; polyamine cationic surfactants as discussed in WO 98/35002, WO 98/35003, WO 98/35004, WO 98/35005, and WO 98/35006; cationic ester surfactants as discussed in U.S. Pat. Nos. 4,228,042, 4,239,660 4,260,529 and U.S. Pat. No. 6,022,844; and amino surfactants as discussed in U.S. Pat. No. 6,221,825 and WO 00/47708, for example amido propyldimethyl amine (APA).

Other suitable cationic surfactants include salts of primary, secondary, and tertiary fatty amines. In one embodiment, the alkyl groups of such amines have from about 12 to about 22 carbon atoms, and can be substituted or unsubstituted. These amines are typically used in combination with an acid to provide the cationic species.

The cationic surfactant may include cationic ester surfactants having the formula:

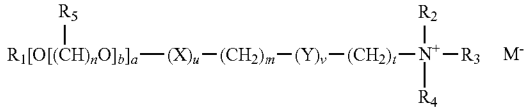

wherein $R_1$ is a $C_5$-$C_{31}$ linear or branched alkyl, alkenyl or alkaryl chain or $M^-{\cdot}N{+}(R_6R_7R_8)(CH_2)_s$; X and Y, independently, are selected from the group consisting of COO, OCO, O, CO, OCOO, CONH, NHCO, OCONH and NHCOO wherein at least one of X or Y is a COO, OCO, OCOO, OCONH or NHCOO group; $R_2$, $R_3$, $R_4$, $R_6$, $R_7$ and $R_8$ are independently selected from the group consisting of alkyl, alkenyl, hydroxyalkyl, hydroxyalkenyl and alkaryl groups having from 1 to 4 carbon atoms; and $R_5$ is independently H or a $C_1$-$C_3$ alkyl group; wherein the values of m, n, s and t independently lie in the range of from 0 to 8, the value of b lies in the range from 0 to 20, and the values of a, u and v independently are either 0 or 1 with the proviso that at least one of u or v must be 1; and wherein M is a counter anion. In one example, $R_2$, $R_3$ and $R_4$ are independently selected from $CH_3$ and —$CH_2CH_2OH$. In another example, M is selected from the group consisting of halide, methyl sulfate, sulfate, nitrate, chloride, bromide, or iodide.

The cationic surfactants may be chosen for use in personal cleansing applications. In one example, such cationic surfactants may be included in the filament and/or fiber at a total level by weight of from about 0.1% to about 10% and/or from about 0.5% to about 8% and/or from about 1% to about 5% and/or from about 1.4% to about 4%, in view of balance among ease-to-rinse feel, rheology and wet conditioning benefits. A variety of cationic surfactants including mono- and di-alkyl chain cationic surfactants can be used in the compositions. In one example, the cationic surfactants include mono-alkyl chain cationic surfactants in view of providing desired gel matrix and wet conditioning benefits. The mono-alkyl cationic surfactants are those having one long alkyl chain which has from 12 to 22 carbon atoms and/or from 16 to 22 carbon atoms and/or from 18 to 22 carbon atoms in its alkyl group, in view of providing balanced wet conditioning benefits. The remaining groups attached to nitrogen are independently selected from an alkyl group of from 1 to about 4 carbon atoms or an alkoxy, polyoxyalkylene, alkylamido, hydroxyalkyl, aryl or alkylaryl group having up to about 4 carbon atoms. Such mono-alkyl cationic surfactants include, for example, mono-alkyl quaternary ammonium salts and mono-alkyl amines. Mono-alkyl quaternary ammonium salts include, for example, those having a non-functionalized long alkyl chain. Mono-alkyl amines include, for example, mono-alkyl amidoamines and salts thereof. Other cationic surfactants such as di-alkyl chain cationic surfactants may also be used alone, or in combination with the mono-alkyl chain cationic surfactants. Such di-alkyl chain cationic surfactants include, for example, dialkyl (14-18) dimethyl ammonium chloride, ditallow alkyl dimethyl ammonium chloride, dihydrogenated tallow alkyl dimethyl ammonium chloride, distearyl dimethyl ammonium chloride, and dicetyl dimethyl ammonium chloride.

In one example the cationic ester surfactants are hydrolyzable under the conditions of a laundry wash.

c. Nonionic Surfactants

Non-limiting examples of suitable nonionic surfactants include alkoxylated alcohols (AE's) and alkyl phenols, polyhydroxy fatty acid amides (PFAA's), alkyl polyglycosides (APG's), $C_{10}$-$C_{18}$ glycerol ethers, and the like.

In one example, non-limiting examples of nonionic surfactants useful include: $C_{12}$-$C_{18}$ alkyl ethoxylates, such as, NEODOL® nonionic surfactants from Shell; $C_6$-$C_{12}$ alkyl phenol alkoxylates wherein the alkoxylate units are a mixture of ethyleneoxy and propyleneoxy units; $C_{12}$-$C_{18}$ alcohol and $C_6$-$C_{12}$ alkyl phenol condensates with ethylene oxide/propylene oxide block alkyl polyamine ethoxylates such as PLURONIC® from BASF; $C_{14}$-$C_{22}$ mid-chain branched alcohols, BA, as discussed in U.S. Pat. No. 6,150,322; $C_{14}$-$C_{22}$ mid-chain branched alkyl alkoxylates, BAEX, wherein x is from 1-30, as discussed in U.S. Pat. Nos. 6,153,577, 6,020,303 and 6,093,856; alkylpolysaccharides as discussed in U.S. Pat. No. 4,565,647 Llenado, issued Jan. 26, 1986; specifically alkylpolyglycosides as discussed in U.S. Pat. Nos. 4,483,780 and 4,483,779; polyhydroxy detergent acid amides as discussed in U.S. Pat. No. 5,332,528; and ether capped poly(oxyalkylated) alcohol surfactants as discussed in U.S. Pat. No. 6,482,994 and WO 01/42408.

Examples of commercially available nonionic surfactants suitable include: Tergitol® 15-S-9 (the condensation product of $C_{11}$-$C_{15}$ linear alcohol with 9 moles ethylene oxide) and Tergitol® 24-L-6 NMW (the condensation product of $C_{12}$-$C_{14}$ primary alcohol with 6 moles ethylene oxide with a narrow molecular weight distribution), both marketed by Dow Chemical Company; Neodol® 45-9 (the condensation product of $C_{14}$-$C_{15}$ linear alcohol with 9 moles of ethylene oxide), Neodol® 23-3 (the condensation product of $C_{12}$-$C_{13}$ linear alcohol with 3 moles of ethylene oxide), Neodol® 45-7 (the condensation product of $C_{14}$-$C_{15}$ linear alcohol with 7 moles of ethylene oxide) and Neodol® 45-5 (the condensation product of $C_{14}$-$C_{15}$ linear alcohol with 5 moles of ethylene oxide) marketed by Shell Chemical Company; Kyro® EOB (the condensation product of $C_{13}$-$C_{15}$ alcohol with 9 moles ethylene oxide), marketed by The Procter & Gamble Company; and Genapol LA O3O or O5O (the condensation product of $C_{12}$-$C_{14}$ alcohol with 3 or 5 moles of ethylene oxide) marketed by Hoechst. The nonionic surfactants may exhibit an HLB range of from about 8 to about 17 and/or from about 8 to about 14. Condensates with propylene oxide and/or butylene oxides may also be used.

Non-limiting examples of semi-polar nonionic surfactants useful include: water-soluble amine oxides containing one alkyl moiety of from about 10 to about 18 carbon atoms and 2 moieties selected from the group consisting of alkyl moieties and hydroxyalkyl moieties containing from about 1 to about 3 carbon atoms; water-soluble phosphine oxides containing one alkyl moiety of from about 10 to about 18 carbon atoms and 2 moieties selected from the group consisting of alkyl moieties and hydroxyalkyl moieties containing from about 1 to about 3 carbon atoms; and water-soluble sulfoxides containing one alkyl moiety of from about 10 to about 18 carbon atoms and a moiety selected from the group consisting of alkyl moieties and hydroxyalkyl moieties of from about 1 to about 3 carbon atoms. See WO 01/32816, U.S. Pat. Nos. 4,681,704, and 4,133,779.

Another class of nonionic surfactants that may be used include polyhydroxy fatty acid amide surfactants of the following formula:

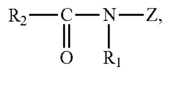

wherein $R^1$ is H, or $C_{1-4}$ hydrocarbyl, 2-hydroxy ethyl, 2-hydroxy propyl or a mixture thereof, $R_2$ is $C_{5-31}$ hydrocarbyl, and Z is a polyhydroxyhydrocarbyl having a linear hydrocarbyl chain with at least 3 hydroxyls directly connected to the chain, or an alkoxylated derivative thereof. In one example, $R^1$ is methyl, $R_2$ is a straight $C_{11-15}$ alkyl or $C_{15-17}$ alkyl or alkenyl chain such as coconut alkyl or mixtures thereof, and Z is derived from a reducing sugar such as glucose, fructose, maltose, lactose, in a reductive amination reaction. Typical examples include the $C_{12}$-$C_{18}$ and $C_{12}$-$C_{14}$ N-methylglucamides.

Alkylpolyaccharide surfactants may also be used as a nonionic surfactant.

Polyethylene, polypropylene, and polybutylene oxide condensates of alkyl phenols are also suitable for use as a nonionic surfactant. These compounds include the condensation products of alkyl phenols having an alkyl group containing from about 6 to about 14 carbon atoms, in either a straight-chain or branched-chain configuration with the alkylene oxide. Commercially available nonionic surfactants of this type include Igepal® CO-630, marketed by the GAF Corporation; and Triton® X-45, X-114, X-100 and X-102, all marketed by the Dow Chemical Company.

For automatic dishwashing applications, low foaming nonionic surfactants may be used.

Suitable low foaming nonionic surfactants are disclosed in U.S. Pat. No. 7,271,138 col. 7, line 10 to col. 7, line 60.

Examples of other suitable nonionic surfactants are the commercially-available Pluronic® surfactants, marketed by BASF, the commercially available Tetronic® compounds, marketed by BASF, and the commercially available Plurafac surfactants, marketed by BASF.

d. Zwitterionic Surfactants

Non-limiting examples of zwitterionic or ampholytic surfactants include: derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 at column 19, line 38 through column 22, line 48, for examples of zwitterionic surfactants; betaines, including alkyl dimethyl betaine and cocodimethyl amidopropyl betaine, $C_8$ to $C_{18}$ (for example from $C_{12}$ to $C_{18}$) amine oxides and sulfo and hydroxy betaines, such as N-alkyl-N,N-dimethylammino-1-propane sulfonate where the alkyl group can be $C_8$ to $C_{18}$ and in certain embodiments from $C_{10}$ to $C_{14}$.

e. Amphoteric Surfactants

Non-limiting examples of amphoteric surfactants include: aliphatic derivatives of secondary or tertiary amines, or aliphatic derivatives of heterocyclic secondary and tertiary amines in which the aliphatic radical can be straight- or branched-chain and mixtures thereof. One of the aliphatic substituents may contain at least about 8 carbon atoms, for example from about 8 to about 18 carbon atoms, and at least one contains an anionic water-solubilizing group, e.g. carboxy, sulfonate, sulfate. See U.S. Pat. No. 3,929,678 at column 19, lines 18-35, for suitable examples of amphoteric surfactants.

f. Co-Surfactants

In addition to the surfactants described above, the filaments may also contain co-surfactants. In the case of laundry detergents and/or dishwashing detergents, they typically contain a mixture of surfactant types in order to obtain broad-scale cleaning performance over a variety of soils and stains and under a variety of usage conditions. A wide range of these co-surfactants can be used in the filaments. A typical listing of anionic, nonionic, ampholytic and zwitterionic classes, and species of these co-surfactants, is given herein above, and may also be found in U.S. Pat. No. 3,664,961. In other words, the surfactant systems herein may also include one or more co-surfactants selected from nonionic, cationic, anionic, zwitterionic or mixtures thereof. The selection of co-surfactant may be dependent upon the desired benefit. The surfactant system may comprise from 0% to about 10%, or from about 0.1% to about 5%, or from about 1% to about 4% by weight of the composition of other co-surfactant(s).

g. Amine-Neutralized Anionic Surfactants

The anionic surfactants and/or anionic co-surfactants may exist in an acid form, which may be neutralized to form a surfactant salt. In one example, the filaments may comprise a surfactant salt form. Typical agents for neutralization include a metal counterion base such as hydroxides, e.g., NaOH or KOH. Other agents for neutralizing the anionic surfactants and anionic co-surfactants in their acid forms include ammonia, amines, or alkanolamines. In one example, the neutralizing agent comprises an alkanolamine, for example an alkanolamine selected from the group consisting of: monoethanolamine, diethanolamine, triethanolamine, and other linear or branched alkanolamines known in the art; for example, 2-amino-1-propanol, 1-aminopropanol, monoisopropanolamine, or 1-amino-3-propanol. Amine neutralization may be done to a full or partial extent, e.g. part of the anionic surfactant mix may be neutralized with sodium or potassium and part of the anionic surfactant mix may be neutralized with amines or alkanolamines.

ii. Perfumes

One or more perfume and/or perfume raw materials such as accords and/or notes may be incorporated into one or more of the filaments. The perfume may comprise a perfume ingredient selected from the group consisting of: aldehyde perfume ingredients, ketone perfume ingredients, and mixtures thereof.

One or more perfumes and/or perfumery ingredients may be included in the filaments. A wide variety of natural and synthetic chemical ingredients useful as perfumes and/or perfumery ingredients include but not limited to aldehydes, ketones, esters, and mixtures thereof. Also included are various natural extracts and essences which can comprise complex mixtures of ingredients, such as orange oil, lemon oil, rose extract, lavender, musk, patchouli, balsamic essence, sandalwood oil, pine oil, cedar, and the like. Finished perfumes can comprise extremely complex mixtures of such ingredients. In one example, a finished perfume typically comprises from about 0.01% to about 2%, by weight on a dry filament basis and/or dry web material basis.

iii. Perfume Delivery Systems

Certain perfume delivery systems, methods of making certain perfume delivery systems and the uses of such perfume delivery systems are disclosed in U.S. Patent Application Publication No. 2007/0275866. Non-limiting examples of perfume delivery systems include the following:

Polymer Assisted Delivery (PAD): This perfume delivery technology uses polymeric materials to deliver perfume materials. Classical coacervation, water soluble or partly soluble to insoluble charged or neutral polymers, liquid crystals, hot melts, hydrogels, perfumed plastics, microcapsules, nano- and micro-latexes, polymeric film formers, and polymeric absorbents, polymeric adsorbents, etc. are some examples. PAD includes but is not limited to:

a.) Matrix Systems: The fragrance is dissolved or dispersed in a polymer matrix or particle. Perfumes, for example, may be 1) dispersed into the polymer prior to formulating into the product or 2) added separately from the polymer during or after formulation of the product. Diffusion of perfume from the polymer is a common trigger that allows or increases the rate of perfume release from a polymeric matrix system that is deposited or applied to the desired surface (situs), although many other triggers are know that may control perfume release. Absorption and/or adsorption into or onto polymeric particles, films, solutions, and the like are aspects of this technology. Nano- or micro-particles composed of organic materials (e.g., latexes) are examples. Suitable particles include a wide range of materials including, but not limited to polyacetal, polyacrylate, polyacrylic, polyacrylonitrile, polyamide, polyaryletherketone, polybutadiene, polybutylene, polybutylene terephthalate, polychloroprene, poly ethylene, polyethylene terephthalate, polycyclohexylene dimethylene terephthalate, polycarbonate, polychloroprene, polyhydroxyalkanoate, polyketone, polyester, polyethylene, polyetherimide, polyethersulfone, polyethylenechlorinates, polyimide, polyisoprene, polylactic acid, polymethylpentene, polyphenylene oxide, polyphenylene sulfide, polyphthalamide, polypropylene, polystyrene, polysulfone, polyvinyl acetate, polyvinyl chloride, as well as polymers or copolymers based on acrylonitrile-butadiene, cellulose acetate, ethylene-vinyl acetate, ethylene vinyl alcohol, styrene-butadiene, vinyl acetate-ethylene, and mixtures thereof.

"Standard" systems refer to those that are "pre-loaded" with the intent of keeping the pre-loaded perfume associated with the polymer until the moment or moments of perfume release. Such polymers may also suppress the neat product odor and provide a bloom and/or longevity benefit depending on the rate of perfume release. One challenge with such systems is to achieve the ideal balance between 1) in-product stability (keeping perfume inside carrier until you need it) and 2) timely release (during use or from dry situs). Achieving such stability is particularly important during in-product storage and product aging. This challenge is particularly apparent for aqueous-based, surfactant-containing products, such as heavy duty liquid laundry detergents. Many "Standard" matrix systems available effectively become "Equilibrium" systems when formulated into aqueous-based products. One may select an "Equilibrium" system or a Reservoir system, which has acceptable in-product diffusion stability and available triggers for release (e.g., friction). "Equilibrium" systems are those in which the perfume and polymer may be added separately to the product, and the equilibrium interaction between perfume and polymer leads to a benefit at one or more consumer touch points (versus a free perfume control that has no polymer-assisted delivery technology). The polymer may also be pre-loaded with perfume; however, part or all of the perfume may diffuse during in-product storage reaching an equilibrium that includes having desired perfume raw materials (PRMs) associated with the polymer. The polymer then carries the perfume to the surface, and release is typically via perfume diffusion. The use of such equilibrium system polymers has the potential to decrease the neat product odor intensity of the neat product (usually more so in the case of pre-loaded standard system). Deposition of such polymers may serve to "flatten" the release profile and provide increased longevity. As indicated above, such longevity would be achieved by suppressing the initial intensity and may enable the formulator to use more high impact or low odor detection threshold (ODT) or low Kovats Index (KI) PRMs to achieve FMOT benefits without initial intensity that is too strong or distorted. It is important that perfume release occurs within the time frame of the application to impact the desired consumer touch point or touch points. Suitable micro-particles and micro-latexes as well as methods of making same may be found in USPA 2005/0003980 A1. Matrix systems also include hot melt adhesives and perfume plastics. In addition, hydrophobically modified polysaccharides may be formulated into the perfumed product to increase perfume deposition and/or modify perfume release. All such matrix systems, including for example polysaccharides and nanolatexes may be combined with other PDTs, including other PAD systems such as PAD reservoir systems in the form of a perfume microcapsule (PMC). Polymer Assisted Delivery (PAD) matrix systems may include those described in the following references: U.S. Patent Application Publication Nos. 2004/0110648 A1; 2004/0092414 A1; 2004/0091445 A1 and 2004/0087476 A1; and U.S. Pat. Nos. 6,531,444; 6,024,943; 6,042,792; 6,051,540; 4,540,721 and 4,973,422.

Silicones are also examples of polymers that may be used as PDT, and can provide perfume benefits in a manner similar to the polymer-assisted delivery "matrix system". Such a PDT is referred to as silicone-assisted delivery (SAD). One may pre-load silicones with perfume, or use them as an equilibrium system as described for PAD. Suitable silicones as well as making same may be found in WO 2005/102261; U.S. Patent Application Publication No. 2005/0124530A1; U.S. Patent Application Publication No. 2005/0143282A1; and WO 2003/015736. Functionalized silicones may also be used as described in U.S. Patent Application Publication No. 2006/003913 A1. Examples of silicones include polydimethylsiloxane and polyalkyldimethylsiloxanes. Other examples include those with amine functionality, which may be used to provide benefits associated with amine-assisted delivery (AAD) and/or polymer-assisted delivery (PAD) and/or amine-reaction products (ARP). Other such examples may be found in U.S. Pat. No. 4,911,852; and U.S. Patent Application Nos. 2004/0058845 A1; 2004/0092425 A1 and 2005/0003980 A1.

b.) Reservoir Systems: Reservoir systems are also known as a core-shell type technology, or one in which the fragrance is surrounded by a perfume release controlling membrane, which may serve as a protective shell. The material inside the microcapsule is referred to as the core, internal phase, or fill, whereas the wall is sometimes called a shell, coating, or membrane. Microparticles or pressure sensitive capsules or microcapsules are examples of this technology. Microcapsules of the current invention are formed by a variety of procedures that include, but are not limited to, coating, extrusion, spray-drying, interfacial, in-situ and matrix polymerization. The possible shell materials vary widely in their stability toward water. Among the most stable are polyoxymethyleneurea (PMU)-based materials, which may hold certain PRMs for even long periods of time in aqueous solution (or product). Such systems include but are not limited to urea-formaldehyde and/or melamine-formaldehyde. Stable shell materials include polyacrylate-based materials obtained as reaction product of an oil soluble or dispersible amine with a multifunctional acrylate or methacrylate monomer or oligomer, an oil soluble acid and an initiator, in presence of an anionic emulsifier comprising a water soluble or water dispersible acrylic acid alkyl acid copolymer, an alkali or alkali salt. Gelatin-based microcapsules may be prepared so that they dissolve quickly or slowly in water, depending for example on the degree of cross-linking. Many other capsule wall materials are available and vary in the degree of perfume diffusion stability observed. Without wishing to be bound by theory, the rate of release of perfume from a capsule, for example, once deposited on a surface is typically in reverse order of in-product perfume diffusion stability. As such, urea-formaldehyde and melamine-formaldehyde microcapsules for example, typically require a release mechanism other than, or in addition to, diffusion for release, such as mechanical force (e.g., friction, pressure, shear stress) that serves to break the capsule and increase the rate of perfume (fragrance) release. Other triggers include melting, dissolution, hydrolysis or other chemical reaction, electromagnetic radiation, and the like. The use of pre-loaded microcapsules requires the proper ratio of in-product stability and in-use and/or on-surface (on-situs) release, as well as proper selection of PRMs. Microcapsules that are based on urea-formaldehyde and/or melamine-formaldehyde are relatively stable, especially in near neutral aqueous-based solutions. These materials may require a friction trigger which may not be applicable to all product applications. Other microcapsule materials (e.g., gelatin) may be unstable in aqueous-based products and may even provide reduced benefit (versus free perfume control) when in-product aged. Scratch and sniff technologies are yet another example of PAD. Perfume microcapsules (PMC) may include those described in the following references: U.S. Patent Application Publication Nos.: 2003/0125222 A1; 2003/215417 A1; 2003/216488 A1; 2003/158344 A1; 2003/165692 A1; 2004/071742 A1; 2004/071746 A1; 2004/072719 A1; 2004/072720 A1; 2006/0039934 A1; 2003/203829 A1; 2003/195133 A1; 2004/087477 A1; 2004/0106536 A1; and U.S. Pat. Nos. 6,645,479 B1; 6,200,949 B1; U.S. Pat. Nos. 4,882,220; 4,917,920; 4,514,461; 6,106,875 and 4,234,627, 3,594,328 and U.S. Pat. No. RE 32713, PCT Patent Application: WO 2009/134234 A1, WO 2006/127454 A2, WO 2010/079466 A2, WO 2010/079467 A2, WO 2010/079468 A2, WO 2010/084480 A2.

Molecule-Assisted Delivery (MAD): Non-polymer materials or molecules may also serve to improve the delivery of perfume. Without wishing to be bound by theory, perfume may non-covalently interact with organic materials, resulting in altered deposition and/or release. Non-limiting examples of such organic materials include but are not limited to hydrophobic materials such as organic oils, waxes, mineral oils, petrolatum, fatty acids or esters, sugars, surfactants, liposomes and even other perfume raw material (perfume oils), as well as natural oils, including body and/or other soils. Perfume fixatives are yet another example. In one aspect, non-polymeric materials or molecules have a C Log P greater than about 2. Molecule-Assisted Delivery (MAD) may also include those described in U.S. Pat. Nos. 7,119,060 and 5,506,201.

Fiber-Assisted Delivery (FAD): The choice or use of a situs itself may serve to improve the delivery of perfume. In fact, the situs itself may be a perfume delivery technology. For example, different fabric types such as cotton or polyester will have different properties with respect to ability to attract and/or retain and/or release perfume. The amount of perfume deposited on or in fibers may be altered by the choice of fiber, and also by the history or treatment of the fiber, as well as by any fiber coatings or treatments. Fibers may be woven and non-woven as well as natural or synthetic. Natural fibers include those produced by plants, animals, and geological processes, and include but are not limited to cellulose materials such as cotton, linen, hemp jute, flax, ramie, and sisal, and fibers used to manufacture paper and cloth. Fiber-Assisted Delivery may consist of the use of wood fiber, such as thermomechanical pulp and bleached or unbleached kraft or sulfite pulps. Animal fibers consist largely of particular proteins, such as silk, sinew, catgut and hair (including wool). Polymer fibers based on synthetic chemicals include but are not limited to polyamide nylon, PET or PBT polyester, phenol-formaldehyde (PF), polyvinyl alcohol fiber (PVOH), polyvinyl chloride fiber (PVC), polyolefins (PP and PE), and acrylic polymers. All such fibers may be pre-loaded with a perfume, and then added to a product that may or may not contain free perfume and/or one or more perfume delivery technologies. In one aspect, the fibers may be added to a product prior to being loaded with a perfume, and then loaded with a perfume by adding a perfume that may diffuse into the fiber, to the product. Without wishing to be bound by theory, the perfume may absorb onto or be absorbed into the fiber, for example, during product storage, and then be released at one or more moments of truth or consumer touch points.

Amine Assisted Delivery (AAD): The amine-assisted delivery technology approach utilizes materials that contain an amine group to increase perfume deposition or modify perfume release during product use. There is no requirement in this approach to pre-complex or pre-react the perfume raw material(s) and amine prior to addition to the product. In one aspect, amine-containing AAD materials suitable for use herein may be non-aromatic; for example, polyalkylimine, such as polyethyleneimine (PEI), or polyvinylamine (PVAm), or aromatic, for example, anthranilates. Such materials may also be polymeric or non-polymeric. In one aspect, such materials contain at least one primary amine. This technology will allow increased longevity and controlled release also of low ODT perfume notes (e.g., aldehydes, ketones, enones) via amine functionality, and delivery of other PRMs, without being bound by theory, via polymer-assisted delivery for polymeric amines. Without technology, volatile top notes can be lost too quickly, leaving a higher ratio of middle and base notes to top notes. The use of a polymeric amine allows higher levels of top notes and other PRMS to be used to obtain freshness longevity without causing neat product odor to be more intense than desired, or allows top notes and other PRMs to be used more efficiently. In one aspect, AAD systems are effective at delivering PRMs at pH greater than about neutral. Without wishing to be bound by theory, conditions in which more of the amines of the AAD system are deprotonated may result in an increased affinity of the deprotonated amines for PRMs such as aldehydes and ketones, including unsaturated ketones and enones such as damascone. In another aspect, polymeric amines are effective at delivering PRMs at pH less than about neutral. Without wishing to be bound by theory, conditions in which more of the amines of the AAD system are protonated may result in a decreased affinity of the protonated amines for PRMs such as aldehydes and ketones, and a strong affinity of the polymer framework for a broad range of PRMs. In such an aspect, polymer-assisted delivery may be delivering more of the perfume benefit; such systems are a subspecies of AAD and may be referred to as Amine- Polymer-Assisted Delivery or APAD. In some cases when the APAD is employed in a composition that has a pH of less than seven, such APAD systems may also be considered Polymer-Assisted Delivery (PAD). In yet another aspect, AAD and PAD systems may interact with other materials, such as anionic surfactants or polymers to form coacervate and/or coacervates-like systems. In another aspect, a material that contains a heteroatom other than nitrogen, for example sulfur, phosphorus or selenium, may be used as an alternative to amine compounds. In yet another aspect, the aforementioned alternative compounds can be used in combination with amine compounds. In yet another aspect, a single molecule may comprise an amine moiety and one or more of the alternative heteroatom moieties, for example, thiols, phosphines and selenols. Suitable AAD systems as well as methods of making same may be found in U.S. Patent Application Publication Nos. 2005/0003980 A1; 2003/0199422 A1; 2003/0036489 A1; 2004/0220074 A1 and U.S. Pat. No. 6,103,678.

Cyclodextrin Delivery System (CD): This technology approach uses a cyclic oligosaccharide or cyclodextrin to improve the delivery of perfume. Typically a perfume and cyclodextrin (CD) complex is formed. Such complexes may be preformed, formed in-situ, or formed on or in the situs. Without wishing to be bound by theory, loss of water may serve to shift the equilibrium toward the CD-Perfume complex, especially if other adjunct ingredients (e.g., surfactant) are not present at high concentration to compete with the perfume for the cyclodextrin cavity. A bloom benefit may be achieved if water exposure or an increase in moisture content occurs at a later time point. In addition, cyclodextrin allows the perfume formulator increased flexibility in selection of PRMs. Cyclodextrin may be pre-loaded with perfume or added separately from perfume to obtain the desired perfume stability, deposition or release benefit. Suitable CDs as well as methods of making same may be found in U.S. Patent Application Publication Nos. 2005/0003980 A1 and 2006/0263313 A1 and U.S. Pat. Nos. 5,552,378; 3,812,011; 4,317,881; 4,418,144 and 4,378,923.

Starch Encapsulated Accord (SEA): The use of a starch encapsulated accord (SEA) technology allows one to modify the properties of the perfume, for example, by converting a liquid perfume into a solid by adding ingredients such as starch. The benefit includes increased perfume retention during product storage, especially under non-aqueous conditions. Upon exposure to moisture, a perfume bloom may be triggered. Benefits at other moments of truth may also be achieved because the starch allows the product formulator to select PRMs or PRM concentrations that normally cannot be used without the presence of SEA. Another technology example includes the use of other organic and inorganic materials, such as silica to convert perfume from liquid to solid. Suitable SEAs as well as methods of making same may be found in U.S. Patent Application Publication No. 2005/0003980 A1 and U.S. Pat. No. 6,458,754 B1.

Inorganic Carrier Delivery System (ZIC): This technology relates to the use of porous zeolites or other inorganic materials to deliver perfumes. Perfume-loaded zeolite may be used with or without adjunct ingredients used for example to coat the perfume-loaded zeolite (PLZ) to change its perfume release properties during product storage or during use or from the dry situs. Suitable zeolite and inorganic carriers as well as methods of making same may be found in U.S. Patent Application Publication No. 2005/0003980 A1 and U.S. Pat. Nos. 5,858,959; 6,245,732 B1; U.S. Pat. Nos. 6,048,830 and 4,539,135. Silica is another form of ZIC. Another example of a suitable inorganic carrier includes inorganic tubules, where the perfume or other active material is contained within the lumen of the nano- or micro-tubules. In one aspect, the perfume-loaded inorganic tubule (or Perfume-Loaded Tubule or PLT) is a mineral nano- or micro-tubule, such as halloysite or mixtures of halloysite with other inorganic materials, including other clays. The PLT technology may also comprise additional ingredients on the inside and/or outside of the tubule for the purpose of improving in-product diffusion stability, deposition on the desired situs or for controlling the release rate of the loaded perfume. Monomeric and/or polymeric materials, including starch encapsulation, may be used to coat, plug, cap, or otherwise encapsulate the PLT. Suitable PLT systems as well as methods of making same may be found in U.S. Pat. No. 5,651,976.

Pro-Perfume (PP): This technology refers to perfume technologies that result from the reaction of perfume materials with other substrates or chemicals to form materials that have a covalent bond between one or more PRMs and one or more carriers. The PRM is converted into a new material called a pro-PRM (i.e., pro-perfume), which then may release the original PRM upon exposure to a trigger such as water or light. Pro-perfumes may provide enhanced perfume delivery properties such as increased perfume deposition, longevity, stability, retention, and the like. Pro-perfumes include those that are monomeric (non-polymeric) or polymeric, and may be pre-formed or may be formed in-situ under equilibrium conditions, such as those that may be present during in-product storage or on the wet or dry situs. Nonlimiting examples of pro-perfumes include Michael adducts (e.g., beta-amino ketones), aromatic or non-aromatic imines (Schiff bases), oxazolidines, beta-keto esters, and orthoesters. Another aspect includes compounds comprising one or more beta-oxy or beta-thio carbonyl moieties capable of releasing a PRM, for example, an alpha, beta-unsaturated ketone, aldehyde or carboxylic ester. The typical trigger for perfume release is exposure to water; although other triggers may include enzymes, heat, light, pH change, autoxidation, a shift of equilibrium, change in concentration or ionic strength and others. For aqueous-based products, light-triggered pro-perfumes are particularly suited. Such photo-pro-perfumes (PPPs) include but are not limited to those that release coumarin derivatives and perfumes and/or pro-perfumes upon being triggered. The released pro-perfume may release one or more PRMs by means of any of the above mentioned triggers. In one aspect, the photo-pro-perfume releases a nitrogen-based pro-perfume when exposed to a light and/or moisture trigger. In another aspect, the nitrogen-based pro-perfume, released from the photo-pro-perfume, releases one or more PRMs selected, for example, from aldehydes, ketones (including enones) and alcohols. In still another aspect, the PPP releases a dihydroxy coumarin derivative. The light-triggered pro-perfume may also be an ester that releases a coumarin derivative and a perfume alcohol. In one aspect the pro-perfume is a dimethoxybenzoin derivative as described in U.S. Patent Application Publication No. 2006/0020459 A1. In another aspect the pro-perfume is a 3', 5'-dimethoxybenzoin (DMB) derivative that releases an alcohol upon exposure to electromagnetic radiation. In yet another aspect, the pro-perfume releases one or more low ODT PRMs, including tertiary alcohols such as linalool, tetrahydrolinalool, or dihydromyrcenol. Suitable pro-perfumes and methods of making same can be found in U.S. Pat. Nos. 7,018,978 B2; 6,987,084 B2; 6,956,013 B2; 6,861,402 B1; 6,544,945 B1; 6,093,691; 6,277,796 B1; 6,165,953; 6,316,397 B1; 6,437,150 B1; 6,479,682 B1; 6,096,918; 6,218,355 B1; U.S. Pat. Nos. 6,133,228; 6,147,037; 7,109,153 B2; 7,071,151 B2; 6,987,084 B2; 6,610,646 B2 and 5,958,870, as well as can be found in U.S. Patent Application Publication Nos. 2005/0003980 A1 and 2006/0223726 A1.

Amine Reaction Product (ARP): For purposes of the present application, ARP is a subclass or species of PP. One may also use "reactive" polymeric amines in which the amine functionality is pre-reacted with one or more PRMs to form an amine reaction product (ARP). Typically the reactive amines are primary and/or secondary amines, and may be part of a polymer or a monomer (non-polymer). Such ARPs may also be mixed with additional PRMs to provide benefits of polymer-assisted delivery and/or amine-assisted delivery. Nonlimiting examples of polymeric amines include polymers based on polyalkylimines, such as polyethyleneimine (PEI), or polyvinylamine (PVAm). Nonlimiting examples of monomeric (non-polymeric) amines include hydroxyl amines, such as 2-aminoethanol and its alkyl substituted derivatives, and aromatic amines such as anthranilates. The ARPs may be premixed with perfume or added separately in leave-on or rinse-off applications. In another aspect, a material that contains a heteroatom other than nitrogen, for example oxygen, sulfur, phosphorus or selenium, may be used as an alternative to amine compounds. In yet another aspect, the aforementioned alternative compounds can be used in combination with amine compounds. In yet another aspect, a single molecule may comprise an amine moiety and one or more of the alternative heteroatom moieties, for example, thiols, phosphines and selenols. The benefit may include improved delivery of perfume as well as controlled perfume release. Suitable ARPs as well as methods of making same can be found in U.S. Patent Application Publication No. 2005/0003980 A1 and U.S. Pat. No. 6,413,920 B1.

iv. Bleaching Agents

Filaments may comprise one or more bleaching agents. Non-limiting examples of suitable bleaching agents include peroxyacids, perborate, percarbonate, chlorine bleaches, oxygen bleaches, hypohalite bleaches, bleach precursors, bleach activators, bleach catalysts, hydrogen peroxide, bleach boosters, photobleaches, bleaching enzymes, free radical initiators, peroxygen bleaches, and mixtures thereof.

One or more bleaching agents may be included in the filaments may be included at a level from about 1% to about 30% and/or from about 5% to about 20% by weight on a dry filament basis and/or dry web material basis. If present, bleach activators may be present in the filaments at a level from about 0.1% to about 60% and/or from about 0.5% to about 40% by weight on a dry filament basis and/or dry web material basis.

Non-limiting examples of bleaching agents include oxygen bleach, perborate bleach, percarboxylic acid bleach and salts thereof, peroxygen bleach, persulfate bleach, percarbonate bleach, and mixtures thereof. Further, non-limiting examples of bleaching agents are disclosed in U.S. Pat. No. 4,483,781, U.S. patent application Ser. No. 740,446, European Patent Application 0 133 354, U.S. Pat. Nos. 4,412,934, and 4,634,551.

Non-limiting examples of bleach activators (e.g., acyl lactam activators) are disclosed in U.S. Pat. Nos. 4,915,854; 4,412,934; 4,634,551; and 4,966,723.

In one example, the bleaching agent comprises a transition metal bleach catalyst, which may be encapsulated. The transition metal bleach catalyst typically comprises a transition metal ion, for example a transition metal ion from a transition metal selected from the group consisting of: Mn(II), Mn(III), Mn(IV), Mn(V), Fe(II), Fe(III), Fe(IV), Co(I), Co(II), Co(III), Ni(I), Ni(II), Ni(III), Cu(I), Cu(II), Cu(III), Cr(II), Cr(III), Cr(IV), Cr(V), Cr(VI), V(III), V(IV), V(V), Mo(IV), Mo(V), Mo(VI), W(IV), W(V), W(VI), Pd(II), Ru(II), Ru(III), and Ru(IV). In one example, the transition metal is selected from the group consisting of: Mn(II), Mn(III), Mn(IV), Fe(II), Fe(III), Cr(II), Cr(III), Cr(IV), Cr(V), and Cr(VI). The transition metal bleach catalyst typically comprises a ligand, for example a macropolycyclic ligand, such as a cross-bridged macropolycyclic ligand. The transition metal ion may be coordinated with the ligand. Further, the ligand may comprise at least four donor atoms, at least two of which are bridgehead donor atoms. Non-limiting examples of suitable transition metal bleach catalysts are described in U.S. Pat. Nos. 5,580,485, 4,430,243; 4,728,455; 5,246,621; 5,244,594; 5,284,944; 5,194,416; 5,246,612; 5,256,779; 5,280,117; 5,274,147; 5,153,161; 5,227,084; 5,114,606; 5,114,611, EP 549,271 A1; EP 544,490 A1; EP 549,272 A1; and EP 544,440 A2. In one example, a suitable transition metal bleach catalyst comprises a manganese-based catalyst, for example disclosed in U.S. Pat. No. 5,576,282. In another example, suitable cobalt bleach catalysts are described, in U.S. Pat. Nos. 5,597,936 and 5,595,967. Such cobalt catalysts are readily prepared by known procedures, such as taught for example in U.S. Pat. Nos. 5,597,936, and 5,595,967. In yet another, suitable transition metal bleach catalysts comprise a transition metal complex of ligand such as bispidones described in WO 05/042532 A1.

Bleaching agents other than oxygen bleaching agents are also known in the art and can be utilized herein (e.g., photoactivated bleaching agents such as the sulfonated zinc and/or aluminum phthalocyanines (U.S. Pat. No. 4,033,718, incorporated herein by reference)), and/or pre-formed organic peracids, such as peroxycarboxylic acid or salt thereof, and/or peroxysulphonic acids or salts thereof. In one example, a suitable organic peracid comprises phthaloylimidoperoxycaproic acid or salt thereof. When present, the photoactivated bleaching agents, such as sulfonated zinc phthalocyanine, may be present in the filaments at a level from about 0.025% to about 1.25% by weight on a dry filament basis and/or dry web material basis.

v. Brighteners

Any optical brighteners or other brightening or whitening agents known in the art may be incorporated in the filaments at levels from about 0.01% to about 1.2% by weight on a dry filament basis and/or dry web material basis. Commercial optical brighteners which may be useful can be classified into subgroups, which include, but are not necessarily limited to, derivatives of stilbene, pyrazoline, coumarin, carboxylic acid, methinecyanines, dibenzothiophene-5,5-dioxide, azoles, 5- and 6-membered-ring heterocycles, and other miscellaneous agents. Examples of such brighteners are disclosed in "The Production and Application of Fluorescent Brightening Agents", M. Zahradnik, Published by John Wiley & Sons, New York (1982). Specific nonlimiting examples of optical brighteners which are useful in the present compositions are those identified in U.S. Pat. Nos. 4,790,856 and 3,646,015.

vi. Fabric Hueing Agents

Filaments may include fabric hueing agents. Non-limiting examples of suitable fabric hueing agents include small molecule dyes and polymeric dyes. Suitable small molecule dyes include small molecule dyes selected from the group consisting of dyes falling into the Colour Index (C.I.) classifications of Direct Blue, Direct Red, Direct Violet, Acid Blue, Acid Red, Acid Violet, Basic Blue, Basic Violet and Basic Red, or mixtures thereof. In another example, suitable polymeric dyes include polymeric dyes selected from the group consisting of fabric-substantive colorants sold under the name of Liquitint® (Milliken, Spartanburg, South Carolina, USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® (Milliken, Spartanburg, South Carolina, USA) Violet CT, carboxymethyl cellulose (CMC) conjugated with a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof.

Non-limiting examples of useful hueing dyes include those found in U.S. Pat. Nos. 7,205,269; 7,208,459; and 7,674,757 B2. For example, fabric hueing dyes may be selected from the group consisting of: triarylmethane blue and violet basic dyes, methine blue and violet basic dyes, anthraquinone blue and violet basic dyes, azo dyes basic blue 16, basic blue 65, basic blue 66 basic blue 67, basic blue 71, basic blue 159, basic violet 19, basic violet 35, basic violet 38, basic violet 48, oxazine dyes, basic blue 3, basic blue 75, basic blue 95, basic blue 122, basic blue 124, basic blue 141, Nile blue A and xanthene dye basic violet 10, an alkoxylated triphenylmethane polymeric colorant; an alkoxylated thiopene polymeric colorant; thiazolium dye; and mixtures thereof.

In one example, a fabric hueing dye includes the whitening agents found in WO 08/87497 A1. These whitening agents may be characterized by the following structure (I):

(I)

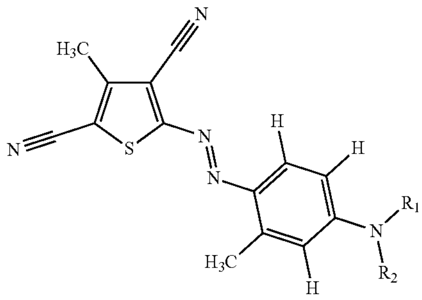

wherein $R_1$ and $R_2$ can independently be selected from:

a) $[(CH_2CR^1HO)_x(CH_2CR''HO)_yH]$
  wherein R' is selected from the group consisting of H, $CH_3$, $CH_2O(CH_2CH_2O)_zH$, and mixtures thereof, wherein R'' is selected from the group consisting of H, $CH_2O(CH_2CH_2O)_zH$, and mixtures thereof, wherein $x+y \leq 5$; wherein $y \geq 1$; and wherein $z=0$ to 5;

b) $R_1$=alkyl, aryl or aryl alkyl and $R_2=[(CH_2CR^1HO)_x(CH_2CR''HO)_yH]$
  wherein R' is selected from the group consisting of H, $CH_3$, $CH_2O(CH_2CH_2O)_zH$, and mixtures thereof, wherein R'' is selected from the group consisting of H, $CH_2O(CH_2CH_2O)_zH$, and mixtures thereof; wherein $x+y \leq 10$; wherein $y \geq 1$; and wherein $z=0$ to 5;

c) $R_1=[CH_2CH_2(OR_3)CH_2OR_4]$ and $R_2=[CH_2CH_2(OR_3)CH_2OR_4]$
  wherein $R_3$ is selected from the group consisting of H, $(CH_2CH_2O)_zH$, and mixtures thereof; and wherein $z=0$ to 10;
  wherein $R_4$ is selected from the group consisting of $(C_1\text{-}C_{16})$alkyl, aryl groups, and mixtures thereof; and d) wherein R1 and R2 can independently be selected from the amino addition product of styrene oxide, glycidyl methyl ether, isobutyl glycidyl ether, isopropylglycidyl ether, t-butyl glycidyl ether, 2-ethylhexylgycidyl ether, and glycidylhexadecyl ether, followed by the addition of from 1 to 10 alkylene oxide units.

In another example, a suitable whitening agent may be characterized by the following structure (II):

(II)

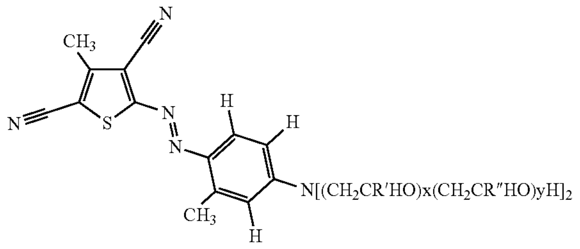

wherein R' is selected from the group consisting of H, $CH_3$, $CH_2O(CH_2CH_2O)_zH$, and mixtures thereof; wherein R'' is selected from the group consisting of H, $CH_2O(CH_2CH_2O)_zH$, and mixtures thereof, wherein $x+y\leq5$; wherein $y\geq1$; and wherein z=0 to 5.

In yet another example, a suitable whitening agent may be characterized by the following structure (III):

(III)

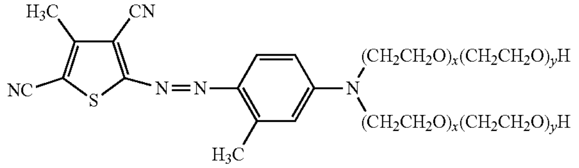

This whitening agent is commonly referred to as "Violet DD". Violet DD is typically a mixture having a total of 5 EO groups. This structure is arrived by the following selection in Structure I of the following pendant groups shown in Table I below in "part a" above:

TABLE I

| | R1 | | | | R2 | | | |
|---|---|---|---|---|---|---|---|---|
| . | R' | R'' | X | y | R' | R'' | X | y |
| a | H | H | 3 | 1 | H | H | 0 | 1 |
| b | H | H | 2 | 1 | H | H | 1 | 1 |
| c = b | H | H | 1 | 1 | H | H | 2 | 1 |
| d = a | H | H | 0 | 1 | H | H | 3 | 1 |

Further whitening agents of use include those described in US2008/34511 A1 (Unilever). In one example, the whitening agent comprises "Violet 13".

vii. Dye Transfer Inhibiting Agents

Filaments may include one or more dye transfer inhibiting agents that inhibit transfer of dyes from one fabric to another during a cleaning process. Generally, such dye transfer inhibiting agents include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents typically comprise from about 0.01% to about 10% and/or from about 0.01% to about 5% and/or from about 0.05% to about 2% by weight on a dry filament basis and/or dry web material basis.

viii. Chelating Agents

Filaments may contain one or more chelating agents, for example one or more iron and/or manganese and/or other metal ion chelating agents. Such chelating agents can be selected from the group consisting of: amino carboxylates, amino phosphonates, polyfunctionally-substituted aromatic chelating agents and mixtures thereof. If utilized, these chelating agents will generally comprise from about 0.1% to about 15% and/or from about 0.1% to about 10% and/or from about 0.1% to about 5% and/or from about 0.1% to about 3% by weight on a dry filament basis and/or dry web material basis.

The chelating agents may be chosen by one skilled in the art to provide for heavy metal (e.g. Fe) sequestration without negatively impacting enzyme stability through the excessive binding of calcium ions. Non-limiting examples of chelating agents are found in U.S. Pat. Nos. 7,445,644, 7,585,376 and US 2009/0176684A1.

Useful chelating agents include heavy metal chelating agents, such as diethylenetriaminepentaacetic acid (DTPA) and/or a catechol including, but not limited to, Tiron. In embodiments in which a dual chelating agent system is used, the chelating agents may be DTPA and Tiron.

DTPA has the following core molecular structure:

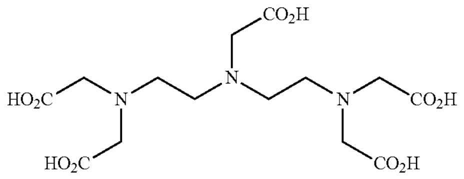 [SMILES: O=C(O)CN(CCN(CC(=O)O)CC(=O)O)CCN(CC(=O)O)CC(=O)O]

Tiron, also known as 1,2-diydroxybenzene-3,5-disulfonic acid, is one member of the catechol family and has the core molecular structure shown below:

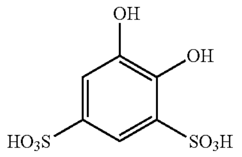

Other sulphonated catechols are of use. In addition to the disulfonic acid, the term "tiron" may also include mono- or di-sulfonate salts of the acid, such as, for example, the disodium sulfonate salt, which shares the same core molecular structure with the disulfonic acid.

Other chelating agents suitable for use herein can be selected from the group consisting of: aminocarboxylates, aminophosphonates, polyfunctionally-substituted aromatic chelating agents and mixtures thereof. In one example, the chelating agents include but are not limited to: HEDP (hydroxyethanedimethylenephosphonic acid); MGDA (methylglycinediacetic acid); GLDA (glutamic-N,N-diacetic acid); and mixtures thereof.

Without intending to be bound by theory, it is believed that the benefit of these materials is due in part to their exceptional ability to remove heavy metal ions from washing solutions by formation of soluble chelates; other benefits include inorganic film or scale prevention. Other suitable chelating agents for use herein are the commercial DEQUEST series, and chelants from Monsanto, DuPont, and Nalco, Inc.

Aminocarboxylates useful as chelating agents include, but are not limited to, ethylenediaminetetracetates, N-(hydroxyethyl)ethylenediaminetriacetates, nitrilotriacetates, ethylenediamine tetraproprionates, triethylenetetraaminehexacetates, diethylenetriamine-pentaacetates, and ethanoldiglycines, alkali metal, ammonium, and substituted ammonium salts thereof and mixtures thereof. Aminophosphonates are also suitable for use as chelating agents in the compositions of the invention when at least low levels of total phosphorus are permitted in the filaments, and include ethylenediaminetetrakis (methylenephosphonates). In one example, these aminophosphonates do not contain alkyl or alkenyl groups with more than about 6 carbon atoms. Polyfunctionally-substituted aromatic chelating agents are also useful in the compositions herein. See U.S. Pat. No. 3,812,044, issued May 21, 1974, to Connor et al. Non-limiting examples of compounds of this type in acid form are dihydroxydisulfobenzenes such as 1,2-dihydroxy-3,5-disulfobenzene.

In one example, a biodegradable chelating agent comprises ethylenediamine disuccinate ("EDDS"), for example the [S,S] isomer as described in U.S. Pat. No. 4,704,233. The trisodium salt of EDDS may be used. In another example, the magnesium salts of EDDS may also be used.

One or more chelating agents may be present in the filaments at a level from about 0.2% to about 0.7% and/or from about 0.3% to about 0.6% by weight on a dry filament basis and/or dry web material basis.

ix. Suds Suppressors

Compounds for reducing or suppressing the formation of suds can be incorporated into the filaments. Suds suppression can be of particular importance in the so-called "high concentration cleaning process" as described in U.S. Pat. Nos. 4,489,455 and 4,489,574, and in front-loading-style washing machines.

A wide variety of materials may be used as suds suppressors, and suds suppressors are well known to those skilled in the art. See, for example, Kirk Othmer Encyclopedia of Chemical Technology, Third Edition, Volume 7, pages 430-447 (John Wiley & Sons, Inc., 1979). Examples of suds suppressors include monocarboxylic fatty acid and soluble salts therein, high molecular weight hydrocarbons such as paraffin, fatty acid esters (e.g., fatty acid triglycerides), fatty acid esters of monovalent alcohols, aliphatic $C_{18}$-$C_{40}$ ketones (e.g., stearone), N-alkylated amino triazines, waxy hydrocarbons preferably having a melting point below about 100° C., silicone suds suppressors, and secondary alcohols. Suds suppressors are described in U.S. Pat. Nos. 2,954,347; 4,265,779; 4,265,779; 3,455,839; 3,933,672; 4,652,392; 4,978,471; 4,983,316; 5,288,431; 4,639,489; 4,749,740; and 4,798,679; 4,075,118; European Patent Application No. 89307851.9; EP 150,872; and DOS 2,124,526.

For any filaments and/or fibrous structures comprising such filaments designed to be used in automatic laundry washing machines, suds should not form to the extent that they overflow the washing machine. Suds suppressors, when utilized, are preferably present in a "suds suppressing amount. By "suds suppressing amount" is meant that the formulator of the composition can select an amount of this suds controlling agent that will sufficiently control the suds to result in a low-sudsing laundry detergent for use in automatic laundry washing machines.

The filaments herein will generally comprise from 0% to about 10% by weight on a dry filament basis and/or dry web material basis of suds suppressors. When utilized as suds suppressors, for example monocarboxylic fatty acids, and salts therein, may be present in amounts up to about 5% and/or from about 0.5% to about 3% by weight on a dry filament basis and/or dry web material basis. When utilized, silicone suds suppressors are typically used in the filaments at a level up to about 2.0% by weight on a dry filament basis and/or dry web material basis, although higher amounts may be used. When utilized, monostearyl phosphate suds suppressors are typically used in the filaments at a level from about 0.1% to about 2% by weight on a dry filament basis and/or dry web material basis. When utilized, hydrocarbon suds suppressors are typically utilized in the filaments at a level from about 0.01% to about 5.0% by weight on a dry filament basis and/or dry web material basis, although higher levels can be used. When utilized, alcohol suds suppressors are typically used in the filaments at a level from about 0.2% to about 3% by weight on a dry filament basis and/or dry web material basis.

x. Suds Boosters

If high sudsing is desired, suds boosters such as the $C_{10}$-$C_{16}$ alkanolamides can be incorporated into the filaments, typically at a level from 0% to about 10% and/or from about 1% to about 10% by weight on a dry filament basis and/or dry web material basis. The $C_{10}$-$C_{14}$ monoethanol and diethanol amides illustrate a typical class of such suds boosters. Use of such suds boosters with high sudsing adjunct surfactants such as the amine oxides, betaines and sultaines noted above is also advantageous. If desired, water-soluble magnesium and/or calcium salts such as $MgCl_2$, $MgSO_4$, $CaCl_2$, $CaSO_4$ and the like, may be added to the filaments at levels from about 0.1% to about 2% by weight on a dry filament basis and/or dry web material basis to provide additional suds.

xi. Softening Agents

One or more softening agents may be present in the filaments. Non-limiting examples of suitable softening agents include quaternary ammonium compounds for example a quaternary ammonium esterquat compound, silicones such as polysiloxanes, clays such as smectite clays, and mixture thereof.

In one example, the softening agents comprise a fabric softening agent. Non-limiting examples of fabric softening agents include impalpable smectite clays, such as those described in U.S. Pat. No. 4,062,647, as well as other fabric softening clays known in the art. When present, the fabric softening agent may be present in the filaments at a level from about 0.5% to about 10% and/or from about 0.5% to about 5% by weight on a dry filament basis and/or dry web material basis.

Fabric softening clays may be used in combination with amine and/or cationic softening agents such as those disclosed in U.S. Pat. Nos. 4,375,416, and 4,291,071. Cationic softening agents may also be used without fabric softening clays.

xii. Conditioning Agents

Filaments may include one or more conditioning agents, such as a high melting point fatty compound. The high melting point fatty compound may have a melting point of about 25° C. or greater, and may be selected from the group consisting of: fatty alcohols, fatty acids, fatty alcohol derivatives, fatty acid derivatives, and mixtures thereof. Such fatty compounds that exhibit a low melting point (less than 25° C.) are not intended to be included as a conditioning agent. Non-limiting examples of the high melting point fatty compounds are found in International Cosmetic Ingredient Dictionary, Fifth Edition, 1993, and CTFA Cosmetic Ingredient Handbook, Second Edition, 1992.

One or more high melting point fatty compounds may be included in the filaments at a level from about 0.1% to about 40% and/or from about 1% to about 30% and/or from about 1.5% to about 16% and/or from about 1.5% to about 8% by weight on a dry filament basis and/or dry web material basis.

The conditioning agents may provide conditioning benefits, such as slippery feel during the application to wet hair and/or fabrics, softness and/or moisturized feel on dry hair and/or fabrics.

Filaments may contain a cationic polymer as a conditioning agent. Concentrations of the cationic polymer in the filaments, when present, typically range from about 0.05% to about 3% and/or from about 0.075% to about 2.0% and/or from about 0.1% to about 1.0% by weight on a dry filament basis and/or dry web material basis. Non-limiting examples of suitable cationic polymers may have cationic charge densities of at least 0.5 meq/gm and/or at least 0.9 meq/gm and/or at least 1.2 meq/gm and/or at least 1.5 meq/gm at a pH of from about 3 to about 9 and/or from about 4 to about 8. In one example, cationic polymers suitable as conditioning agents may have cationic charge densities of less than 7 meq/gm and/or less than 5 meq/gm at a pH of from about 3 to about 9 and/or from about 4 to about 8. Herein, "cationic charge density" of a polymer refers to the ratio of the number of positive charges on the polymer to the molecular weight of the polymer. The weight average molecular weight of such suitable cationic polymers will generally be between about 10,000 and 10 million, in one embodiment between about 50,000 and about 5 million, and in another embodiment between about 100,000 and about 3 million.

Suitable cationic polymers for use in the filaments may contain cationic nitrogen-containing moieties such as quaternary ammonium and/or cationic protonated amino moieties.

Any anionic counterions may be used in association with the cationic polymers so long as the cationic polymers remain soluble in water and so long as the counterions are physically and chemically compatible with the other components of the filaments or do not otherwise unduly impair product performance, stability or aesthetics of the filaments. Non-limiting examples of such counterions include halides (e.g., chloride, fluoride, bromide, iodide), sulfates and methylsulfates.

Non-limiting examples of such cationic polymers are described in the CTFA Cosmetic Ingredient Dictionary, 3rd edition, edited by Estrin, Crosley, and Haynes, (The Cosmetic, Toiletry, and Fragrance Association, Inc., Washington, D.C. (1982)).

Other suitable cationic polymers for use in such filaments may include cationic polysaccharide polymers, cationic guar gum derivatives, quaternary nitrogen-containing cellulose ethers, cationic synthetic polymers, cationic copolymers of etherified cellulose, guar and starch. When used, the cationic polymers herein are soluble in water. Further, suitable cationic polymers for use in the filaments are described in U.S. Pat. Nos. 3,962,418, 3,958,581, and U.S. 2007/0207109A1, which are all incorporated herein by reference.

Filaments may include a nonionic polymer as a conditioning agent. Polyalkylene glycols having a molecular weight of more than about 1000 are useful herein. Useful are those having the following general formula:

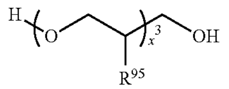

wherein $R^{95}$ is selected from the group consisting of: H, methyl, and mixtures thereof.

Silicones may be included in the filaments as conditioning agents. The silicones useful as conditioning agents typically comprise a water insoluble, water dispersible, non-volatile, liquid that forms emulsified, liquid particles. Suitable conditioning agents for use in the composition are those conditioning agents characterized generally as silicones (e.g., silicone oils, cationic silicones, silicone gums, high refractive silicones, and silicone resins), organic conditioning oils (e.g., hydrocarbon oils, polyolefins, and fatty esters) or combinations thereof, or those conditioning agents which otherwise form liquid, dispersed particles in the aqueous surfactant matrix herein.

Such conditioning agents should be physically and chemically compatible with the essential components of the composition, and should not otherwise unduly impair product stability, aesthetics or performance.

The concentration of the conditioning agents in the filaments may be sufficient to provide the desired conditioning benefits. Such concentration can vary with the conditioning agent, the conditioning performance desired, the average size of the conditioning agent particles, the type and concentration of other components, and other like factors.

The concentration of the silicone conditioning agents typically ranges from about 0.01% to about 10% by weight on a dry filament basis and/or dry web material basis. Non-limiting examples of suitable silicone conditioning agents, and optional suspending agents for the silicone, are described in U.S. Reissue Pat. No. 34,584, U.S. Pat. Nos. 5,104,646; 5,106,609; 4,152,416; 2,826,551; 3,964,500; 4,364,837; 6,607,717; 6,482,969; 5,807,956; 5,981,681; 6,207,782; 7,465,439; 7,041,767; 7,217,777; US Patent Application Nos. 2007/0286837A1; 2005/0048549A1; 2007/0041929A1; British Pat. No. 849,433; German Patent No. DE 10036533, which are all incorporated herein by reference; Chemistry and Technology of Silicones, New York: Academic Press (1968); General Electric Silicone Rubber Product Data Sheets SE 30, SE 33, SE 54 and SE 76; Silicon Compounds, Petrarch Systems, Inc. (1984); and in Encyclopedia of Polymer Science and Engineering, vol. 15, 2d ed., pp 204-308, John Wiley & Sons, Inc. (1989).

In one example, filaments may also comprise from about 0.05% to about 3% by weight on a dry filament basis and/or dry web material basis of at least one organic conditioning oil as a conditioning agent, either alone or in combination with other conditioning agents, such as the silicones (described herein). Suitable conditioning oils include hydrocarbon oils, polyolefins, and fatty esters. Also suitable for use in the compositions herein are the conditioning agents described by the Procter & Gamble Company in U.S. Pat. Nos. 5,674,478, and 5,750,122. Also suitable for use herein are those conditioning agents in U.S. Pat. Nos. 4,529,586; 4,507,280; 4,663,158; 4,197,865; 4,217,914; 4,381,919; and 4,422,853, which are all incorporated herein by reference.

xiii. Humectants

Filaments may contain one or more humectants. The humectants herein are selected from the group consisting of polyhydric alcohols, water soluble alkoxylated nonionic polymers, and mixtures thereof. The humectants, when used, may be present in the filaments at a level from about 0.1% to about 20% and/or from about 0.5% to about 5% by weight on a dry filament basis and/or dry web material basis.

xiv. Suspending Agents

Filaments may further comprise a suspending agent at concentrations effective for suspending water-insoluble material in dispersed form in the compositions or for modifying the viscosity of the composition. Such concentrations of suspending agents range from about 0.1% to about 10% and/or from about 0.3% to about 5.0% by weight on a dry filament basis and/or dry web material basis.

Non-limiting examples of suitable suspending agents include anionic polymers and nonionic polymers (e.g., vinyl polymers, acyl derivatives, long chain amine oxides, and mixtures thereof, alkanol amides of fatty acids, long chain esters of long chain alkanol amides, glyceryl esters, primary amines having a fatty alkyl moiety having at least about 16 carbon atoms, secondary amines having two fatty alkyl moieties each having at least about 12 carbon atoms). Examples of suspending agents are described in U.S. Pat. No. 4,741,855.

xv. Enzymes

One or more enzymes may be present in the filaments. Non-limiting examples of suitable enzymes include proteases, amylases, lipases, cellulases, carbohydrases including mannanases and endoglucanases, pectinases, hemicellulases, peroxidases, xylanases, phopholipases, esterases, cutinases, keratanases, reductases, oxidases, phenoloxidases, lipoxygenases, ligninases, pullulanases, tannases, penosanases, malanases, glucanases, arabinosidases, hyaluraonidases, chrondroitinases, laccases, and mixtures thereof.

Enzymes may be included in the filaments for a variety of purposes, including but not limited to removal of protein-based, carbohydrate-based, or triglyceride-based stains from substrates, for the prevention of refugee dye transfer in fabric laundering, and for fabric restoration. In one example, the filaments may include proteases, amylases, lipases, cellulases, peroxidases, and mixtures thereof of any suitable origin, such as vegetable, animal, bacterial, fungal and yeast origin. Selections of the enzymes utilized are influenced by factors such as pH-activity and/or stability optima, thermostability, and stability to other additives, such as active agents, for example builders, present within the filaments. In one example, the enzyme is selected from the group consisting of: bacterial enzymes (for example bacterial amylases and/or bacterial proteases), fungal enzymes (for example fungal cellulases), and mixtures thereof.

When present in the filaments, the enzymes may be present at levels sufficient to provide a "cleaning-effective amount". The term "cleaning effective amount" refers to any amount capable of producing a cleaning, stain removal, soil removal, whitening, deodorizing, or freshness improving effect on substrates such as fabrics, dishware and the like. In practical terms for current commercial preparations, typical amounts are up to about 5 mg by weight, more typically 0.01 mg to 3 mg, of active enzyme per gram of the filament and/or fiber. Stated otherwise, the filaments can typically comprise from about 0.001% to about 5% and/or from about 0.01% to about 3% and/or from about 0.01% to about 1% by weight on a dry filament basis and/or dry web material basis.

One or more enzymes may be applied to the filament and/or fibrous structure after the filament and/or fibrous structure are produced.

A range of enzyme materials and means for their incorporation into the filament-forming composition, which may be a synthetic detergent composition, is also disclosed in WO 93/07263 A; WO 93/07260 A; WO 89/08694 A; U.S. Pat. Nos. 3,553,139; 4,101,457; and 4,507,219.

xvi. Enzyme Stabilizing System

When enzymes are present in the filaments and/or fibers, an enzyme stabilizing system may also be included in the filaments. Enzymes may be stabilized by various techniques. Non-limiting examples of enzyme stabilization techniques are disclosed and exemplified in U.S. Pat. Nos. 3,600,319 and 3,519,570; EP 199,405, EP 200,586; and WO 94/01532 A.

In one example, the enzyme stabilizing system may comprise calcium and/or magnesium ions.

The enzyme stabilizing system may be present in the filaments at a level of from about 0.001% to about 10% and/or from about 0.005% to about 8% and/or from about 0.01% to about 6% by weight on a dry filament basis and/or dry web material basis. The enzyme stabilizing system can be any stabilizing system which is compatible with the enzymes present in the filaments. Such an enzyme stabilizing system may be inherently provided by other formulation actives, or be added separately, e.g., by the formulator or by a manufacturer of enzymes. Such enzyme stabilizing systems may, for example, comprise calcium ion, magnesium ion, boric acid, propylene glycol, short chain carboxylic acids, boronic acids, and mixtures thereof, and are designed to address different stabilization problems.

xvii. Builders

Filaments may comprise one or more builders. Non-limiting examples of suitable builders include zeolite builders, aluminosilicate builders, silicate builders, phosphate builders, citric acid, citrates, nitrilo triacetic acid, nitrilo triacetate, polyacrylates, acrylate/maleate copolymers, and mixtures thereof.

In one example, a builder selected from the group consisting of: aluminosilicates, silicates, and mixtures thereof, may be included in the filaments. The builders may be included in the filaments to assist in controlling mineral, especially calcium and/or magnesium hardness in wash water or to assist in the removal of particulate soils from surfaces. Also suitable for use herein are synthesized crystalline ion exchange materials or hydrates thereof having chain structure and a composition represented by the following general Formula I an anhydride form: $x(M_2O)\cdot ySiO_2\cdot zM'O$ wherein M is Na and/or K, M' is Ca and/or Mg; y/x is 0.5 to 2.0 and z/x is 0.005 to 1.0 as taught in U.S. Pat. No. 5,427,711.

Non-limiting examples of other suitable builders that may be included in the filaments include phosphates and polyphosphates, for example the sodium salts thereof; carbonates, bicarbonates, sesquicarbonates and carbonate minerals other than sodium carbonate or sesquicarbonate; organic mono-, di-, tri-, and tetracarboxylates for example water-soluble nonsurfactant carboxylates in acid, sodium, potassium or alkanolammonium salt form, as well as oligomeric or water-soluble low molecular weight polymer carboxylates including aliphatic and aromatic types; and phytic acid. These builders may be complemented by borates, e.g., for pH-buffering purposes, or by sulfates, for example sodium sulfate and any other fillers or carriers which may be important to the engineering of stable surfactant and/or builder-containing filaments.

Still other builders may be selected from polycarboxylates, for example copolymers of acrylic acid, copolymers of acrylic acid and maleic acid, and copolymers of acrylic acid and/or maleic acid and other suitable ethylenic monomers with various types of additional functionalities. Builder level can vary widely depending upon end use. In one example, the filaments may comprise at least 1% and/or from about 1% to about 30% and/or from about 1% to about 20% and/or from about 1% to about 10% and/or from about 2% to about 5% by weight on a dry fiber basis of one or more builders.

xviii. Clay Soil Removal/Anti-Redeposition Agents

Filaments may contain water-soluble ethoxylated amines having clay soil removal and anti-redeposition properties. Such water-soluble ethoxylated amines may be present in the filaments at a level of from about 0.01% to about 10.0% and/or from about 0.01% to about 7% and/or from about 0.1% to about 5% by weight on a dry filament basis and/or dry web material basis of one or more water-soluble ethoxylates amines. Non-limiting examples of suitable clay soil removal and antiredeposition agents are described in U.S. Pat. Nos. 4,597,898; 548,744; 4,891,160; European Patent Application Nos. 111,965; 111,984; 112,592; and WO 95/32272.

xix. Polymeric Soil Release Agent

Filaments may contain polymeric soil release agents, hereinafter "SRAs." If utilized, SRA's will generally comprise from about 0.01% to about 10.0% and/or from about 0.1% to about 5% and/or from about 0.2% to about 3.0% by weight on a dry filament basis and/or dry web material basis.

SRAs typically have hydrophilic segments to hydrophilize the surface of hydrophobic fibers such as polyester and nylon, and hydrophobic segments to deposit upon hydrophobic fibers and remain adhered thereto through completion of washing and rinsing cycles thereby serving as an anchor for the hydrophilic segments. This can enable stains occurring subsequent to treatment with SRA to be more easily cleaned in later washing procedures.

SRAs can include, for example, a variety of charged, e.g., anionic or even cationic (see U.S. Pat. No. 4,956,447), as well as non-charged monomer units and structures may be linear, branched or even star-shaped. They may include capping moieties which are especially effective in controlling molecular weight or altering the physical or surface-active properties. Structures and charge distributions may be tailored for application to different fiber or textile types and for varied detergent or detergent additive products. Non-limiting examples of SRAs are described in U.S. Pat. Nos. 4,968,451; 4,711,730; 4,721,580; 4,702,857; 4,877,896; 3,959,230; 3,893,929; 4,000,093; 5,415,807; 4,201,824; 4,240,918; 4,525,524; 4,201,824; 4,579,681; and 4,787,989; European Patent Application 0 219 048; 279,134 A; 457,205 A; and DE 2,335,044.

xx. Polymeric Dispersing Agents

Polymeric dispersing agents can advantageously be utilized in the filaments at levels from about 0.1% to about 7% and/or from about 0.1% to about 5% and/or from about 0.5% to about 4% by weight on a dry filament basis and/or dry web material basis, especially in the presence of zeolite and/or layered silicate builders. Suitable polymeric dispersing agents may include polymeric polycarboxylates and polyethylene glycols, although others known in the art can also be used. For example, a wide variety of modified or unmodified polyacrylates, polyacrylate/mealeates, or polyacrylate/methacrylates are highly useful. It is believed, though it is not intended to be limited by theory, that polymeric dispersing agents enhance overall detergent builder performance, when used in combination with other builders (including lower molecular weight polycarboxylates) by crystal growth inhibition, particulate soil release peptization, and anti-redeposition. Non-limiting examples of polymeric dispersing agents are found in U.S. Pat. No. 3,308,067, European Patent Application No. 66915, EP 193,360, and EP 193,360.

xxi. Alkoxylated Polyamine Polymers

Alkoxylated polyamines may be included in the filaments for providing soil suspending, grease cleaning, and/or particulate cleaning. Such alkoxylated polyamines include but are not limited to ethoxylated polyethyleneimines, ethoxylated hexamethylene diamines, and sulfated versions thereof. Polypropoxylated derivatives of polyamines may also be included in the filaments. A wide variety of amines and polyaklyeneimines can be alkoxylated to various degrees, and optionally further modified to provide the abovementioned benefits. A useful example is 600 g/mol polyethyleneimine core ethoxylated to 20 EO groups per NH and is available from BASF.

xxii. Alkoxylated Polycarboxylate Polymers

Alkoxylated polycarboxylates such as those prepared from polyacrylates may be included in the filaments to provide additional grease removal performance. Such materials are described in WO 91/08281 and PCT 90/01815. Chemically, these materials comprise polyacrylates having one ethoxy side-chain per every 7-8 acrylate units. The side-chains are of the formula $—(CH_2CH_2O)_m(CH_2)_nCH_3$ wherein m is 2-3 and n is 6-12. The side-chains are ester-linked to the polyacrylate "backbone" to provide a "comb" polymer type structure. The molecular weight can vary, but is typically in the range of about 2000 to about 50,000. Such alkoxylated polycarboxylates can comprise from about 0.05% to about 10% by weight on a dry filament basis and/or dry web material basis.

xxiii. Amphilic Graft Co-Polymers

Filaments may include one or more amphilic graft co-polymers. An example of a suitable amphilic graft co-polymer comprises (i) a polyethyelene glycol backbone; and (ii) and at least one pendant moiety selected from polyvinyl acetate, polyvinyl alcohol and mixtures thereof. A non-limiting example of a commercially available amphilic graft co-polymer is Sokalan HP22, supplied from BASF.

xxiv. Dissolution Aids

Filaments may incorporate dissolution aids to accelerate dissolution when the filament contains more the 40% surfactant to mitigate formation of insoluble or poorly soluble surfactant aggregates that can sometimes form or surfactant compositions are used in cold water. Non-limiting examples of dissolution aids include sodium chloride, sodium sulfate, potassium chloride, potassium sulfate, magnesium chloride, and magnesium sulfate.

xxv. Buffer Systems

Filaments may be formulated such that, during use in an aqueous cleaning operation, for example washing clothes or dishes, the wash water will have a pH of between about 5.0 and about 12 and/or between about 7.0 and 10.5. In the case of a dishwashing operation, the pH of the wash water typically is between about 6.8 and about 9.0. In the case of washing clothes, the pH of the water typically is between 7 and 11. Techniques for controlling pH at recommended usage levels include the use of buffers, alkalis, acids, etc., and are well known to those skilled in the art. These include the use of sodium carbonate, citric acid or sodium citrate, monoethanol amine or other amines, boric acid or borates, and other pH-adjusting compounds well known in the art.

Filaments useful as "low pH" detergent compositions can be included and are especially suitable for the surfactant systems and may provide in-use pH values of less than 8.5 and/or less than 8.0 and/or less than 7.0 and/or less than 7.0 and/or less than 5.5 and/or to about 5.0.

Dynamic in-wash pH profile filaments can be included. Such filaments may use wax-covered citric acid particles in conjunction with other pH control agents such that (i) 3 minutes after contact with water, the pH of the wash liquor is greater than 10; (ii) 10 mins after contact with water, the pH of the wash liquor is less than 9.5; (iii) 20 mins after contact with water, the pH of the wash liquor is less than 9.0; and (iv) optionally, wherein, the equilibrium pH of the wash liquor is in the range of from above 7.0 to 8.5.

xxvi. Heat Forming Agents

Filaments may contain a heat forming agent. Heat forming agents are formulated to generate heat in the presence of water and/or oxygen (e.g., oxygen in the air, etc.) and to thereby accelerate the rate at which the fibrous structure degrades in the presence of water and/or oxygen, and/or to increase the effectiveness of one or more of the actives in the filament. The heat forming agent can also or alternatively be used to accelerate the rate of release of one or more actives from the fibrous structure. The heat forming agent is formulated to undergo an exothermic reaction when exposed to oxygen (i.e., oxygen in the air, oxygen in the water, etc.) and/or water. Many different materials and combination of materials can be used as the heat forming agent. Non-limiting heat forming agents that can be used in the fibrous structure include electrolyte salts (e.g., aluminum chloride, calcium chloride, calcium sulfate, cupric chloride, cuprous chloride, ferric sulfate, magnesium chloride, magnesium sulfate, manganese chloride, manganese sulfate, potassium chloride, potassium sulfate, sodium acetate, sodium chloride, sodium carbonate, sodium sulfate, etc.), glycols (e.g., propylene glycol, dipropylenenglycol, etc.), lime (e.g., quick lime, slaked lime, etc.), metals (e.g., chromium, copper, iron, magnesium, manganese, etc.), metal oxides (e.g., aluminum oxide, iron oxide, etc.), polyalkyleneamine, polyalkyleneimine, polyvinyl amine, zeolites, gycerin, 1,3, propanediol, polysorbates esters (e.g., Tweens 20, 60, 85, 80), and/or poly glycerol esters (e.g., Noobe, Drewpol and Drewmulze from Stepan). The heat forming agent can be formed of one or more materials. For example, magnesium sulfate can singularly form the heat forming agent. In another non-limiting example, the combination of about 2-25 weight percent activated carbon, about 30-70 weight percent iron powder and about 1-10 weight percent metal salt can form the heat forming agent. As can be appreciated, other or additional materials can be used alone or in combination with other materials to form the heat forming agent. Non-limiting examples of materials that can be used to form the heat forming agent used in a fibrous structure are disclosed in U.S. Pat. Nos. 5,674,270 and 6,020,040; and in U.S. Patent Application Publication Nos. 2008/0132438 and 2011/0301070.

xxvii. Degrading Accelerators

Filaments may contain a degrading accelerators used to accelerate the rate at which a fibrous structure degrades in the presence of water and/or oxygen. The degrading accelerator, when used, is generally designed to release gas when exposed to water and/or oxygen, which in turn agitates the region about the fibrous structure so as to cause acceleration in the degradation of a carrier film of the fibrous structure. The degrading accelerator, when used, can also or alternatively be used to accelerate the rate of release of one or more actives from the fibrous structure; however, this is not required. The degrading accelerator, when used, can also or alternatively be used to increase the effectivity of one or more of the actives in the fibrous structure; however, this is not required. The degrading accelerator can include one or more materials such as, but not limited to, alkali metal carbonates (e.g. sodium carbonate, potassium carbonate, etc.), alkali metal hydrogen carbonates (e.g., sodium hydrogen carbonate, potassium hydrogen carbonate, etc.), ammonium carbonate, etc. The water soluble strip can optionally include one or more activators that are used to activate or increase the rate of activation of the one or more degrading accelerators in the fibrous structure. As can be appreciated, one or more activators can be included in the fibrous structure even when no degrading accelerator exists in the fibrous structure; however, this is not required. For instance, the activator can include an acidic or basic compound, wherein such acidic or basic compound can be used as a supplement to one or more actives in the fibrous structure when a degrading accelerator is or is not included in the fibrous structure. Non-limiting examples of activators, when used, that can be included in the fibrous structure include organic acids (e.g., hydroxy-carboxylic acids [citric acid, tartaric acid, malic acid, lactic acid, gluconic acid, etc.], saturated aliphatic carboxylic acids [acetic acid, succinic acid, etc.], unsaturated aliphatic carboxylic acids [e.g., fumaric acid, etc.]. Non-limiting examples of materials that can be used to form degrading accelerators and activators used in a fibrous structure are disclosed in U.S. Patent Application Publication No. 2011/0301070.

III. Release of Active Agent

One or more active agents may be released from the filament or a web including a graphic when the filament is exposed to a triggering condition. In one example, one or more active agents may be released from the filament or a part of the filament when the filament or the part of the filament loses its identity, in other words, loses its physical structure. For example, a filament loses its physical structure when the filament-forming material dissolves, melts or undergoes some other transformative step such that the filament structure is lost. In one example, the one or more active agents are released from the filament when the filament's morphology changes.

In another example, one or more active agents may be released from the filament or a part of the filament when the filament or the part of the filament alters its identity, in other words, alters its physical structure rather than loses its physical structure. For example, a filament alters its physical structure when the filament-forming material swells, shrinks, lengthens, and/or shortens, but retains its filament-forming properties.

In another example, one or more active agents may be released from the filament or a web including a graphic with the filament's morphology not changing (not losing or altering its physical structure).

In one example, the filament or a web including a graphic may release an active agent upon the filament being exposed to a triggering condition that results in the release of the active agent, such as by causing the filament to lose or alter its identity as discussed above. Non-limiting examples of triggering conditions include exposing the filament to solvent, a polar solvent, such as alcohol and/or water, and/or a non-polar solvent, which may be sequential, depending upon whether the filament-forming material comprises a polar solvent-soluble material and/or a non-polar solvent-soluble material; exposing the filament to heat, such as to a temperature of greater than 75° F. and/or greater than 100° F. and/or greater than 150° F. and/or greater than 200° F. and/or greater than 212° F.; exposing the filament to cold, such as to a temperature of less than 40° F. and/or less than 32° F. and/or less than 0° F.; exposing the filament to a force, such as a stretching force applied by a consumer using the filament; and/or exposing the filament to a chemical reaction; exposing the filament to a condition that results in a phase change; exposing the filament to a pH change and/or a pressure change and/or temperature change; exposing the filament to one or more chemicals that result in the filament releasing one or more of its active agents; exposing the filament to ultrasonics; exposing the filament to light and/or certain wavelengths; exposing the filament to a different ionic strength; and/or exposing the filament to an active agent released from another filament.

In one example, one or more active agents may be released from the filaments or a web including a graphic when a nonwoven web comprising the filaments is subjected to a triggering step selected from the group consisting of: pre-treating stains on a fabric article with the nonwoven web; forming a wash liquour by contacting the nonwoven web with water; tumbling the nonwoven web in a dryer; heating the nonwoven web in a dryer, and combinations thereof.

IV. Filament-Forming Composition

The filaments are made from a filament-forming composition. The filament-forming composition can be a polar-solvent-based composition. In one example, the filament-forming composition can be an aqueous composition comprising one or more filament-forming materials and one or more active agents.

The filament-forming composition may be processed at a temperature of from about 50° C. to about 100° C. and/or from about 65° C. to about 95° C. and/or from about 70° C. to about 90° C. when making filaments from the filament-forming composition.

In one example, the filament-forming composition may comprise at least 20% and/or at least 30% and/or at least 40% and/or at least 45% and/or at least 50% to about 90% and/or to about 85% and/or to about 80% and/or to about 75% by weight of one or more filament-forming materials, one or more active agents, and mixtures thereof. The filament-forming composition may comprise from about 10% to about 80% by weight of a polar solvent, such as water.

The filament-forming composition may exhibit a Capillary Number of at least 1 and/or at least 3 and/or at least 5 such that the filament-forming composition can be effectively polymer processed into a hydroxyl polymer fiber.

The Capillary number is a dimensionless number used to characterize the likelihood of this droplet breakup. A larger capillary number indicates greater fluid stability upon exiting the die. The Capillary number is defined as follows:

$$Ca = \frac{V^{*}\eta}{\sigma}$$

V is the fluid velocity at the die exit (units of Length per Time),

η is the fluid viscosity at the conditions of the die (units of Mass per Length*Time), a is the surface tension of the fluid (units of mass per $Time^2$). When velocity, viscosity, and surface tension are expressed in a set of consistent units, the resulting Capillary number will have no units of its own; the individual units will cancel out.

The Capillary number is defined for the conditions at the exit of the die. The fluid velocity is the average velocity of the fluid passing through the die opening. The average velocity is defined as follows:

$$V = \frac{Vol'}{\text{Area}}$$

Vol'=volumetric flowrate (units of $Length^3$ per Time)

Area=cross-sectional area of the die exit (units of $Length^2$).

When the die opening is a circular hole, then the fluid velocity can be defined as $$V = \frac{Vol'}{\pi^{*}R^{2}}$$

R is the radius of the circular hole (units of length).

The fluid viscosity will depend on the temperature and may depend of the shear rate. The definition of a shear thinning fluid includes a dependence on the shear rate. The surface tension will depend on the makeup of the fluid and the temperature of the fluid.

In a fiber spinning process, the filaments need to have initial stability as they leave the die. The Capillary number is used to characterize this initial stability criterion. At the conditions of the die, the Capillary number should be greater than 1 and/or greater than 4.

In one example, the filament-forming composition exhibits a Capillary Number of from at least 1 to about 50 and/or at least 3 to about 50 and/or at least 5 to about 30.

In one example, the filament-forming composition may comprise one or more release agents and/or lubricants. Non-limiting examples of suitable release agents and/or lubricants include fatty acids, fatty acid salts, fatty alcohols, fatty esters, sulfonated fatty acid esters, fatty amine acetates and fatty amides, silicones, aminosilicones, fluoropolymers and mixtures thereof.

In one example, the filament-forming composition may comprise one or more antiblocking and/or detackifying agents. Non-limiting examples of suitable antiblocking and/or detackifying agents include starches, modified starches, crosslinked polyvinylpyrrolidone, crosslinked cellulose, microcrystalline cellulose, silica, metallic oxides, calcium carbonate, talc and mica.

Active agents may be added to the filament-forming composition prior to and/or during filament formation and/or may be added to the filament after filament formation. For example, a perfume active agent may be applied to the filament and/or nonwoven web comprising the filament after the filament and/or nonwoven web are formed. In another example, an enzyme active agent may be applied to the filament and/or nonwoven web comprising the filament after the filament and/or nonwoven web are formed. In still another example, one or more particulate active agents, such as one or more ingestible active agents, such as bismuth subsalicylate, which may not be suitable for passing through the spinning process for making the filament, may be applied to the filament and/or nonwoven web comprising the filament after the filament and/or nonwoven web are formed.

V. Method for Making a Filament

Filaments may be made by any suitable process. A non-limiting example of a suitable process for making the filaments is described below.

In one example, a method for making a filament comprises the steps of: a) providing a filament-forming composition comprising one or more filament-forming materials and one or more active agents; and b) spinning the filament-forming composition into one or more filaments comprising the one or more filament-forming materials and the one or more active agents that are releasable from the filament when exposed to conditions of intended use, wherein the total level of the one or more filament-forming materials present in the filament is less than 65% and/or 50% or less by weight on a dry filament basis and/or dry detergent product basis and the total level of the one or more active agents present in the filament is greater than 35% and/or 50% or greater by weight on a dry filament basis and/or dry detergent product basis.

In one example, during the spinning step, any volatile solvent, such as water, present in the filament-forming composition is removed, such as by drying, as the filament is formed. In one example, greater than 30% and/or greater than 40% and/or greater than 50% of the weight of the filament-forming composition's volatile solvent, such as water, is removed during the spinning step, such as by drying the filament being produced.

The filament-forming composition may comprise any suitable total level of filament-forming materials and any suitable level of active agents so long as the filament produced from the filament-forming composition comprises a total level of filament-forming materials in the filament of from about 5% to 50% or less by weight on a dry filament basis and/or dry detergent product basis and a total level of active agents in the filament of from 50% to about 95% by weight on a dry filament basis and/or dry detergent product basis.

In one example, the filament-forming composition may comprise any suitable total level of filament-forming materials and any suitable level of active agents so long as the filament produced from the filament-forming composition comprises a total level of filament-forming materials in the filament of from about 5% to 50% or less by weight on a dry filament basis and/or dry detergent product basis and a total level of active agents in the filament of from 50% to about 95% by weight on a dry filament basis and/or dry detergent product basis, wherein the weight ratio of filament-forming material to additive is 1 or less.

In one example, the filament-forming composition comprises from about 1% and/or from about 5% and/or from about 10% to about 50% and/or to about 40% and/or to about 30% and/or to about 20% by weight of the filament-forming composition of filament-forming materials; from about 1% and/or from about 5% and/or from about 10% to about 50% and/or to about 40% and/or to about 30% and/or to about 20% by weight of the filament-forming composition of active agents; and from about 20% and/or from about 25% and/or from about 30% and/or from about 40% and/or to about 80% and/or to about 70% and/or to about 60% and/or to about 50% by weight of the filament-forming composition of a volatile solvent, such as water. The filament-forming composition may comprise minor amounts of other active agents, such as less than 10% and/or less than 5% and/or less than 3% and/or less than 1% by weight of the filament-forming composition of plasticizers, pH adjusting agents, and other active agents.

The filament-forming composition is spun into one or more filaments by any suitable spinning process, such as meltblowing and/or spunbonding. In one example, the filament-forming composition is spun into a plurality of filaments by meltblowing. For example, the filament-forming composition may be pumped from an extruder to a meltblown spinnerette. Upon exiting one or more of the filament-forming holes in the spinnerette, the filament-forming composition is attenuated with air to create one or more filaments. The filaments may then be dried to remove any remaining solvent used for spinning, such as the water.

Filaments may be collected on a molding member, such as a patterned belt to form a fibrous structure.

VI. Detergent Product

Detergent products comprising one or more active agents can exhibit novel properties, features, and/or combinations thereof compared to known detergent products comprising one or more active agents.

A. Fibrous Structure

In one example, a detergent product may comprise a fibrous structure with a graphic printed thereon, for example a web. One or more, and/or a plurality of filaments may form a fibrous structure by any suitable process known in the art. The fibrous structure may be used to deliver the active agents from the filaments when the fibrous structure is exposed to conditions of intended use of the filaments and/or the fibrous structure.

Even though fibrous structures may be in solid form, the filament-forming composition used to make the filaments may be in the form of a liquid.

In one example, a fibrous structure with a graphic printed thereon may comprise a plurality of identical or substantially identical from a compositional perspective filaments. In another example, the fibrous structure may comprise two or more different filaments. Non-limiting examples of differences in the filaments may be physical differences such as differences in diameter, length, texture, shape, rigidness, elasticity, and the like; chemical differences such as crosslinking level, solubility, melting point, Tg, active agent, filament-forming material, color, level of active agent, level of filament-forming material, presence of any coating on filament, biodegradable or not, hydrophobic or not, contact angle, and the like; differences in whether the filament loses its physical structure when the filament is exposed to conditions of intended use; differences in whether the filament's morphology changes when the filament is exposed to conditions of intended use; and differences in rate at which the filament releases one or more of its active agents when the filament is exposed to conditions of intended use. In one example, two or more filaments within the fibrous structure may comprise the same filament-forming material, but have different active agents. This may be the case where the different active agents may be incompatible with one another, for example an anionic surfactant (such as a shampoo active agent) and a cationic surfactant (such as a hair conditioner active agent).

In another example, a fibrous structure with a graphic printed thereon may comprise two or more different layers (in the z-direction of the fibrous structure of filaments that form the fibrous structure. The filaments in a layer may be the same as or different from the filaments of another layer. Each layer may comprise a plurality of identical or substantially identical or different filaments. For example, filaments that may release their active agents at a faster rate than others within the fibrous structure may be positioned to an external surface of the fibrous structure.

In another example, a fibrous structure with a graphic printed thereon may exhibit different regions, such as different regions of basis weight, density and/or caliper. In yet another example, the fibrous structure may comprise texture on one or more of its surfaces. A surface of the fibrous structure may comprise a pattern, such as a non-random, repeating pattern. The fibrous structure may be embossed with an emboss pattern. In another example, the fibrous structure may comprise apertures. The apertures may be arranged in a non-random, repeating pattern.

In one example, a fibrous structure with a graphic printed thereon may comprise discrete regions of filaments that differ from other parts of the fibrous structure.

Non-limiting examples of use of a fibrous structure with a graphic printed thereon include, but are not limited to a laundry dryer substrate, washing machine substrate, washcloth, hard surface cleaning and/or polishing substrate, floor cleaning and/or polishing substrate, as a component in a battery, baby wipe, adult wipe, feminine hygiene wipe, bath tissue wipe, window cleaning substrate, oil containment and/or scavenging substrate, insect repellant substrate, swimming pool chemical substrate, food, breath freshener, deodorant, waste disposal bag, packaging film and/or wrap, wound dressing, medicine delivery, building insulation, crops and/or plant cover and/or bedding, glue substrate, skin care substrate, hair care substrate, air care substrate, water treatment substrate and/or filter, toilet bowl cleaning substrate, candy substrate, pet food, livestock bedding, teeth whitening substrates, carpet cleaning substrates, and other suitable uses of the active agents.

A fibrous structure with a graphic printed thereon may be used as is or may be coated with one or more active agents.

In another example, a fibrous structure with a graphic printed thereon may be pressed into a film, for example by applying a compressive force and/or heating the fibrous structure to convert the fibrous structure into a film. The film would comprise the active agents that were present in the filaments. The fibrous structure may be completely converted into a film or parts of the fibrous structure may remain in the film after partial conversion of the fibrous structure into the film. The films may be used for any suitable purposes that the active agents may be used for including, but not limited to the uses exemplified for the fibrous structure.

B. Methods of Use of the Detergent Product

The fibrous structure with a graphic printed thereon comprising one or more fabric care active agents may be utilized in a method for treating a fabric article. The method of treating a fabric article may comprise one or more steps selected from the group consisting of: (a) pre-treating the fabric article before washing the fabric article; (b) contacting the fabric article with a wash liquor formed by contacting the nonwoven web or film with water, (c) contacting the fabric article with the nonwoven web or film in a dryer; (d) drying the fabric article in the presence of the nonwoven web or film in a dryer; and (e) combinations thereof.

In some embodiments, the method may further comprise the step of pre-moistening the fibrous structure with a graphic printed thereon prior to contacting it to the fabric article to be pre-treated. For example, the nonwoven web or film can be pre-moistened with water and then adhered to a portion of the fabric comprising a stain that is to be pre-treated. Alternatively, the fabric may be moistened and the web or film placed on or adhered thereto. In some embodiments, the method may further comprise the step of selecting of only a portion of the nonwoven web or film for use in treating a fabric article. For example, if only one fabric care article is to be treated, a portion of the nonwoven web or film may be cut and/or torn away and either placed on or adhered to the fabric or placed into water to form a relatively small amount of wash liquor which is then used to pre-treat the fabric. In this way, the user may customize the fabric treatment method according to the task at hand. In some embodiments, at least a portion of a nonwoven web or film may be applied to the fabric to be treated using a device. Exemplary devices include, but are not limited to, brushes and sponges. Any one or more of the aforementioned steps may be repeated to achieve the desired fabric treatment benefit.

VII. Method of Making Fibrous Structure

Figure 4:
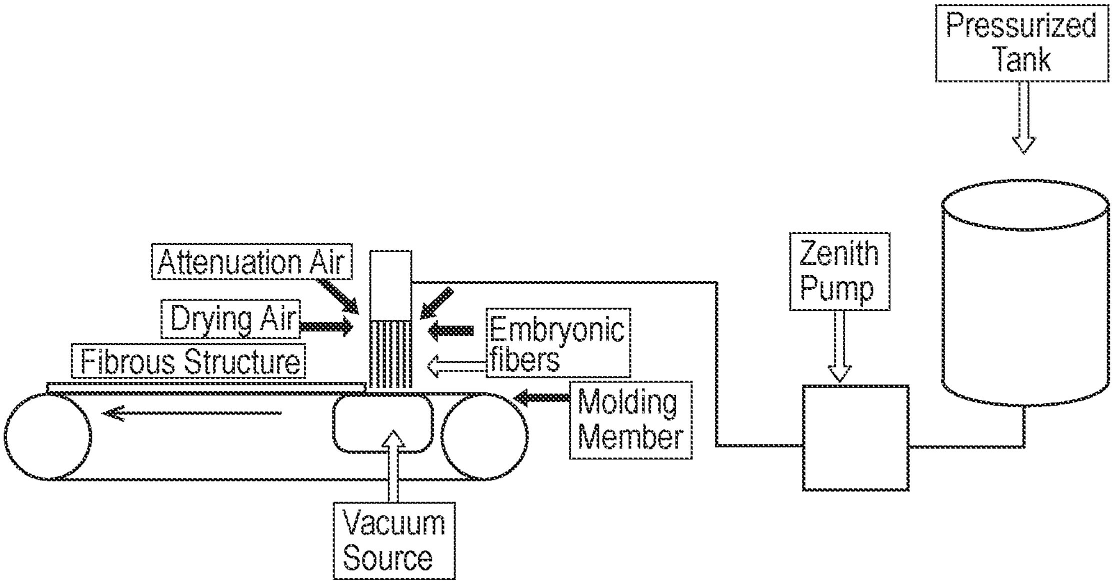
FIG. 4 is a schematic representation of an apparatus used to form fibrous structures.

The following methods may be used in forming fibrous structures wherein graphics may be printed thereon. For example, fibrous structures may be formed by means of a small-scale apparatus, a schematic representation of which is shown in FIG. 4. A pressurized tank, suitable for batch operation may be filled with a suitable material for spinning. The pump may be a Zenith®, type PEP II, having a capacity of 5.0 cubic centimeters per revolution (cc/rev), manufactured by Parker Hannifin Corporation, Zenith Pumps division, of Sanford, N.C., USA. The material flow to a die may be controlled by adjusting the number of revolutions per minute (rpm) of the pump. Pipes connected the tank, the pump, and the die.

Figure 5:
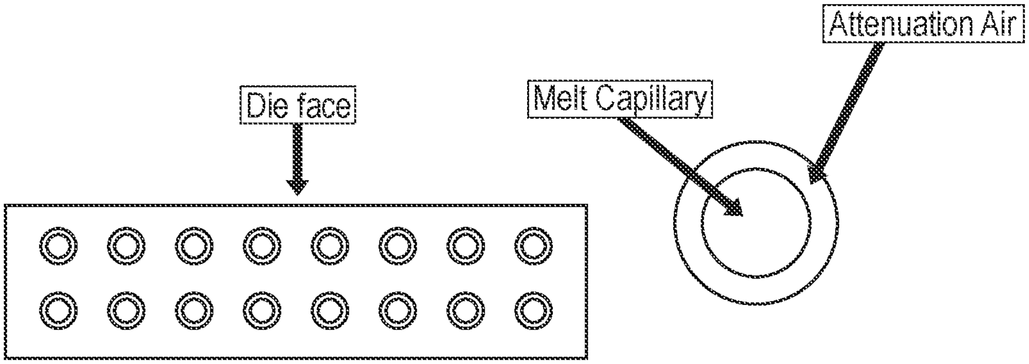
FIG. 5 is a schematic representation of a die used on an apparatus as shown in FIG. 4.

The die in FIG. 5 may have several rows of circular extrusion nozzles spaced from one another at a pitch P (FIG. 5) of about 3.048 millimeters (about 0.120 inches). The nozzles may have individual inner diameters of about 0.220 millimeters (about 0.009 inches) and individual outside diameters of about 0.813 millimeters (about 0.032 inches). Each individual nozzle may be encircled by an annular and divergently flared orifice to supply attenuation air to each individual melt capillary. The material extruded through the nozzles may be surrounded and attenuated by generally cylindrical, humidified air streams supplied through the orifices.

Attenuation air can be provided by heating compressed air from a source by an electrical-resistance heater, for example, a heater manufactured by Chromalox, Division of Emerson Electric, of Pittsburgh, Pa., USA. An appropriate quantity of steam may be added to saturate or nearly saturate the heated air at the conditions in the electrically heated, thermostatically controlled delivery pipe. Condensate may be removed in an electrically heated, thermostatically controlled, separator.

The embryonic fibers may be dried by a drying air stream having a temperature from about 149° C. (about 300° F.) to about 315° C. (about 600° F.) by an electrical resistance heater (not shown) supplied through drying nozzles and discharged at an angle of about 90 degrees relative to the general orientation of the non-thermoplastic embryonic fibers being extruded. The dried embryonic fibers may be collected on a collection device, such as, for example, a movable foraminous belt or molding member. The addition of a vacuum source directly under the formation zone may be used to aid collection of the fibers.

Table 1 below sets forth an example of a filament-forming composition for making filaments and/or a fibrous structure suitable for use as a laundry detergent. This mixture was made and placed in the pressurized tank in FIG. 4.

TABLE 1

| | Filament-forming composition (i.e., premix) (%) | Filament-Forming Composition (%) | Filament (i.e., components remaining upon drying) (%) | Percent by weight on a dry filament basis (%) |
|---|---|---|---|---|
| C12-15 AES | 28.45 | 11.38 | 11.38 | 28.07 |
| C11.8 HLAS | 12.22 | 4.89 | 4.89 | 12.05 |

TABLE 1-continued

| | Filament-forming composition (i.e., premix) (%) | Filament-Forming Composition (%) | Filament (i.e., components remaining upon drying) (%) | Percent by weight on a dry filament basis (%) |
|---|---|---|---|---|
| MEA | 7.11 | 2.85 | 2.85 | 7.02 |
| N67HSAS | 4.51 | 1.81 | 1.81 | 4.45 |
| Glycerol | 3.08 | 1.23 | 1.23 | 3.04 |
| PE-20, Polyethyleneimine Ethoxylate, PEI 600 E20 | 3.00 | 1.20 | 1.20 | 2.95 |
| Ethoxylated/Propoxylated Polyethyleneimine | 2.95 | 1.18 | 1.18 | 2.91 |
| Brightener 15 | 2.20 | 0.88 | 0.88 | 2.17 |
| Amine Oxide | 1.46 | 0.59 | 0.59 | 1.44 |
| Sasol 24, 9 Nonionic Surfactant | 1.24 | 0.50 | 0.50 | 1.22 |
| DTPA (Chelant) | 1.08 | 0.43 | 0.43 | 1.06 |
| Tiron (Chelant) | 1.08 | 0.43 | 0.43 | 1.06 |
| Celvol 523 PVOH[1] | 0.000 | 13.20 | 13.20 | 32.55 |
| Water | 31.63 | 59.43 | — | — |

Celvol 523, Celanese/Sekisui, MW 85,000-124,000, 87-89% hydrolyzed

The dry embryonic filaments may be collected on a molding member as described above. The construction of the molding member will provide areas that are air-permeable due to the inherent construction. The filaments that are used to construct the molding member will be non-permeable while the void areas between the filaments will be permeable. Additionally a pattern may be applied to the molding member to provide additional non-permeable areas which may be continuous, discontinuous, or semi-continuous in nature. A vacuum used at the point of lay down is used to help deflect fibers into the presented pattern.

Base spinning conditions were achieved with a fibrous web being collected on the collecting molding member. These were passed beneath the die and samples were collected after the vacuum. As described in more detail below, these fibrous structures may then be further processed and/or converted, such as for example, in a printing operation.

In addition to the techniques described herein in forming regions within the fibrous structures having a different properties (e.g., average densities), other techniques can also be applied to provide suitable results. One such example includes embossing techniques to form such regions. Suitable embossing techniques are described in U.S. Patent Application Publication Nos. 2010/0297377, 2010/0295213, 2010/0295206, 2010/0028621, and 2006/0278355.

Figure 8:
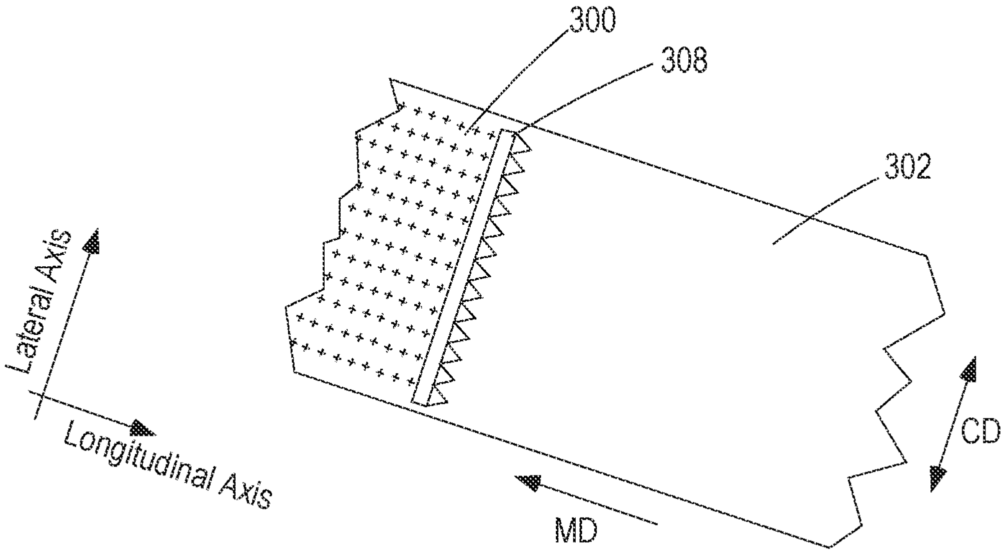
FIG. 8 shows one example of how a pattern may be printed on a substrate.
Figure 9:
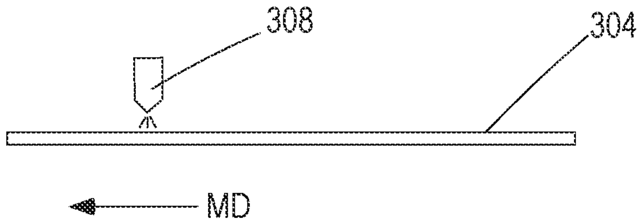
FIG. 9 is a plan view of FIG. 8 looking in the cross direction.
Figure 10:
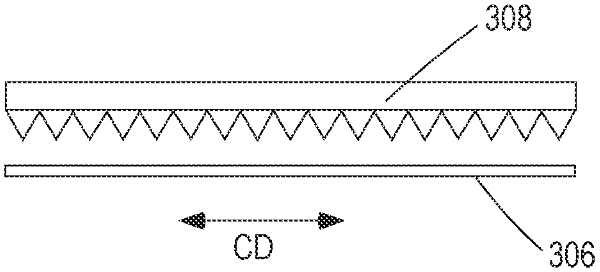
FIG. 10 is a plan view of FIG. 8 looking in the machine direction.

As previously mentioned, graphics may be printed on sheets of webs and fibrous structures according the present disclosure. Printing may be characterized as an industrial process in which a graphic is reproduced on a sheet. FIGS. 8-10 show one example of how graphics 300 may be printed on a web or fibrous structures described above in the form of a sheet 302 including a first surface 304 and a second surface 306 opposite the first surface 304. A plurality of graphics 300 in FIG. 8 is schematically represented by a series of "+" shapes. To provide a frame of reference for the present discussion, the sheet 302 is shown in FIG. 8 with a longitudinal axis and a lateral axis. The longitudinal axis also corresponds with what may be referred to as the machine direction (i.e. MD) of the sheet 302, and the lateral axis corresponds with what may be referred to as the cross direction (i.e. CD) of the sheet 302. As shown in FIGS. 8-10, graphics 300 may be printed on a first surface 304 of the sheet 302 by moving the substrate in the longitudinal direction relative to a printing station 308 while the printing station 308 prints the graphics 300. It is to be appreciated that the printing station may also be configured to move relative to the substrate while printing. For example, the printing station may move back and forth in lateral directions relative to the substrate while printing the graphics.

It is to be appreciated that the printing station 308 may be configured in various ways and may include various types of printing accessories. For example, in some embodiments, the printing station may include a printer in the form of an ink-jet printer. Ink-jet printing is a non-impact dot-matrix printing technology in which droplets of ink are jetted from a small aperture directly to a specified position on a media to create a graphic. Two examples of inkjet technologies include thermal bubble or bubble jet and piezoelectric. Thermal bubble uses heat to apply to the ink, while piezoelectric uses a crystal and an electric charge to apply the ink. In some configurations, the printing station may include a corona treater, which may be positioned upstream of the printer.

The corona treater may be configured to increase the surface energy of the surface of the web material to be printed. In some configurations, the printing station may also include an ink curing apparatus. In some configurations, the ink curing apparatus may be in the form of an ultraviolet (UV) light source that may include one or more ultraviolet (UV) lamps, which may be positioned downstream of the printer to help cure inks deposited onto the web material from the printer to form the graphics. In some configurations, the ink curing apparatus may also include an infrared (IR) dryer light source that may include one or more infrared (IR) lamps, which may be positioned downstream of the printer to help dry water-based or solvent-based inks deposited onto the web material from the printer to form the graphics. In some configurations, the ink curing apparatus may include an electron beam (EB or e-beam) generator that may include one or more e-beam electrodes, which may be positioned downstream of the printer to help cure inks deposited onto the web material from the printer to form the graphics.

It is it to be appreciated that various types of printing processes may be used to create the graphics disclosed herein. For example, in some embodiments, flexography may be used. In particular, flexography may utilize printing plates made of rubber or plastic with a slightly raised image thereon. The inked plates are rotated on a cylinder which transfers the image to the sheet.

Flexography may be a relatively high-speed print process that uses fast-drying inks. Other embodiments may utilize gravure printing. More particularly, gravure printing utilizes an image etched on the surface of a metal plate. The etched area is filled with ink and the plate is rotated on a cylinder that transfers the image to the sheet. In some embodiments, printing devices such as disclosed in U.S. Patent Publication No. 2012/0222576A1 may be used.

In addition to the aforementioned various types of printing processes, it is to be appreciated that various types of inks or ink systems may be applied to various types of sheets to create the disclosed patterns, such as solvent-based, water-based, and UV-cured inks. Some embodiments may utilize inks such as Artistri® Inks available from DuPont™, including 500 Series Acid Dye Ink; 5000 Series Pigment Ink; 700 Series Acid Dye Ink; 700 Series Disperse Dye Ink; 700 Series Reactive Dye Ink; 700 Series Pigment Ink; 2500 Series Acid Dye Ink; 2500 Series Disperse Dye Ink; 2500 Series Reactive Dye Ink; 2500 Series Pigment Dye Ink; 3500 Series Disperse Dye Ink; 3500 Series Pigment Dye Ink; and Solar Brite™ Ink. Ink such as disclosed in U.S. Pat. No. 8,137,721 may also be utilized. Water-based inks that may be utilized are available from Environmental Inks and Coatings Corporation, Morganton, N.C., under the following code numbers: EH034677 (yellow); EH057960 (magenta); EH028676 (cyan); EH092391 (black); EH034676 (orange); and EH064447 (green). Some embodiments may utilized water based inks composed of food-grade ingredients and formulated to be printed directly onto ingestible food or drug products, such as Candymark Series inks available in colors such as black pro, red pro, blue pro, and yellow pro, available from Inkcups located in Danvers, MA. Other broad ranges of general purpose and specialty inks may also be used, including food grade inks available from Videojet Technologies Inc. located in Wood Dale, IL.

The primary difference among the ink systems is the method used for drying or curing the ink. For example, solvent-based and water-based inks are dried by evaporation, while UV-cured inks are cured by chemical reactions. Inks may also include components, such as solvents, colorants, resins, additives, and (for ultraviolet inks only) UV-curing compounds, that are responsible for various functions. In some embodiments, a multi-stage printing system may be utilized.

In some embodiments, to improve ink rub-off resistance, ink compositions used herein may contain a wax. Such waxes may include a polyethylene wax emulsion. Addition of a wax to the ink composition may enhances rub resistance by setting up a barrier which inhibits the physical disruption of the ink film after application of the ink to the fibrous sheet. Based on weight percent solids of the total ink composition, addition ranges for the wax may be from about 0.5% solids to 10% solids. An example polyethylene wax emulsion is JONWAX 26 supplied by S.C. Johnson & Sons, Inc. of Racine, Wis.

Figure 11:
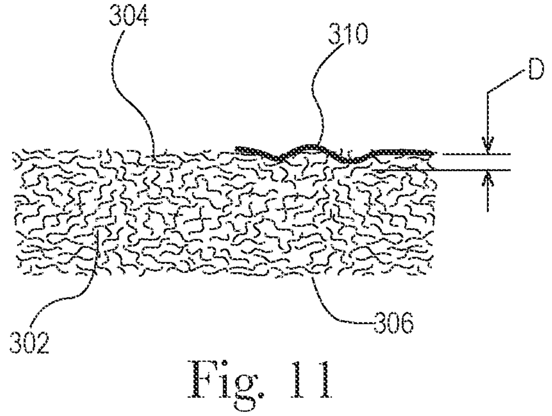
FIG. 11 illustrates a depth of ink penetration into a substrate of ink.

As discussed above with reference to FIGS. 8-10, one or more graphics 300 may be printed directly on the first and/or second surfaces of webs or fibrous structures in the form of sheets 302. The graphics 300 include ink, and as such, ink may reside on the first and/or second surfaces 304,306. In some embodiments, ink may penetrate below the first and/or second surface to various depths. For example, FIG. 11 shows a side view of a web or fibrous structure 302 wherein ink 310 of a printed graphic 300 has penetrated to a distance, D, below the first surface 304. As such, ink of a printed graphic 300 may reside on the web or fibrous structure 302 at the depth, D, below the first and/or second surfaces 304, 306. In some embodiments, ink may penetrate at a depth of 100 microns or less below the first surface 304 and/or the second surface 306 as measured with the Ink Penetration Test Method herein.

It is to be appreciated that the webs and/or fibrous structures with graphics printed thereon may have various ink adhesion ratings. For example, it may be desirable for a web or fibrous structure to have a dry average ink adhesion rating of at least about 1.5 or greater, 3.0 or greater, or 4.0 or greater as measured with the Dry Ink Adhesion Rating Test Method herein. Further, it may be desirable for a web or fibrous structure to have a wet average ink adhesion rating of at least about 1.5 or greater, 3.0 or greater, or 4.0 or greater as measured with the Wet Ink Adhesion Rating Test Method herein. It is to be appreciated that a dry ink adhesion rating and/or wet ink adhesion rating of at least about 1.5 or greater is an indication of a desired level of resistance to ink rub off.

As previously mentioned, the graphics herein may include various colors. For example, in some embodiments, a graphic includes a primary color selected from the group consisting of: cyan, yellow, magenta, and black. It is also to be appreciated that the primary colors may have various optical densities. For example, in some embodiments, the primary color of cyan has an optical density of greater than about 0.05. In other embodiments, the primary color of yellow has an optical density of greater than about 0.05. In still other embodiments, the primary color of magenta has an optical density of greater than about 0.05. In yet other embodiments, the primary color of black has an optical density of greater than about 0.05.

A color's identification is determined according to the Commission Internationale de l'Eclairage L*a*b* Color Space (hereinafter "CIELab"). CIELab is a mathematical color scale based on the Commission Internationale de l'Eclairage (hereinafter "CIE") 1976 standard. CIELab allows a color to be plotted in a three-dimensional space analogous to the Cartesian xyz space. Any color may be plotted in CIELab according to the three values (L*, a*, b*). For example, there is an origin with two axis a* and b* that are coplanar and perpendicular, as well as an L-axis which is perpendicular to the a* and b* axes, and intersects those axes only at the origin. A negative a* value represents green and a positive a* value represents red. CIELab has the colors blue-violet to yellow on what is traditionally the y-axis in Cartesian xyz space. CIELab identifies this axis as the b*-axis. Negative b* values represent blue-violet and positive b* values represent yellow. CIELab has lightness on what is traditionally the z-axis in Cartesian xyz space. CIELab identifies this axis as the L-axis. The L*-axis ranges in value from 100, which is white, to 0, which is black. An L* value of 50 represents a mid-tone gray (provided that a* and b* are 0). Any color may be plotted in CIELab according to the three values (L*, a*, b*). As described herein, equal distances in CIELab space correspond to approximately uniform changes in perceived color. As a result, one of skill in the art is able to approximate perceptual differences between any two colors by treating each color as a different point in a three dimensional, Euclidian, coordinate system, and calculating the Euclidian distance between the two points ($\Delta E^*_{ab}$).

The three dimensional CIELab allows the three color components of chroma, hue, and lightness to be calculated.

Within the two-dimensional space formed from the a-axis and b-axis, the components of hue and chroma can be determined. Chroma, (C*), is the relative saturation of the perceived color and can be determined by the distance from the origin in the a*b* plane. Chroma, for a particular a*, b* set can be calculated as follows:

$$C^*=(a^{*2}+b^{*2})^{1/2}$$

Figure 12:
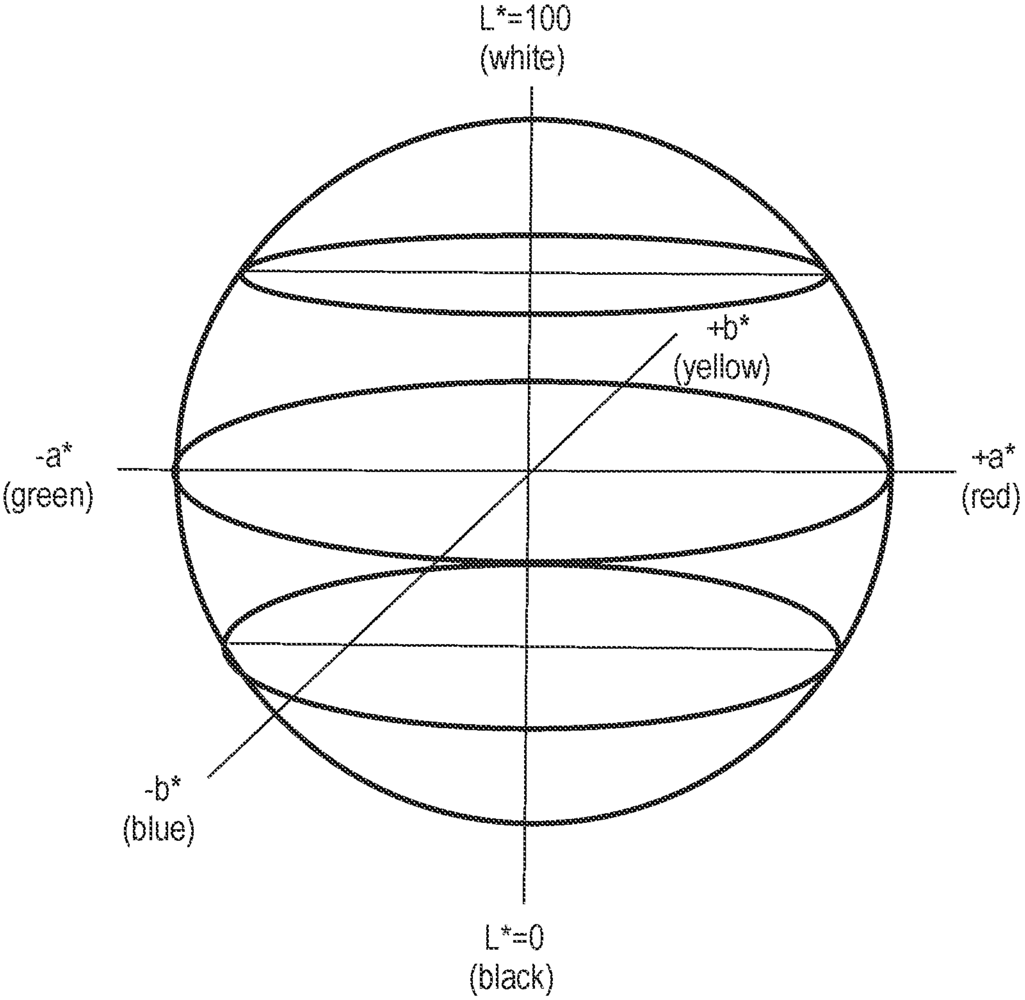
FIG. 12 is an illustration of three axes (i.e. L*, a*, and b*) used with the CIELAB color scale.

For example, a color with a*b* values of (10.0) would exhibit a lesser chroma than a color with a*b* values of (20.0). The latter color would be perceived qualitatively as being "more red" than the former. Hue is the relative red, yellow, green, and blue-violet in a particular color. A ray can be created from the origin to any color within the two-dimensional a*b* space. FIG. 12 is an illustration of three axes (respectively for the L*, a*, and b* value of a given color) used with the CIELAB color scale.

Figure 13:
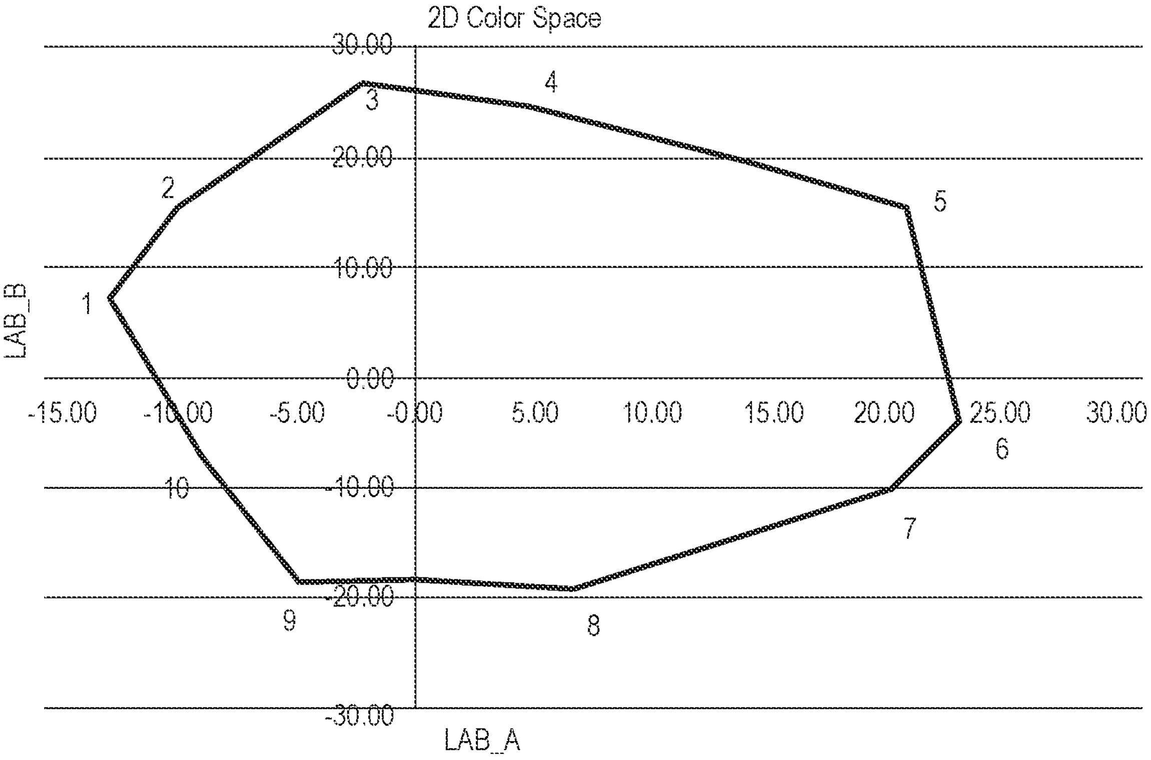
FIG. 13 is a graphical representation of an exemplary color gamut in CIELAB (L*a*b*) coordinates showing the a*b* plane where L*=0 to 100.

With reference to the CIELab coordinate system referred to above, a web may include: a fibrous structure comprising: filament forming material; and an active agent releasable from the fibrous structure when exposed to conditions of intended use. A graphic printed directly on the fibrous structure, the graphic comprising L*a*b* color values, the graphic being defined by the difference in CIELab coordinate values disposed inside the boundary described by the following system of equations:

$$\{a^*=-13.0 \text{ to } -10.0;\ b^*=7.6 \text{ to } 15.5\}\rightarrow b^*=2.645a^*+41.869$$

$$\{a^*=-10.0 \text{ to } -2.1;\ b^*=15.5 \text{ to } 27.0\}\rightarrow b^*=1.456a^*+30.028$$

$$\{a^*=-2.1 \text{ to } 4.8;\ b^*=27.0 \text{ to } 24.9\}\rightarrow b^*=-0.306a^*+26.363$$

$$\{a^*=4.8 \text{ to } 20.9;\ b^*=24.9 \text{ to } 15.2\}\rightarrow >b^*=-0.601a^*+27.791$$

$$\{a^*=20.9 \text{ to } 23.4;\ b^*=15.2 \text{ to } -4.0\}\rightarrow b^*=-7.901a^*+180.504$$

$$\{a^*=23.4 \text{ to } 20.3;\ b^*=-4.0 \text{ to } -10.3\}\rightarrow b^*=2.049a^*-51.823$$

$$\{a^*=20.3 \text{ to } 6.6;\ b^*=-10.3 \text{ to } -19.3\}\rightarrow b^*=0.657a^*-23.639$$

$$\{a^*=6.6 \text{ to } -5.1;\ b^*=-19.3 \text{ to } -18.0\}\rightarrow b^*=-0.110a^*-18.575$$

$$\{a^*=-5.1 \text{ to } -9.2;\ b^*=-18.0 \text{ to } -7.1\}\rightarrow b^*=-2.648a^*-31.419$$

$$\{a^*=-9.2 \text{ to } -13.0;\ b^*=-7.1 \text{ to } 7.6\}\rightarrow b^*=-3.873a^*-42.667; \text{ and}$$

wherein L* is from 0 to 100. FIG. 13 is a graphical representation of the color gamut in CIELab (L*a*b*) coordinates described above showing the a*b* plane where L*=0 to 100.

It is to be appreciated that the printed webs or fibrous structures herein may be used in various applications. In some embodiments, the webs or fibrous structures may be used to form a pouch, such as described in U.S. Patent Application No. 61/874,533, entitled "POUCHES COMPRISING WATER-SOLUBLE FIBROUS WALL MATERIALS AND METHODS FOR MAKING SAME," filed on Sep. 6, 2013, which is incorporated by reference herein. For example, the webs or fibrous structures may be configured to a pouch wall material that forms one or more of the walls of a pouch such that an internal volume of the pouch is defined and enclosed, at least partially or entirely by the pouch wall material. In some applications, contents of the pouch, for example active agents in the form of powder, laundry detergent compositions, dishwashing compositions, and other cleaning compositions, may be contained and retained in the internal volume of the pouch at least until the pouch ruptures, for example during use and it releases its contents. Thus, the pouch wall material made from webs or fibrous materials herein may include a printed graphic that may be positioned on an internal and/or external wall surface of the pouch. A graphic positioned on an internal wall surface of a pouch may be configured to be visible from the external wall surface.

As discussed above, a fibrous structure and a graphic printed directly on the fibrous structure. The fibrous structure may include filaments; wherein the filaments include filament forming material; and an active agent releasable from the filaments when exposed to conditions of intended use. The fibrous structure may also include a first surface and a second surface opposite the first surface; and the graphic may include ink positioned on the first surface. As such, the fibrous structure may be formed as a pouch wall material that defines an internal volume of a pouch. Thus, the first surface may face the internal volume of the pouch. And the first surface may face away from the internal volume of the pouch.

Test Methods

Unless otherwise specified, all tests described herein including those described under the Definitions section and the following test methods are conducted on samples that have been conditioned at a temperature of 23° C.±1° C. and a relative humidity of 50%±2% for a minimum of 2 hours prior to testing. All tests are conducted under the same environmental conditions. Do not test samples that have defects such as wrinkles, tears, holes, and like. Samples conditioned as described herein are considered dry samples (such as "dry filaments") for purposes. Further, all tests are conducted in such conditioned room.

Color and Optical Density Test Method

Background

This method provides a procedure for quantitatively measuring color and optical density of printed materials with the X-Rite SpectroEye. Optical density is a unitless value. In this method, the reflective color and optical density of a printed material is measured with the X-Rite SpectroEye, a hand held spectrophotometer, using standardized procedures and reference materials.

This method is applicable to dissolvable fibrous webs that have been colored via printing, or other approaches directed at adding colorants to a material.

Equipment:

Hand Held Spectrophotometer: 45°/0° configuration, hemispherical geometry, X-Rite SpectroEye available from X-Rite—Corporate Headquarters USA, 4300 44th St. SE, Grand Rapids, MI 49512 USA, phone 616-803-2100.

White Standard Board: PG2000 available from Sun Chemical-Vivitek Division. 1701 Westinghouse Blvd., Charlotte, NC 28273, Phone: (704) 587-8381.

Testing Environment:

The analyses should be performed in a temperature and humidity controlled laboratory (23° C.±2° C., and 50%±2% relative humidity, respectively).

Spectrophotometer settings:

Physical filter: None

White Base: Abs

Observer: 2°

Density Standard: ANSI T

Illumination: C

NOTE: Ensure that the spectrophotometer is set to read L*a*b* units.

Procedures:

1. All samples and the White Standard Board are equilibrated at 23° C.±2° C. and 50%±2% relative humidity for at least 2 hours before analysis.
2. Select a sample region for analysis and place the sample on top of the PG2000 white standard board.
3. Place the X-Rite SpectroEye aperture over the sample and confirm that only the printed region of the sample can be viewed within the instrument aperture window.
4. Toggle through the measurement menu to read and record the color (L*, a*, and b*) and optical density values for each sample.

Calculations:

1. For each sample region, measure and record optical density readings.
2. For each optical density measurement, use three recordings to calculate and report the average and a standard deviation. Optical density values are to be reported to the nearest 0.01 units.
3. For each sample region, measure and record the color (L*,a*, and b*) readings.
4. For each color (L*, a*, b*) measurement, use three recordings to calculate and report the average of each. The L*, a*, b* values are to be reported to the nearest 0.1 units.

Dry Ink Adhesion Rating Test Method

This method measures the amount of color transferred from the surface of a printed substrate to the surface of a standard woven swatch (crock-cloth), by rubbing using a rotary vertical crockmeter. Color transfer is quantified using a spectrophotometer and converted to a ink adhesion rating that ranges from 0 to 5, wherein 0=extensive transfer and 5=no transfer of color.

Equipment:

Rotary vertical crockmeter: AATCC Crockmeter, Model CM6; available from Textile Innovators Corporation, Windsor, NC.

Standard woven swatch (crock-cloth): Model Number of the crock cloth is Shirting #3, 2 inch by 2 inch square woven swatch, available from Testfabrics Inc., West Pittston, PA. Precision pipette, capable of delivering 0.150 mL±0.005 mL: Gilson Inc., Middleton, WI. Spectrophotometer, 45°/0° configuration, hemispherical geometry; HunterLab Labscan XE with Universal Software 3.80; available from Hunter Associates Laboratory Inc., Reston, VA.

Reagent: Purified water, deionized.

Instrument Set Up and Calibration:

The Hunter Color meter settings are as follows:

| | |
|---|---|
| Geometry | 45/0 |
| Color Scale | CIE L*a*b* |
| Illumination | D65 |
| View Angle | 10° |
| Pore size | 0.7 inch |
| Illumination area | 0.5 inch |
| UV Filter | nominal |

Color is reported as L*a*b* values±0.1 units. Calibrate the instrument per instructions using the standard black and white plates provided by the vendor. Calibration should be performed each day before analyses are performed. The analyses should be performed in a temperature and humidity controlled laboratory (23° C.±2° C., and 50%±2% relative humidity, respectively).

Procedure:

1. All samples and crock-cloths are equilibrated at 23° C.±2° C. and 50%±2% relative humidity for at least 2 hours before analysis.
2. Center a single crock-cloth over the port of the color meter and cover it with the standard white plate. Take and record the reading. This is the reference L*a*b* value.
3. Mount the dry crock-cloth on to the crock meter foot.
4. Add a 64 gram weight to the vertical shaft and then lower the foot onto the sample. The actual loading on the sample is the normal instrument weight and the incremental 64 gram weight only. Securely hold the sample in place and turn the crockmeter handle five full rotations. (1 rotation=2 cycles)
5. Raise the foot and remove the crock-cloth. Avoid finger contact with the test area and rubbed region.
6. Place the crock-cloth with the test side facing the orifice of the color meter, being careful to center the rubbed region over the port. Cover it with the standard white plate. Take and record the L*a*b* reading. This is the sample value.
7. Repeat these steps 2 through 6 for each of the 3 replicates.

Calculations:

Calculate ΔE* for each replicate as follows from the set of color reference readings and the after crocking (rubbed) color readings:

$$\Delta E^*=[(L^*_{reference}-L^*_{rubbed})^2+(a^*_{reference}-a^*_{rubbed})^2+(b^*_{reference}-b^*_{rubbed})^2]^{1/2}$$

Convert the ΔE* value obtained to an Ink Adhesion Rating (IAR) by using the following equation:

$$IAR=-0.0001(\Delta E^*)^3+0.0088(\Delta E^*)^2-0.295\ \Delta E^*+5.00$$

Reporting:

Ink Adhesion Rating values are reported as the average of 3 replicates to ±0.1 units.

Wet Ink Adhesion Rating Test Method

This method measures the amount of color transferred from the surface of a printed substrate to the surface of a standard woven swatch (crock-cloth), by rubbing using a rotary vertical crockmeter. Color transfer is quantified using a spectrophotometer and converted to a ink adhesion rating that ranges from 0 to 5, wherein 0=extensive transfer and 5=no transfer of color.

Equipment:

Rotary vertical crockmeter: AATCC Crockmeter, Model CM6; available from Textile Innovators Corporation, Windsor, NC.

Standard woven swatch (crock-cloth): Model Number of the crock cloth is Shirting #3, 2 inch by 2 inch square woven swatch, available from Testfabrics Inc., West Pittston, PA. Precision pipette, capable of delivering 0.150 mL±0.005 mL: Gilson Inc., Middleton, WI. Spectrophotometer, 45°/0° configuration, hemispherical geometry; HunterLab Labscan XE with Universal Software 3.80; available from Hunter Associates Laboratory Inc., Reston, VA.

Reagent: Purified water, deionized.

Instrument Set Up and Calibration:

The Hunter Color meter settings are as follows:

| | |
|---|---|
| Geometry | 45/0 |
| Color Scale | CIE L*a*b* |
| Illumination | D65 |
| View Angle | 10° |
| Pore size | 0.7 inch |
| Illumination area | 0.5 inch |
| UV Filter | nominal |

Color is reported as L*a*b* values±0.1 units. Calibrate the instrument per instructions using the standard black and white plates provided by the vendor. Calibration should be performed each day before analyses are performed. The analyses should be performed in a temperature and humidity controlled laboratory (23° C.±2° C., and 50%±2% relative humidity, respectively).

Procedure:

1. All samples and crock-cloths are equilibrated at 23° C.±2° C. and 50%±2% relative humidity for at least 2 hours before analysis.
2. Create reference sample by wetting a clean dry crock-cloth using 0.15 ml of the reagent. Let it dry overnight (at least 12 hours) in the 23° C.±2° C. and 50%±2% relative humidity environment.
3. After the above wetted crock-cloth has dried, center it above dry crock-cloth over the port of the color meter and cover it with the standard white plate. Take and record the L*a*b* reading. This is the reference value.
4. Mount a clean dry crock-cloth on to the crock meter foot prior wetting. Using a pipette, add 0.15 ml of the reagent to the surface of the crock-cloth, uniformly wetting the contact area.
5. Within one minute of wetting, add a 64 gram weight to the vertical shaft and then lower the foot onto the sample. The actual loading on the sample is the normal instrument weight and the incremental 64 gram weight only. Securely hold the sample in place and turn the crockmeter handle five full rotations. (1 rotation=2 cycles).
6. Raise the foot and remove the crock-cloth. Avoid finger contact with the test area and rubbed region.
7. Let the above wet rubbed crock-cloth dry before proceeding to color measurement. Let it dry overnight (at least 12 hours) in the 23° C.±2° C. and 50%±2% relative humidity environment.
8. Place the above dry crock-cloth sample with the test side facing the orifice of the color meter, being careful to center the rubbed region over the port. Cover it with the standard white plate. Take and record the L*a*b* reading. This is the sample value.
9. Repeat these steps 2 through 8 for each of the 3 replicates.

Calculations:

Calculate ΔE* for each replicate as follows from the set of color reference readings and the after crocking (rubbed) color readings:

$$\Delta E^*=[(L^*_{reference}-L^*_{rubbed})^2+(a^*_{reference}-a^*_{rubbed})^2+(b^*_{reference}-b^*_{rubbed})^2]^{1/2}$$

Convert the ΔE* value obtained to an Ink Adhesion Rating (IAR) by using the following equation:

$$IAR=-0.0001(\Delta E^*)^3+0.0088(\Delta E^*)^2-0.295\ \Delta E^*+5.00$$

Reporting:

Ink Adhesion Rating values are reported as the average of 3 replicates to ±0.1 units.

Color Gamut Test Method

Sample Preparation:

2500 color patches (6 mm by 6 mm individual color patches) are printed on the substrate. A CYMK ink combination is used for building and printing the color patches. The patches are printed where for each of the CYMK colors, there is a variation in the percent dot coverage from 0 to 100. For convenience of printing and measurement the color patches, the color profile can be printed in rows, columns, and in patterns as illustrated by the ANSI Color Characterization Target IT8.7/4 disclosure on page 161 of FLEXOGRAPHIC IMAGE REPRODUCTION SPECIFICATIONS & TOLERANCES (Flexographic Technical Association (FTA), Flexographic Image Reproduction Specifications & Tolerances, 900 Marconi Avenue, Ronkonkoma, NY 11779-7212; www.flexography.org).

Equipment:

X-Rite iProfiler (including spectrophotometer and i1/i0 table)

X-Rite—Corporate Headquarters USA, 4300 44th St. SE, Grand Rapids, MI 49512 USA, phone 616-803-2100.

Spectrophotometer settings:

Physical filter: None

Observer: 2°

Illumination: D50 illuminant

Measurement geometry: 450/0°

NOTE: Ensure that the spectrophotometer is set to read L*a*b* units.

White Standard Board: PG2000 available from Sun Chemical-Vivitek Division. 1701 Westinghouse Blvd., Charlotte, NC 28273, Phone: (704) 587-8381.

Measurement procedure:

1. Set up the spectrophotometer per settings specified above.
2. Before taking color measurements, calibrate the instrument according to manufacturer instructions.
3. Printed samples are in a dry state and equilibrated at an ambient relative humidity of approximately 50%±2% and a temperature of 23° C.±1° C. for at least 2 hrs prior to analysis.
4. Place the sample to be measured on a PG2000 standard white board. Set the white board on i1i0 table.
5. Define the first and last color patch for the i1/i0 table. Set the i1/io table to start color measurement from the first color patch through the last color patch. The L*, a*, and b* values from all color patches are read and recorded.

Calculations:

1. The collected CIELAB L*, a*, b* data set is plotted in a 2-dimension space with a* and b* axes.
2. The color gamut can be approximated by drawing straight lines to between the outer-most points of the fibrous web color gamut.
3. Equations for these lines are generated by doing linear regressions to fit the straight line between the two adjacent outer-most points.

The fibrous web color gamut occupies color space described by the area where the a* and b* axes of the CIELab (L*, a*, b*) color space enclosed by the system of equations described above, where L*=0 to 100.

Ink Penetration Depth Test Method

Equipment

Teflon coated razor blade: GEM® Stainless Steel Coated, Single Edge Industrial Blades, 62-0165 or equivalent.

Double sided transparent tape: Scotch® Double Sided Tape 665 Refill, H inch×36 yds, 3 inch Core, Clear or equivalent.

Microscope slide such as a Precleaned Gold Seal® Rite-On® Microslides, Cat. No. 3050, 25×75 mm, 0.93-1.05 mm thickness or equivalent.

Zeiss Axioplan II with Z-motorized stage, Carl Zeiss Microimaging GmbH, Gattingen, Germany.

MRc5 (5 MP, Color) Zeiss Camera, Carl Zeiss Microimaging GmbH, Gattingen, Germany. Axiovision software version 4.8 with Z-stack & Extended Focus, Carl Zeiss Microimaging GmbH, Gattingen, Germany.

Procedure

Using a new Teflon coated razor blade, a section about 0.5 to 1 cm in length and about 1-2 mm in width is cut from the web region containing printed ink. The section is then mounted for viewing the cross-section by placing the section edge down onto double sided transparent tape stuck to a microscope slide. The section is mounted perpendicular to the microscope slide and microscope stage with the length of the section running parallel to the surface of the microscope slide. The section is visually checked and adjusted, if necessary, to minimize tilting with respect to the surface plane of the microscope slide. The cross-section is viewed with reflected halogen light both with and without crossed-polars using a Zeiss Axioplan II equipped with a Z-motorized stage and MRc5 (5 MP, Color) Zeiss Camera. The microscope is interfaced with Axiovision software version 4.8 with Z-stack & Extended Focus modules. Select the best visual contrast between with and without crossed-polars for viewing and imaging. If no difference in visual contrast between with and without crossed-polars is observed, either may be selected for further work. The magnification is selected to be 200× using a Zeiss 20× Plan-Neofluar (0.50 NA, POL) objective. Images of the cross-section are collected using a Z-stack module of the Axiovision software, then processed using Extended Focus module of the Axiovision software (wavelets method) to create a 2-D representation of the cross-section. The Z-stack range is chosen in order to bring the cross-sectional plane into focus where a typical range is about 20-100 μm and the step size is typically 1-5 μm.

The distance beginning from the top surface over which the ink is deposited is measured in Axiovision and reported as the ink penetration depth. The top surface is defined as the upper most exposed region comprising printed ink. For embossed webs, the top surface is modulated by the embossing process whereby the top surface changes as a function of the hills and valleys of the embossing pattern. Thus the top surface is taken as the local surface specific to the ink printed point of interest on the sample. The ink penetration is measured in microns from the top surface to the distance where ink can no longer be observed.

Basis Weight Test Method

Basis weight of a nonwoven structure and/or a dissolving fibrous structure is measured on stacks of twelve usable units using a top loading analytical balance with a resolution of ±0.001 g. The balance is protected from air drafts and other disturbances using a draft shield. A precision cutting die, measuring 3.500 in±0.0035 in by 3.500 in±0.0035 in is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in lbs/3000 $ft^2$ or $g/m^2$ as follows:

Basis Weight=(Mass of stack)/[(Area of 1 square in stack)×(Number of squares in stack)]

For example,

Basis Weight (lbs/3000 $ft^2$)=[[Mass of stack (g)/453.6 (g/lbs)]/[12.25 ($in^2$)/144 ($in^2/ft^2$)×12]]×3000 or,

Basis Weight ($g/m^2$)=Mass of stack (g)/[79.032 ($cm^2$)/10,000 ($cm^2/m^2$)×12]

Report result to the nearest 0.1 lbs/3000 $ft^2$ or 0.1 $g/m^2$. Sample dimensions can be changed or varied using a similar precision cutter as mentioned above, so as at least 100 square inches of sample area in stack.

Water Content Test Method

The water (moisture) content present in a filament and/or fiber and/or nonwoven web is measured using the following Water Content Test Method.

A filament and/or nonwoven or portion thereof ("sample") in the form of a pre-cut sheet is placed in a conditioned room at a temperature of 23° C.±1° C. and a relative humidity of 50%±2% for at least 24 hours prior to testing. Each sample has an area of at least 4 square inches, but small enough in size to fit appropriately on the balance weighing plate. Under the temperature and humidity conditions mentioned above, using a balance with at least four decimal places, the weight of the sample is recorded every five minutes until a change of less than 0.5% of previous weight is detected during a 10 minute period. The final weight is recorded as the "equilibrium weight". Within 10 minutes, the samples are placed into the forced air oven on top of foil for 24 hours at 70° C.±2° C. at a relative humidity of 4%±2% for drying. After the 24 hours of drying, the sample is removed and weighed within 15 seconds. This weight is designated as the "dry weight" of the sample.

The water (moisture) content of the sample is calculated as follows:

% Water (moisture) in sample=100%×(Equilibrium weight of sample−Dry weight of sample) Dry weight of sample The % Water (moisture) in sample for 3 replicates is averaged to give the reported % Water (moisture) in sample. Report results to the nearest 0.1%.

Dissolution Test Method

Figure 6A:
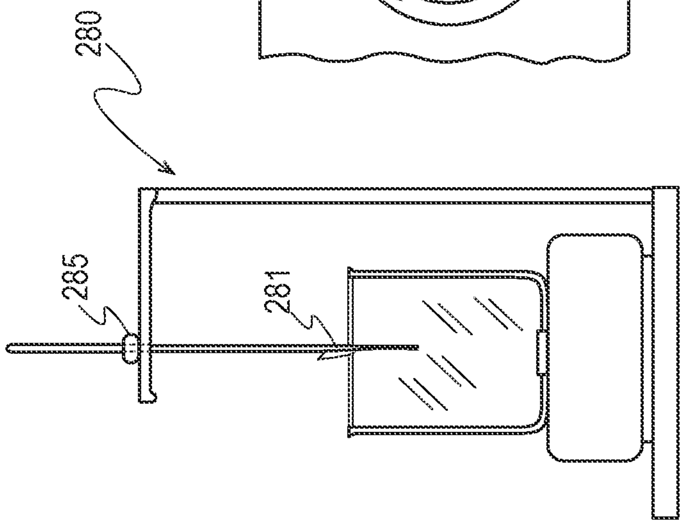
FIG. 6A is a schematic view of equipment for measuring dissolution of a fibrous structure.
Figure 6B:
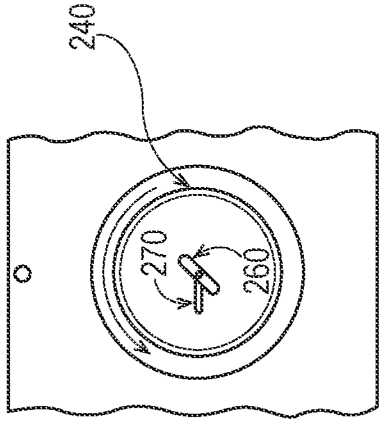
FIG. 6B is a schematic top view of FIG. 6A.
Figure 7:
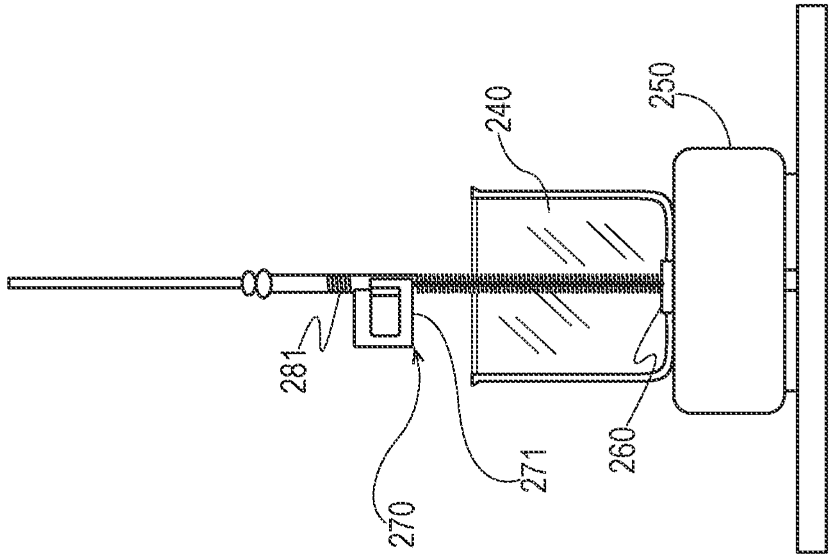
FIG. 7 is a schematic view of equipment for measuring dissolution of a fibrous structure.

Apparatus and Materials (also, see FIGS. 6A, 6B, and 7):

600 mL Beaker 240

Magnetic Stirrer 250 (Labline Model No. 1250 or equivalent)

Magnetic Stirring Rod 260 (5 cm)

Thermometer (1 to 100° C.+/−1° ° C.)

Cutting Die—Stainless Steel cutting die with dimensions 3.8 cm×3.2 cm

Timer (0-3,600 seconds or 1 hour), accurate to the nearest second. Timer used should have sufficient total time measurement range if sample exhibits dissolution time greater than 3,600 seconds. However, timer needs to be accurate to the nearest second.

Polaroid 35 mm Slide Mount 270 (commercially available from Polaroid Corporation or equivalent).

35 mm Slide Mount Holder 280 (or equivalent).

City of Cincinnati Water or equivalent having the following properties: Total Hardness=155 mg/L as $CaCO_3$; Calcium content=33.2 mg/L; Magnesium content=17.5 mg/L; Phosphate content=0.0462.

Test Protocol

Equilibrate samples in constant temperature and humidity environment of 23° C.±1° C. and 50% RH±2% for at least 2 hours.

Measure the basis weight of the sample materials using Basis Weight Method defined herein.

Cut three dissolution test specimens from nonwoven structure sample using cutting die (3.8 cm×3.2 cm), so it fits within the 35 mm slide mount 270 which has an open area dimensions 24×36 mm.

Lock each specimen in a separate 35 mm slide mount 270.

Place magnetic stirring rod 260 into the 600 mL beaker 240.

Turn on the city water tap flow (or equivalent) and measure water temperature with thermometer and, if necessary, adjust the hot or cold water to maintain it at the testing temperature. Testing temperature is 15° C.±1° C. water. Once at testing temperature, fill beaker 240 with 500 mL±5 mL of the 15° C.±1° C. city water.

Place full beaker 240 on magnetic stirrer 250, turn on stirrer 250, and adjust stir speed until a vortex develops and the bottom of the vortex is at the 400 mL mark on the beaker 240.

Figure 2:
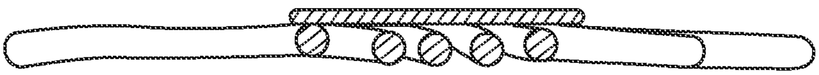
Fig. 2 (PRIOR ART)
FIG. 2 is another known nonwoven substrate.

Secure the 35 mm slide mount 270 in the alligator clamp 281 of the 35 mm slide mount holder 280 such that the long end 271 of the slide mount 270 is parallel to the water surface. The alligator clamp 281 should be positioned in the middle of the long end 271 of the slide mount 270. The depth adjuster 285 of the holder 280 should be set so that the distance between the bottom of the depth adjuster 285 and the bottom of the alligator clip 281 is −11+/−0.125 inches. This set up will position the sample surface perpendicular to the flow of the water. A slightly modified example of an arrangement of a 35 mm slide mount and slide mount holder are shown in FIGS. 1-3 of U.S. Pat. No. 6,787,512.

In one motion, drop the secured slide and clamp into the water and start the timer. The sample is dropped so that the sample is centered in the beaker. Disintegration occurs when the nonwoven structure breaks apart. Record this as the disintegration time. When all of the visible nonwoven structure is released from the slide mount, raise the slide out of the water while continuing the monitor the solution for undissolved nonwoven structure fragments. Dissolution occurs when all nonwoven structure fragments are no longer visible. Record this as the dissolution time.

Three replicates of each sample are run and the average disintegration and dissolution times are recorded. Average disintegration and dissolution times are in units of seconds.

The average disintegration and dissolution times are normalized for basis weight by dividing each by the sample basis weight as determined by the Basis Weight Method defined herein. Basis weight normalized disintegration and dissolution times are in units of seconds/gsm of sample (s/(g/m$^2$)).

Diameter Test Method

The diameter of a discrete filament or a filament within a nonwoven web or film is determined by using a Scanning Electron Microscope (SEM) or an Optical Microscope and an image analysis software. A magnification of 200 to 10,000 times is chosen such that the filaments are suitably enlarged for measurement. When using the SEM, the samples are sputtered with gold or a palladium compound to avoid electric charging and vibrations of the filament in the electron beam. A manual procedure for determining the filament diameters is used from the image (on monitor screen) taken with the SEM or the optical microscope. Using a mouse and a cursor tool, the edge of a randomly selected filament is sought and then measured across its width (i.e., perpendicular to filament direction at that point) to the other edge of the filament. A scaled and calibrated image analysis tool provides the scaling to get actual reading in μm. For filaments within a nonwoven web or film, several filament are randomly selected across the sample of the nonwoven web or film using the SEM or the optical microscope. At least two portions the nonwoven web or film (or web inside a product) are cut and tested in this manner. Altogether at least 100 such measurements are made and then all data are recorded for statistical analysis. The recorded data are used to calculate average (mean) of the filament diameters, standard deviation of the filament diameters, and median of the filament diameters.

Another useful statistic is the calculation of the amount of the population of filaments that is below a certain upper limit. To determine this statistic, the software is programmed to count how many results of the filament diameters are below an upper limit and that count (divided by total number of data and multiplied by 100%) is reported in percent as percent below the upper limit, such as percent below 1 micrometer diameter or %-submicron, for example. We denote the measured diameter (in μm) of an individual circular filament as di.

In case the filaments have non-circular cross-sections, the measurement of the filament diameter is determined as and set equal to the hydraulic diameter which is four times the cross-sectional area of the filament divided by the perimeter of the cross-section of the filament (outer perimeter in case of hollow filaments). The number-average diameter, alternatively average diameter is calculated as:

$$d_{num} = \sum_{i=1}^{n} d_i$$

Tensile Test Method: Elongation. Tensile Strength. TEA and Modulus

Elongation, Tensile Strength, TEA and Tangent Modulus are measured on a constant rate of extension tensile tester with computer interface (a suitable instrument is the EJA Vantage from the Thwing-Albert Instrument Co. Wet Berlin, NJ) using a load cell for which the forces measured are within 10% to 90% of the limit of the cell. Both the movable (upper) and stationary (lower) pneumatic jaws are fitted with smooth stainless steel faced grips, 25.4 mm in height and wider than the width of the test specimen. An air pressure of about 60 psi is supplied to the jaws.

Eight usable units of nonwoven structure and/or dissolving fibrous structure are divided into two stacks of four samples each. The samples in each stack are consistently oriented with respect to machine direction (MD) and cross direction (CD). One of the stacks is designated for testing in the MD and the other for CD. Using a one inch precision cutter (Thwing Albert JDC-1-10, or similar) cut 4 MD strips from one stack, and 4 CD strips from the other, with dimensions of 1.00 in±0.01 in wide by 3.0-4.0 in long. Each strip of one usable unit thick will be treated as a unitary specimen for testing.

Program the tensile tester to perform an extension test, collecting force and extension data at an acquisition rate of 20 Hz as the crosshead raises at a rate of 2.00 in/min (5.08 cm/min) until the specimen breaks. The break sensitivity is set to 80%, i.e., the test is terminated when the measured force drops to 20% of the maximum peak force, after which the crosshead is returned to its original position.

Set the gauge length to 1.00 inch. Zero the crosshead and load cell. Insert at least 1.0 in of the unitary specimen into the upper grip, aligning it vertically within the upper and lower jaws and close the upper grips. Insert the unitary specimen into the lower grips and close. The unitary specimen should be under enough tension to eliminate any slack, but less than 5.0 g of force on the load cell. Start the tensile tester and data collection. Repeat testing in like fashion for all four CD and four MD unitary specimens.

Program the software to calculate the following from the constructed force (g) verses extension (in) curve:

Tensile Strength is the maximum peak force (g) divided by the sample width (in) and reported as g/in to the nearest 1 g/in.

Adjusted Gauge Length is calculated as the extension measured at 3.0 g of force (in) added to the original gauge length (in).

Elongation is calculated as the extension at maximum peak force (in) divided by the Adjusted Gauge Length (in) multiplied by 100 and reported as % to the nearest 0.1%

Total Energy (TEA) is calculated as the area under the force curve integrated from zero extension to the extension at the maximum peak force (g*in), divided by the product of the adjusted Gauge Length (in) and specimen width (in) and is reported out to the nearest 1 g*in/in$^2$.

Replot the force (g) verses extension (in) curve as a force (g) verses strain curve. Strain is herein defined as the extension (in) divided by the Adjusted Gauge Length (in).

Program the software to calculate the following from the constructed force (g) verses strain curve.

Tangent Modulus is calculated as the slope of the linear line drawn between the two data points on the force (g) versus strain curve, where one of the data points used is the first data point recorded after 28 g force, and the other data point used is the first data point recorded after 48 g force. This slope is then divided by the specimen width (2.54 cm) and reported to the nearest 1 g/cm.

The Tensile Strength (g/in), Elongation (%), Total Energy (g*in/in$^2$) and Tangent Modulus (g/cm) are calculated for the four CD unitary specimens and the four MD unitary specimens. Calculate an average for each parameter separately for the CD and MD specimens.

Calculations:

Geometric Mean Tensile=Square Root of [MD Tensile Strength (g/in)×CD Tensile Strength (g/in)]

Geometric Mean Peak Elongation=Square Root of [MD Elongation (%)×CD Elongation (%)]

Geometric Mean TEA=Square Root of [MD TEA (g*in/in$^2$)×CD TEA (g*in/in$^2$)]

Geometric Mean Modulus=Square Root of [MD Modulus (g/cm)×CD Modulus (g/cm)]

Total Dry Tensile Strength (TDT)=MD Tensile Strength (g/in)+CD Tensile Strength (g/in)

Total TEA=MD TEA (g*in/in$^2$)+CD TEA (g*in/in$^2$)

Total Modulus=MD Modulus (g/cm)+CD Modulus (g/cm)

Tensile Ratio=MD Tensile Strength (g/in)/CD Tensile Strength (g/in)

Examples of Printed Web for Optical Density Measurements

Sheet of Web and Print Conditions

A sheet of web in dimension of 8 inch by 11 inch was cut from a roll of web made in accordance with Method of Making Fibrous Structure described above. The sheet of web was then secured on a platen of an Amica Systems, TL2020 inkjet printing system with a printing gap (distance between nozzle plate and surface of the sheet of web) set to 2 mm. The resolution was set at 600 dpi×300 dpi, wherein 600 dpi was the resolution in a machine direction and 300 dpi was the resolution in a cross-web direction. The droplet size was set to 14 picoliters.

A tonal chart for cyan, magenta, yellow, and black colors were printed on separate sheets of web, wherein each tonal chart comprises 17 color patches with the following % dot coverage: 1%, 2%, 3%, 5%, 10%, 20%, 30%, 40%, 50%, 60%, 70%, 80%, 90%, 95%, 96%, 97%, and 100%.

1. CYAN Color Example

A tonal chart for cyan color was printed on a sheet of web with DuPont Artistri® P5000+ Series Pigment Ink, P5100 Cyan.

2. MAGENTA Color Example

A tonal chart for cyan color was printed on a sheet of web with DuPont Artistri® P5000+ Series Pigment Ink, P5200 Magenta.

3. YELLOW Color Example

A tonal chart for cyan color was printed on a sheet of web with DuPont Artistri® P5000+ Series Pigment Ink, P5300 Yellow.

4. BLACK Color Example

A tonal chart for cyan color was printed on a sheet of web with DuPont Artistri® P5000+ Series Pigment Ink, P5400 Black.

Optical density of each patch was measured and recorded in accordance with the Color and Optical Density Test Method herein.

The recorded "optical density vs. % dot coverage" data for each color example are presented in Table 2 below.

TABLE 2

| Dot Coverage | Optical Density | | | |
|---|---|---|---|---|
| (%) | Cyan | Magenta | Yellow | Black |
| 1 | 0.01 | 0.07 | 0.09 | 0.02 |
| 1 | 0.01 | 0.07 | 0.09 | 0.02 |
| 2 | 0.03 | 0.07 | 0.09 | 0.02 |
| 2 | 0.03 | 0.07 | 0.09 | 0.02 |
| 3 | 0.02 | 0.01 | 0.09 | 0.01 |
| 3 | 0.02 | 0.01 | 0.09 | 0.01 |
| 5 | 0.02 | 0.07 | 0.08 | 0.02 |
| 5 | 0.02 | 0.07 | 0.08 | 0.02 |
| 10 | 0.02 | 0.09 | 0.08 | 0.04 |
| 10 | 0.02 | 0.09 | 0.08 | 0.04 |
| 20 | 0.03 | 0.08 | 0.10 | 0.05 |
| 20 | 0.03 | 0.08 | 0.10 | 0.05 |
| 30 | 0.05 | 0.10 | 0.08 | 0.10 |
| 30 | 0.05 | 0.10 | 0.08 | 0.10 |
| 40 | 0.08 | 0.10 | 0.07 | 0.13 |
| 40 | 0.08 | 0.10 | 0.07 | 0.13 |
| 50 | 0.14 | 0.15 | 0.09 | 0.17 |
| 50 | 0.14 | 0.15 | 0.09 | 0.17 |
| 60 | 0.18 | 0.17 | 0.09 | 0.22 |
| 60 | 0.18 | 0.17 | 0.09 | 0.22 |
| 70 | 0.24 | 0.21 | 0.08 | 0.28 |
| 70 | 0.24 | 0.21 | 0.08 | 0.28 |
| 80 | 0.29 | 0.27 | 0.13 | 0.36 |
| 80 | 0.29 | 0.27 | 0.13 | 0.36 |
| 90 | 0.39 | 0.39 | 0.22 | 0.56 |
| 90 | 0.39 | 0.39 | 0.22 | 0.56 |
| 95 | 0.46 | 0.46 | 0.12 | 0.56 |
| 95 | 0.46 | 0.46 | 0.12 | 0.56 |
| 96 | 0.47 | 0.45 | 0.21 | 0.53 |
| 96 | 0.47 | 0.45 | 0.21 | 0.53 |
| 97 | 0.47 | 0.47 | 0.31 | 0.62 |
| 97 | 0.47 | 0.47 | 0.31 | 0.62 |
| 100 | 0.49 | 0.47 | 0.26 | 0.60 |
| 100 | 0.49 | 0.47 | 0.26 | 0.60 |

Examples of Printed Web for Wet and Dry Adhesion Measurements

Sheet of Web and Print Conditions

A sheet of web in dimension of 8 inch by 11 inch was cut from a roll of web made in accordance with Method of Making Fibrous Structure described above. The sheet of web was then secured on a platen of an Amica Systems, TL2020 inkjet printing system with a printing gap (distance between nozzle plate and surface of the sheet of web) set to 2 mm. The resolution was set at 600 dpi×300 dpi, wherein 600 dpi was the resolution in a machine direction and 300 dpi was the resolution in a cross-web direction. The droplet size was set to 14 picoliters.

A 5 inch by 5 inch area of the sheet of web was printed with cyan color, DuPont Artistri® P5000+ Series Pigment Ink, P5100 Cyan. Wet and dry adhesion ratings were measured and recorded in accordance with the Wet and Dry Adhesion Rating Test Methods herein. Each measurement was performed on an untested area of the printed sheet of web.

The recorded wet and dry adhesion rating data for are presented in Table 3 below.

TABLE 3

| | Ink Adhesion Rating (IAR) |
|---|---|
| Dry Ink Adhesion Rating | 4.5 |
| Wet Ink Adhesion Rating | 4.1 |

Examples of Printed Web with Color Gamut Measurements

Sheet of Web and Print Conditions

A sheet of web in dimension of 8 inch by 11 inch was cut from a roll of web made in accordance with Method of Making Fibrous Structure described above. The sheet of web was then secured on a platen of an Amica Systems, TL2020 inkjet printing system with a printing gap (distance between nozzle plate and surface of the sheet of web) set to 2 mm. The resolution was set at 600 dpi×300 dpi, wherein 600 dpi was the resolution in a machine direction and 300 dpi was the resolution in a cross-web direction. The droplet size was set to 14 picoliters. 2500 color patches (6 mm by 6 mm individual color patches) were printed on sheets of the web and data was recorded in accordance with the Color Gamut Test Method herein. The printing was performed with DuPont Artistri® P5000+ Series Pigment Ink, P5100 Cyan; P5200 Magenta; P5300 Yellow; and P5400 Black.

The resulting color gamut was measured according to the Color Gamut Test Method and defined by the difference in CIELab coordinate values disposed inside the boundary described by the following system of equations:

$$\{a^*=-13.0 \text{ to } -10.0;\ b^*=7.6 \text{ to } 15.5\}\rightarrow b^*=2.645a^*+41.869$$

$$\{a^*=-10.0 \text{ to } -2.1;\ b^*=15.5 \text{ to } 27.0\}\rightarrow b^*=1.456a^*+30.028$$

$$\{a^*=-2.1 \text{ to } 4.8;\ b^*=27.0 \text{ to } 24.9\}\rightarrow b^*=-0.306a^*+26.363$$

$$\{a^*=4.8 \text{ to } 20.9;\ b^*=24.9 \text{ to } 15.2\}\rightarrow> b^*=-0.601a^*+27.791$$

$$\{a^*=20.9 \text{ to } 23.4;\ b^*=15.2 \text{ to } -4.0\}\rightarrow b^*=-7.901a^*+180.504$$

$$\{a^*=23.4 \text{ to } 20.3;\ b^*=-4.0 \text{ to } -10.3\}\rightarrow b^*=2.049a^*-51.823$$

$$\{a^*=20.3 \text{ to } 6.6;\ b^*=-10.3 \text{ to } -19.3\}\rightarrow b^*=0.657a^*-23.639$$

$$\{a^*=6.6 \text{ to } -5.1;\ b^*=-19.3 \text{ to } -18.0\}\rightarrow b^*=-0.110a^*-18.575$$

$$\{a^*=-5.1 \text{ to } -9.2;\ b^*=-18.0 \text{ to } -7.1\}\rightarrow b^*=-2.648a^*-31.419$$

$$\{a^*=-9.2 \text{ to } -13.0;\ b^*=-7.1 \text{ to } 7.6\}\rightarrow b^*=-3.873a^*-42.667; \text{ and}$$

wherein L* is from 0 to 100. FIG. 13 is a graphical representation of the color gamut in CIELab (L*a*b*) coordinates described above showing the a*b* plane where L*=0 to 100.

Examples of Printed Web for Ink Penetration Measurements

Sheet of Web and Print Conditions

A sheet of web in dimension of 8 inch by 11 inch was cut from a roll of web made in accordance with Method of Making Fibrous Structure described above. The sheet of web was then secured on a platen of an Amica Systems, TL2020 inkjet printing system with a printing gap (distance between nozzle plate and surface of the sheet of web) set to 2 mm.

5 inch by 5 inch area of the sheet of web was printed with cyan color, DuPont Artistri® P5000+ Series Pigment Ink, P5100 Cyan. Ink penetration distances were measured and recorded in accordance with the Ink Penetration Test Methods herein as presented in Table 4 below.

TABLE 4

| Example | Ink Penetration (μm) |
|---|---|
| #1 | 73 |
| #2 | 98 |
| #3 | 38 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multi-ply product comprising:

a water-soluble fibrous structure comprising a plurality of inter-entangled filaments and void areas between each filament of the plurality of inter-entangled filaments;

wherein at least one of the inter-entangled filaments comprises a filament forming material;

wherein the multi-ply product further comprises a graphic printed directly on at least a portion of the plurality of inter-entangled filaments and/or void areas of the water-soluble fibrous structure, and wherein the graphic is formed from an ink at least a portion of which non-uniformly penetrates the inter-entangled filaments and/or void areas on a surface of the water-soluble fibrous structure to a depth of 100 microns or less.

2. The multi-ply product of claim 1 wherein the water-soluble fibrous structure is formed as a pouch wall material that defines an internal volume of a pouch.

3. The multi-ply product of claim 2 wherein the surface faces the internal volume of the pouch.

4. The multi-ply product of claim 2 wherein the surface faces away from the internal volume of the pouch.

5. The multi-ply product of claim 1 wherein the graphic includes a primary color selected from the group consisting of: cyan, yellow, magenta, and black.

6. The multi-ply product of claim 5 wherein the primary color of cyan has an optical density of greater than about 0.05.

7. The multi-ply product of claim 5 wherein the primary color of yellow has an optical density of greater than about 0.05.

8. The product multi-ply of claim 5 wherein the primary color of magenta has an optical density of greater than about 0.05.

9. The multi-ply product of claim 5 wherein the primary color of black has an optical density of greater than about 0.05.

10. The multi-ply product of claim 1 wherein the water-soluble fibrous structure exhibits one or more of the following properties:

a. a geometric mean tensile of at least about 200 g/in or greater;

b. a geometric mean peak elongation of at least about 10% or greater;

c. a geometric mean modulus of about 5000 g/cm or less;

d. an average disintegration time of about 60 seconds or less;

e. an average dissolution time of about 600 seconds or less;

f. an average disintegration time per gsm of sample of about 1.0 second/gsm or less;

g. an average dissolution time per gsm of sample of about 10 second/gsm or less;

h. a dry average ink adhesion rating of at least about 1.5 or greater; and i. a wet average ink adhesion rating of at least about 1.5 or greater.

11. The multi-ply product of claim 1 wherein the water-soluble fibrous structure has one or more of the following properties:

a. a dry average ink adhesion rating of at least about 1.5 or greater; and b. a wet average ink adhesion rating of at least about 1.5 or greater.

12. The multi-ply product of claim 1 wherein the graphic comprises L*a*b* color values, the graphic being defined by the difference in CIELab coordinate values disposed inside the boundary described by the following system of equations:

$$\{a^*=-13.0 \text{ to } -10.0;\ b^*=7.6 \text{ to } 15.5\}\rightarrow b^*=2.645a^*+41.869$$

$$\{a^*=-10.0 \text{ to } -2.1;\ b^*=15.5 \text{ to } 27.0\}\rightarrow b^*=1.456a^*+30.028$$

$$\{a^*=-2.1 \text{ to } 4.8;\ b^*=27.0 \text{ to } 24.9\}\rightarrow b^*=-0.306a^*+26.363$$

$$\{a^*=4.8 \text{ to } 20.9;\ b^*=24.9 \text{ to } 15.2\}\rightarrow> b^*=-0.601a^*+27.791$$

$$\{a^*=20.9 \text{ to } 23.4;\ b^*=15.2 \text{ to } -4.0\}\rightarrow b^*=-7.901a^*+180.504$$

$$\{a^*=23.4 \text{ to } 20.3;\ b^*=-4.0 \text{ to } -10.3\}\rightarrow b^*=2.049a^*-51.823$$

$$\{a^*=20.3 \text{ to } 6.6;\ b^*=-10.3 \text{ to } -19.3\}\rightarrow b^*=0.657a^*-23.639$$

$$\{a^*=6.6 \text{ to } -5.1;\ b^*=-19.3 \text{ to } -18.0\}\rightarrow b^*=-0.110a^*-18.575$$

$$\{a^*=-5.1 \text{ to } -9.2;\ b^*=-18.0 \text{ to } -7.1\}\rightarrow b^*=-2.648a^*-31.419$$

$$\{a^*=-9.2 \text{ to } -13.0;\ b^*=-7.1 \text{ to } 7.6\}\rightarrow b^*=-3.873a^*-42.667; \text{ and}$$

wherein L* is from 0 to 100.

13. The multi-ply product of claim 1 wherein the water-soluble fibrous structure has a geometric mean tensile of at least about 200 g/in or greater.

14. The multi-ply product of claim 1 wherein the water-soluble fibrous structure has a geometric mean peak elongation of at least about 10% or greater.

15. The multi-ply product of claim 1 wherein the water-soluble fibrous structure has a geometric mean modulus of about 5000 g/cm or less.

16. The multi-ply product of claim 1 wherein the water-soluble fibrous structure has an average disintegration time of about 60 seconds or less.

17. The multi-ply product of claim 1 wherein the water-soluble fibrous structure has an average dissolution time of about 600 seconds or less.

18. The multi-ply product of claim 1 wherein the water-soluble fibrous structure has an average disintegration time per gsm of sample of about 1.0 second/gsm or less.

19. The multi-ply product of claim 1 wherein the water-soluble fibrous structure has an average dissolution time per gsm of sample of about 10 second/gsm or less.

20. The multi-ply product of claim 1 wherein the multi-ply product is a layered product comprising two or more layers selected from the group consisting of: layers of a plurality of inter-entangled filaments, layers of particles, layers of a mixture of a plurality of inter-entangled filaments and particles, and combinations thereof.

21. The multi-ply product of claim 1 wherein the surface of the water-soluble fibrous structure forms an exterior surface of the multi-ply product.

22. The multi-ply product of claim 1 wherein the at least one of the inter-entangled filaments further comprises one or more active agents.

23. The multi-ply product of claim 22 wherein the one or more active agents comprises one or more surfactants.

24. The multi-ply product of claim 23 wherein the one or more surfactants are selected from the group consisting of: anionic surfactants, cationic surfactants, and mixtures thereof.

* * * * *